US010851179B2

(12) United States Patent
Edgar et al.

(10) Patent No.: US 10,851,179 B2
(45) Date of Patent: Dec. 1, 2020

(54) POLYSACCHARIDE DERIVATIVES AND CROSS-METATHESIS PROCESSES FOR PREPARING THEM

(71) Applicants: Kevin J. Edgar, Blacksburg, VA (US); Xiangtao Meng, Blacksburg, VA (US); Yifan Dong, Blacksburg, VA (US)

(72) Inventors: Kevin J. Edgar, Blacksburg, VA (US); Xiangtao Meng, Blacksburg, VA (US); Yifan Dong, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/125,787

(22) PCT Filed: Mar. 16, 2015

(86) PCT No.: PCT/US2015/020726
§ 371 (c)(1),
(2) Date: Sep. 13, 2016

(87) PCT Pub. No.: WO2015/139029
PCT Pub. Date: Sep. 17, 2015

(65) Prior Publication Data
US 2016/0376379 A1 Dec. 29, 2016

Related U.S. Application Data

(60) Provisional application No. 61/952,942, filed on Mar. 14, 2014.

(51) Int. Cl.
| | | |
|---|---|---|
| *C08B 3/16* | (2006.01) | |
| *C08B 37/00* | (2006.01) | |
| *C08B 11/193* | (2006.01) | |
| *C08B 11/20* | (2006.01) | |
| *C08F 290/10* | (2006.01) | |
| *C08L 33/02* | (2006.01) | |
| *C08B 3/02* | (2006.01) | |
| *C08B 3/22* | (2006.01) | |
| *C08L 33/12* | (2006.01) | |

(52) U.S. Cl.
CPC ............. *C08B 3/16* (2013.01); *C08B 3/02* (2013.01); *C08B 3/22* (2013.01); *C08B 11/193* (2013.01); *C08B 11/20* (2013.01); *C08B 37/00* (2013.01); *C08F 290/10* (2013.01); *C08L 33/02* (2013.01); *C08L 33/12* (2013.01)

(58) Field of Classification Search
CPC ......... C07H 13/02; C07H 13/12; C07H 13/10
USPC ........................................................ 536/64
See application file for complete search history.

(56) References Cited

U.S. PATENT DOCUMENTS

| | | | | |
|---|---|---|---|---|
| 4,981,959 | A | * | 1/1991 | Diamantoglou ....... B01D 71/08 536/100 |
| 2012/0178913 | A1 | | 7/2012 | Lin et al. |
| 2012/0330002 | A1 | | 12/2012 | Cordova et al. |
| 2013/0008830 | A1 | | 1/2013 | Ng et al. |
| 2013/0248109 | A1 | | 9/2013 | Grubbs et al. |

FOREIGN PATENT DOCUMENTS

| | | |
|---|---|---|
| WO | 2011156774 A2 | 12/2011 |
| WO | 2013106433 A1 | 7/2013 |

OTHER PUBLICATIONS

Co-pending U.S. Appl. No. 15/025,451, filed Mar. 28, 2016, published as U.S. Pat. No. 20160215068 dated Jul. 28, 2016.
Co-pending U.S. Appl. No. 15/025,451, Non-Final Office Action dated Jul. 12, 2018, 8 pages.
Ilevbare, G. A.; Liu, H.; Edgar, K J.; Taylor, L. S., Understanding Polymer Properties Important for Crystal Growth Inhibition-Impact of Chemically Diverse Polymers on Solution Crystal Growth-of Ritonavir. Cryst. Growth Des. 2012, 12, (6), 3133-3143.
Chatterjee, A. K.; Choi, T. L.; Sanders, D. P.; R. H., A General Model for Selectivity in Olefin Cross Metathesis. J. Am. Chem. Soc. 2003, 125, (37), 11360-11370.
Choi, T. L.; Chatterjee, A, K.; Grubbs, R. H., Synthesis of α, β-Unsaturated Amides by Olefin Crossmetathesis. Angew. Chem. Int. Ed. 2001,40, (7), 1277-+.
de Espinosa, L. M.; Kempe, K.; Schubert, U.S.; Hoogenboom, R.; Meier, M. A. R., Side-Chain Modification and "Grafting onto" via Olefin Cross-Metathesis. Macrom. Rapid Comm. 2012, 33, (23), 2023-2028.
Grubbs, R. H., Olefin metathesis. Tetrahedron 2004, 60, (34), 7117-7140.
Co-pending Application PCT/US2014/057661, International Search Report and the Written Opinion of the International Searching Authority, Dec. 29, 2014, 8 pages.
Joly, N.; Granet, R.; Krausz, P., Olefin Metathesis Applied to Cellulose Derivatives—Synthesis, Analysis, and Properties of New Crosslinked Cellulose Plastic Films. Journal of Polymer Science Part a-Polym. Chem. 2005,43, (2), 407-418.

(Continued)

*Primary Examiner* — Shaojia A Jiang
*Assistant Examiner* — Everett White
(74) *Attorney, Agent, or Firm* — New River Valley IP Law, P.C.; Michele L. Mayberry

(57) ABSTRACT

Methods for the cross-metathesis of polysaccharides with one or more olefin-terminated side chains and cross-metathesized products are described. In an exemplary embodiment, a method for the synthesis of cellulose ω-carboxyesters via olefin cross-metathesis with acrylates is described. Conditions of the reactions were relatively mild and the olefin-substituted polysaccharides and the appropriate acrylate partners appear to follow Grubbs rules as summarized herein. Additionally, a method of hydrogenation of the cross-metathesized product is described. The compounds and methods may be useful for waterborne coating applications, adhesives, lubricants, or any product in need of dispersion in an aqueous media.

20 Claims, 25 Drawing Sheets

(56) References Cited

OTHER PUBLICATIONS

Ilevbare, G. A.; Liu, H.; Edgar, K. J.; Taylor, L. S., Effect of Binary Additive Combinations on Solution Crystal Growth of the Poorly Water-Soluble Drug, Ritonavir. Cryst. Growth Des. 2012, 12, (12), 6050-6060.
Ilevbare, G. A.; Liu, H.; Edgar, K. J.; Taylor, L. S., Impact of Polymers on Crystal Growth Rate of Structurally Diverse Compounds from Aqueous Solution. Mol. Pharm. 2013, 10, (6), 2381-2393.
Ilevbare, G. A.; Liu, H.; Edgar, K. J.; Taylor, L. S., Maintaining Supersaturation in Aqueous Drug Solutions: Impact of Different Polymers on Induction Times. Cryst. Growth Des. 2013, 13, (2), 740-751.
Memmi, A.; Granet, R.; Gahbiche, M. A.; Fekih, A.; Bakhrouf, A.; Krausz, P., Fatty Esters of Cellulose from Olive Pomace and Barley Bran: Improved Mechanical Properties by Metathesis Crosslinking. J. Appl. Polym. Sci. 2006, 101, (1), 751-755.
Vliao, X.; Fischmeister, c.; Dixneuf, P. H.;Bruneau, c.; Dubois, J. L.; Couturier, J. L., Polyamide Precursors from Renewable 10-Undecenenitrile and Methyl Acrylate via Olefin Cross-metathesis. Green Chem. 2012, 14, (8), 2179-2183.
Miyata, O.; Shinada, T.; Ninomiya, I.; Naito, T.; Date, T.; Okamura, K; Inagaki, S., Stereospecific nucleophilic addition reactions to olefins. Addition of Thiols to α, β-Unsaturated Carboxylic Acid Derivatives. J.Org. Chem. 1991,56, (23), 6556-6564.
Mori, A.; Miyakawa, Y.; Ohashi, E.; Haga, T.; Maegawa, T.; Sajiki, H., Pd/C-catalyzed chemoselective hydrogenation in the presence of diphenylsulfide. Org. Lett. 2006, 8, (15), 3279-3281.
Reddy, C. R.; Jithender, E.; Prasad, K. R, Total Syntheses of the Proposed Structure for leodoglucomides A and B. J. Org. Chem. 2013, 78, (9), 4251-4260.
Rybak, A.; Meier, M. A. R., Cross-metathesis of Fatty Acid Derivatives with Methyl Acrylate: Renewable Raw Materials for the Chemical Industry. Green Chem. 2007, 9, (12), 1356-1361.
Samojlowicz, C.; Bieniek, M.; Grela, K., Ruthenium-Based Olefin Metathesis Catalysts Bearing NHeterocyclic Carbene Ligands. Chem. Rev. 2009,109, (8), 3708-3742.
Vougioukaiakis, "Removing Ruthenium Residues from Olefin Metathesis Reaction Products", Chem. Eur. J. 18: 8868-8880, 2012.
Vougioukalakis, G.C.; Grubbs, R. H., Synthesis and Activity of Ruthenium Olefin Metathesis Catalysts Coordinated with Thiazol-2-ylidene Ligands. J. Am. Chem. Soc. 2008, 130, (7), 2234-2245.
Zerkowski, J. A.; Solaiman, D. K. Y., Omega-Functionalized Fatty Acids, Alcohols, and Ethers via Olefin Metathesis. J. Am. Oil Chem. Soc. 2012, 89, (7), 1325-1332.
Co-pending Application PCT/US15/20726, International Search Report and Written Opinion, Jun. 10, 2015, 10 pages.
Meng et al. 'Olefin Cross-Metathesis as a Source of Polysaccharide Derivatives: Cellulose w-Carboxyalkanoates', Biomacromolecules 2014, vol. 15, pp. 177-187 (Published Dec. 13, 2013).
Meng. et al. "Olefin cross-metathesis, a mild, modular approach to functionalized cellulose esters". Polym. Chem. 2014, 5, 7021-7033.
Co-pending U.S. Appl. No. 15/025,451, filed Mar. 28, 2016 and published as U.S. Pat. No. 20160215068 dated Jul. 28, 2016.
Co-pending U.S. Appl. No. 15/025,451, Response to Jul. 12, 2018 Non-Final Office Action dated Jan. 14, 2019, 9 pages.
Co-pending U.S. Appl. No. 15/025,451, Response to Oct. 27, 2017 Restriction Requirement dated Apr. 25, 2018, 2 pages.
Co-pending U.S. Appl. No. 15/025,451, Restriction Requirement dated Oct. 27, 2017, 6 pages.
Edgar, K.J. Direct synthesis of partially substituted cellulose esters, pp. 213-229, ACS Symposium Series No. 1017, 2009, K.J. Edgar, T. Heinze, C.M. Buchanan editors, American Chemical Society, Washington, D.C.
Meng, X.; Edgar, K.J. Synthesis of amide-functionalized cellulose esters by olefin cross-metathesis. Carbohydrate Polymers 2015, 132, 565-573.
Carter, S.C.; Li, B., Xu, D.; Edgar, K.J. "Regioselective esterification and etherification of cellulose; a review". Biomacromolecules 2011, 12, 1956-1972.
Co-pending U.S. Appl. No. 15/025,451, Final Office Action dated May 9, 2019, 18 pages.
Co-pending U.S. Appl. No. 15/025,451, Non-Final Office Action dated Sep. 20, 2019, 11 pages.
Co-pending U.S. Appl. No. 15/025,451, Response to Final Office Action dated May 9, 2019 filed Aug. 9, 2019, 12 pages.
Kar, N., et al., "Synthesis of Cellulose Adipate Derivatives", Biomacromolecules, 2011, vol. 12 (4), 1106-1115.
Ku, D.; Li, B.; Tate, C.; Edgar, K.J. Studies on regioselective acylation of cellulose with bulky acid chlorides. Cellulose 2011, 18, 405-419.

* cited by examiner

FIG. 8

| cell. ether (DS$_{olefin}$) | CM partner | cat. load. (mol%) | solvent | time (h) | CM product | conv. |
|---|---|---|---|---|---|---|
| | | 5 | THF | 2h | | 31% |
| | AA | 5 | DCM | 2h | 2a | 40% |
| | | 5 | AA | 2h | | 23% |
| 2 (C3) (DS$_{C=C}$=0.38) | | 5 | THF | 2h | | 47% |
| | MA | 5 | DCM | 2h | 2b | 49% |
| | | 10 | DCM | 2h | | 70% |

$^a$AA: acrylic acid; MA: methyl acrylate; THF: tetrahydrofuran; DCM: dichloromethane.

| cell. ether (DS$_{alkyl}$) | CM partner | cat. load. (mol%) | solvent | time (h) | CM product | conv. |
|---|---|---|---|---|---|---|
| EC2.58C5 (DS$_{C=C}$=0.38) | AA | 5 | THF | 2h | EC2.58C5-AA | 60% |
| | | 5 | DCM | 2h | | 45% |
| | | 5 | AA | 2h | | 72% |
| | | 10 | THF | 2h | | 87% |
| | | 10 | DCM | 2h | | 100% |
| | | 10 | AA | 2h | | 100% |
| | MA | 5 | THF | 2h | EC2.58C5-MA | 35% |
| | | 5 | DMI | 2h | | 38%[b] |
| | | 5 | DCM | 2h | | 74% |
| | | 10 | THF | 2h | | 51% |
| | | 10 | DCM | 2h | | 100% |
| | HEA | 10 | DCM | 2h | EC2.58C5-HEA | 100% |
| | PEGMEA | 10 | DCM | 2h | EC2.58C5-PEGMEA | 85% |
| | | 10 | DCM | 12h | | 100% |
| | PPGA | 10 | DCM | 2h | EC2.58C5-PPGA | <20% |
| | | 10 | DCM | 12h | | <25% |
| | | 10 | THF | 12h | | 42% |
| EC2.58C7 (DS$_{C=C}$=0.41) | AA | 10 | DCM | 2h | EC2.58C5-AA | >95% |
| | MA | 10 | DCM | 2h | EC2.58C5-MA | >90% |
| EC2.58C11 (DS$_{C=C}$=0.36) | AA | 5 | DCM | 2h | EC2.58C11-AA | 44% |
| | | 5 | AA | 2h | | 38% |
| | | 10 | AA | 2h | | 59% |
| | | 5 | DCM | 12h | | 83% |
| | | 10 | DCM | 12h | | 100% |
| | MA | 5 | DCM | 2h | EC2.58C11-MA | 33% |
| | | 5 | THF | 2h | | 29% |
| | | 5 | DMI | 2h | | 46%[b] |
| | | 5 | DCM | 12h | | 95% |
| | | 10 | DCM | 12h | | 100% |

[a] HEA: 2-hydroxyethyl acrylate; PEGMEA: poly(ethylene glycol) methyl ether acrylate; PPGA: poly(propylene glycol) acrylate; THF: tetrahydrofuran; DCM: dichloromethane; DMI: 1,3-dimethyl-2-imidazolidinone. [b] Reaction at 70 °C for 2h.

FIG. 16B

| Sample | CH$_2$Cl$_2$ | CHCl$_3$ | THF | acetone | DMSO | DMF |
|---|---|---|---|---|---|---|
| EC2.58 | P | + | + | P | P | P |
| EC2.58C5 | + | + | + | + | + | + |
| EC2.58C5-AA | P | P | + | + | + | + |
| EC2.58C5-MA | + | + | + | P | - | + |
| EC2.58C5-HEA | + | + | + | + | + | + |
| EC2.58C5-PEGMEA | + | + | + | + | + | + |
| EC2.58C11 | + | + | + | P | + | + |
| EC2.58C11-AA | + | + | + | + | + | + |
| EC2.58C11-MA | + | + | + | P | + | + |

$^a$ (+) soluble; (-) insoluble; (P) partially soluble.

FIG. 21

| Sample | Mn (kDa) | DP | PDI | Tg (°C) |
|---|---|---|---|---|
| EC2.58 | 56.0[a] | 240 | 1.51 | 127 |
| EC2.58C5 | 27.9 | 107 | 1.45 | 80[b] |
| EC2.58C5-AA | 23.5[a] | 85 | 1.35 | 96 |
| EC2.58C5-MA | 21.4 | 76 | 2.24 | 81 |
| EC2.58C5-HEA | 23.0 | 78 | 1.33 | 88 |
| EC2.58C11 | 29.0[a] | 97 | 1.30 | 117 |
| EC2.58C11-AA | 40.0[a] | 127 | 1.15 | 96[c] |
| EC2.58C11-MA | 34.6 | 107 | 1.81 | 120[c] |

[a] By SEC in THF solvent vs. polystyrene standards. [b] Transition very broad, see supporting information (Fig. S9). [c] EC2.58C11-AA was measured by a TA Q100 instrument and EC2.58C11-MA was measured using a TA Q200 instrument.

FIG. 22

POLYSACCHARIDE DERIVATIVES AND CROSS-METATHESIS PROCESSES FOR PREPARING THEM

CROSS-REFERENCE TO RELATED APPLICATIONS

The present application is a National Stage application under 35 USC § 371 of International Application No. PCT/US15/20726, filed Mar. 16, 2015, which application relies on the disclosure of and claims priority to and the benefit of the filing date of U.S. Provisional Application No. 61/952,942, filed Mar. 14, 2014, the disclosures of each of which are hereby incorporated by reference herein in their entireties.

BACKGROUND OF THE INVENTION

Field of the Invention

The present invention relates to cross-metathesis of polysaccharides with one or more olefin-terminated side chains and cross-metathesized products thereof, including functionalized cellulose esters and ethers.

Description of Related Art

Modified polysaccharides are extremely important materials for purposes as diverse as drug delivery, adhesive tape, automobile coatings, house paint, and flat screen displays (Edgar, K. J.; Buchanan, C. M.; Debenham, J. S.; Rundquist, P. A.; Seiler, B. D.; Shelton, M. C.; Tindall, D, Advances in cellulose ester performance and application. *Prog. Polym. Sci.* 2001, 26, 1605-1688). Even so, modern polymer science has had little impact on increasing the variety of commercial polysaccharide derivatives available to meet current demanding materials needs. Cellulose derivatives are the most commercially important polysaccharide-based materials; nearly the entire cellulose derivative market involves derivatives with substituents selected from among just five ether types (methyl, ethyl, carboxymethyl, hydroxyethyl, and hydroxypropyl) and five ester types (acetate, propionate, butyrate, succinate, and phthalate). Furthermore, synthesis of these derivatives requires the use of somewhat forcing conditions; strong acid catalysts like sulfuric acid in the case of cellulose ester synthesis, and strong base catalysts like sodium hydroxide in the case of cellulose ether synthesis, for example. Such conditions are not conducive to reaction of the polysaccharide with sensitive moieties. The remarkable recent achievements in polymer chemistry have not been successfully applied to polysaccharides to create useful new derivatives that can be practically prepared. To successfully meet these demanding application needs, and to create a renewable-based economy, efficient pathways to a more diverse set of renewable polysaccharide-based materials must be created.

Olefin metathesis has been developed in recent years as a powerful, versatile tool for the synthesis of complex small molecules, as well as the polymerization of olefinic monomers to create novel and useful polymeric structures. In olefin metathesis, metal carbene complexes are used to rearrange double bonds in carbon skeletons with high functional group tolerance and under mild reaction conditions. Although ring closing metathesis (RCM) and ring opening metathesis polymerization (ROMP) have been comprehensively investigated over the past decade, olefin cross-metathesis (CM) has become an increasingly powerful tool in both organic and polymer chemistry thanks to the publication of Grubbs' model of selectivity for CM1 and the development of active and selective CM catalysts (Samojlowicz, C.; Bieniek, M.; Grela, K., Ruthenium-Based Olefin Metathesis Catalysts Bearing N-Heterocyclic Carbene Ligands. *Chem. Rev.* 2009, 109, (8), 3708-3742; and Vougioukalakis, G. C.; Grubbs, R. H., Synthesis and Activity of Ruthenium Olefin Metathesis Catalysts Coordinated with Thiazol-2-ylidene Ligands. *J. Am. Chem. Soc.* 2008, 130, (7), 2234-2245).

It is instructive that these valuable new tools have not yet been exploited for synthesis of a wide variety of new polysaccharide derivatives. Only a few related studies have appeared; one example is the work by Reddy and co-workers (Reddy, C. R.; Jithender, E.; Prasad, K. R., Total Syntheses of the Proposed Structure for leodoglucomides A and B. *J. Org. Chem.* 2013, 78, (9), 4251-4260) who successfully cross-metathesized glucose-linked olefins with amino acid-appended olefins to construct the complete carbon skeleton of ieodoglucomides A and B, two unique glycopeptides isolated from marine-derived bacteria. What about similar CM reactions between, for example, a cellulose derivative bearing unsaturated side chains, and other olefin species, which could lead to a rich variety of otherwise inaccessible derivatives? Surprisingly, only a handful of studies have described metathesis reactions of polysaccharide derivatives, and none of them have described successful CM. In a typical example, Joly et al. observed self-metathesis (SM) of cellulose undec-10-enoate using Grubbs' catalyst (1st generation), affording crosslinked and insoluble cellulose plastic films (Joly, N.; Granet, R.; Krausz, P., Olefin Metathesis Applied to Cellulose Derivatives—Synthesis, Analysis, and Properties of New Cross-linked Cellulose Plastic Films. *Journal of Polymer Science Part a-Polym. Chem.* 2005, 43, (2), 407-418). All such studies to date have reported dominant self-metathesis of olefin substituted polysaccharides to afford crosslinked, insoluble products. This is not surprising; metathesis of polysaccharide derivatives containing pendent olefin groups (especially reactive Type 1 olefins by Grubbs' classification) must be nearly perfectly selective for cross-metathesis rather than self-metathesis in order to avoid cross-linking that would render the polymer insoluble, difficult to melt-process, and overall very difficult to process into desired shapes. Perhaps it is the negative results of these studies that have discouraged further investigation of cross-metathesis in polysaccharide derivatives.

In order to obtain discrete, soluble, polysaccharide-olefin CM products, SM between pendant terminal olefins must be absent, and there must be a high degree of conversion to CM products. Previous studies in other systems have shown that the type of catalyst (shown in FIGS. 1A-C) used influences the ability to obtain a high degree of conversion to cross-metathesis products. The Grubbs' 1st generation catalyst (FIG. 1A) has proved to be insufficiently effective as a cross-metathesis catalyst in all but simple reactions (Rybak, A.; Meier, M. A. R., Cross-metathesis of Fatty Acid Derivatives with Methyl Acrylate: Renewable Raw Materials for the Chemical Industry. *Green Chem.* 2007, 9, (12), 1356-1361; and Bruneau, C.; Fischmeister, C.; Miao, X.; Malacea, R.; Dixneuf, P. H., Cross-metathesis with acrylonitrile and applications to fatty acid derivatives. *Eur. J. Lipid Sci. Tech.* 2010, 112, (1), 3-9).

More reactive and thermally stable Grubbs' 2nd generation (FIG. 1B) and Hoveyda-Grubbs' 2nd generation (FIG. 1C) catalysts have been heavily studied for CM reactions. Compared with Grubbs' 2nd generation, the Hoveyda-Grubbs catalyst (FIG. 1C) is more reactive towards electron-deficient olefins, and it can initiate metathesis at lower temperature. While the degree of conversion depends on the catalyst used, selectivity in CM is dependent primarily upon the structure of the reacting olefin. Based on chemical structure and reactivity results, Grubbs empirically classified olefins into 4 types (shown in Table 1) (Chatterjee, A. K.; Choi, T. L.; Sanders, D. P.; Grubbs, R. H., A General Model for Selectivity in Olefin Cross Metathesis. *J. Am. Chem. Soc.* 2003, 12S, (37), 11360-11370).

TABLE 1

Grubbs' Categorization of Olefins and Rules for Selectivity

| Olefin Type | Olefin Metathesis Reactivity | Examples[a] |
|---|---|---|
| Type I | Rapid homodimerization, homodimer consumable | terminal olefins |
| Type II | Slow homodimerization, homodimer sparingly consumable | acrylates, acrylic acids, acrylamides |
| Type III | No homodimerization | allylic alcohol (protected) |
| Type IV | Olefins inert to CM, but do not deactivate the catalyst (Spectator) | vinyl nitro olefins |

[a]Selectivity depends on catalyst used. The examples shown are valid for Grubbs' 2nd generation catalyst.

Grubbs' Rules:
Reactions between two olefins of Type I=Statistical SM and CM
Reactions between two olefins of same type (non-Type 1)=Non-selective CM
Reactions between two different types (except Type IV)=Selective CM Sterically-hindered and electron-deficient olefins of type II and III have low metathesis reactivity and only slowly homodimerize, while more reactive terminal olefins (type I) readily undergo homodimerization via metathesis. Moreover, the homodimers of the terminal olefins are susceptible to subsequent secondary CM reactions. As a result, when a type I olefin is reacted with a type II or III olefin, high conversion to a CM product can be achieved by employing an excess of the type II or III olefin (Choi, T. L.; Chatterjee, A, K.; Grubbs, R. H., Synthesis of α, β-Unsaturated Amides by Olefin Crossmetathesis. *Angew. Chem. Int. Ed.* 2001, 40, (7), 1277).

The synthesis of cellulose derivatives containing carboxyl groups has been a long-standing and fascinating challenge. One issue is the problem of synthesizing derivatives with pendant carboxyl groups attached to a polysaccharide which also contains pendant hydroxyl groups; carrying out such a transformation under the acidic conditions commonly used to manufacture cellulose esters is almost inevitably accompanied by crosslinking due to ester formation between chains. This restricts such nucleophilic substitution chemistry to near-neutral or alkaline conditions, which work well for simple cases like reaction of cellulose with succinic anhydride (Li, W. Y.; Jin, A. X.; Liu, C. F.; Sun, R. C.; Zhang, A. P.; Kennedy, J. F., Homogeneous Modification of Cellulose with Succinic Anhydride in Ionic Liquid Using 4-Dimethylaminopyridine as A Catalyst. *Carbohydr. Polym.* 2009, 78, (3), 389-395) or adipic anhydride (Liu, H.; Kar, N.; Edgar, K., Direct Synthesis of Cellulose Adipate Derivatives Using Adipic Anhydride. *Cellulose* 2012, 19, (4), 1279-1293). Attachment of ω-carboxyalkanoates in which the intervening polymethylene chain is too long for facile cyclic anhydride formation is more complicated; in the past, it has been necessary to resort to protection/deprotection methodologies (Liu, H.; Ilevbare, G. A.; Cherniawski, B. P.; Ritchie, E. T.; Taylor, L. S.; Edgar, K. J., Synthesis and Structure-Property Evaluation of Cellulose ω-Carboxyesters for Amorphous Solid Dispersions. *Carbohydr. Polym.*, (2012), http://dx.doi.org/10.1016/j.carbpoJ.2012.11.049). Such difficulties are unfortunate since polysaccharide ω-carboxyalkanoates have many useful properties that enable important applications. In coating applications, the carboxylic acid functionality renders the derivatives water-soluble or water-dispersible, enabling waterborne and high solids coatings systems, thereby reducing the use of volatile organic solvents and enhancing coatings performance (Edgar, K. J.; Buchanan, C. M.; Debenham, J. S.; Rundquist, P. A.; Seiler, B. D.; Shelton, M. C.; Tindall, D., Advances in Cellulose Ester Performance and Application. *Prog. Polym. Sci.* 2001, 26, (9), 1605-1688). Cellulose derivatives containing carboxyl groups are also important components of drug delivery systems (Edgar, K. J., Cellulose Esters in Drug Delivery. *Cellulose* 2007, 14, (1), 49-64). Since carboxylic acids have pKa values in the range of 4-5, carboxyl-containing polysaccharides are protonated in the strongly acidic environment of the stomach, and are ionized in the near-neutral small intestinal milieu. This pH-sensitivity makes the derivatives good candidates for enteric polymeric coatings or matrices, which minimize drug/stomach exposure by preventing release until the formulation reaches the higher pH environment of the small intestine. Cellulose acetate phthalate (CAPhth) was one of the first polymers used for such pH-sensitive, controlled release coatings in drug delivery (Merkle, H. P.; Speiser, P., Preparation and in Vitro Evaluation of Cellulose Acetate Phthalate Coacervate Microcapsules. *J. Pharm. Sci.* 1973, 62, (9), 1444-8). Other esters of cellulose with pendant carboxylic acid groups including cellulose acetate succinate (CAS) (Wilken, L. O., Jr.; Kochhar, M. M.; Bennett, D. P.; Cosgrove, F. P., Cellulose Acetate Succinate as an Enteric Coating for Some Compressed Tablets. *J. Pharm. Sci.* 1962, SI, 484-90), hydroxypropyl methylcellulose phthalate (HPMCP) (Kim, I. H.; Park, J. H.; Cheong, I. W.; Kim, J. H., Swelling and Drug Release Behavior of Tablets Coated with Aqueous Hydroxypropyl Methylcellulose Phthalate (HPMCP) Nanoparticles. *J. Control. Release* 2003, 89, (2), 225-233) and hydroxypropyl methylcellulose acetate succinate (HPMCAS) have also proven interesting for enteric coating and controlled release.

Recent studies have shown the advantages of esters of cellulose with pendant carboxylic acids in delivery of poorly soluble compounds (Biopharmaceutical Classification System (BCS) Class II), by forming miscible blends of polymers and drugs, termed amorphous solid dispersions (ASDs). These molecularly dispersed drugs generate higher solution concentrations than achievable from the corresponding crystalline drugs, by maximizing drug surface area and eliminating the need for the drug to overcome its heat of fusion in order to dissolve. Supersaturated drug solutions generated from these ASDs can not only enhance the absorption of the drug from the gastrointestinal (GI) tract, but also provide a pH-controlled release profile. For example, HPMCAS has been proven to be an effective polymer for initiating and maintaining drug supersaturation in the GI tract, stabilizing the amorphous drug against crystallization, thereby in some cases enhancing drug bioavailability (Curatolo, W.; Nightingale, J. A.; Herbig, S. M., Utility of Hydroxypropylmethylcellulose Acetate Succinate (HPMCAS) for Initiation and Maintenance of Drug Supersaturation in the GI Milieu. *Pharm. Res.* 2009, 26, (6), 1419-1431; and Konno, H.; Taylor, L. S., Influence of Different Polymers on the Crystallization Tendency of Molecularly Dispersed Amorphous Felodipine. *J. Pharm. Sci.* 2006,95, (12), 2692-2705; BS Tanno, F.; Nishiyama, Y.; Kokubo, H.; Obara, S., Evaluation of Hypromellose Acetate Suctinate (HPMCAS) as a Carrier in Solid Dispersions. *Drug Dev. Ind. Pharm.* 2004, 30, (1), 9-17). More recently, the formation of ASDs of poorly water-soluble drugs and long-chain cellulose ω-carboxyalkanoates, i.e. cellulose adipate, suberate and sebacate derivatives, was investigated, and it was found that some of these polymers were highly effective at generating and maintaining supersaturated drug solutions by inhibiting nucleation and subsequent crystal growth (Ilevbare, G. A.; Liu, H.; Edgar, K. J.; Taylor, L. S., Understanding Polymer Properties Important for Crystal Growth Inhibition-Impact of Chemically Diverse Polymers on Solution Crystal Growth of Ritonavir. *Cryst. Growth Des.* 2012, 12, (6), 3133-3143; and Ilevbare, G. A.; Liu, H.; Edgar, K. J.; Taylor, L. S., Effect of Binary Additive Combinations on Solution Crystal Growth of the Poorly Water-Soluble Drug, Ritonavir. *Cryst. Growth Des.* 2012, 12, (12), 6050-6060; and Ilevbare, G. A.; Liu, H.; Edgar, K. J.; Taylor, L. S., Impact of Polymers on Crystal Growth Rate of Structurally Diverse Compounds from Aqueous Solution. *Mol. Pharm.* 2013, 10, (6), 2381-2393; and Ilevbare, G. A.; Liu, H.; Edgar, K. J.; Taylor, L. S., Maintaining Supersaturation in Aqueous Drug Solutions: Impact of Different Polymers on Induction Times. *Cryst. Growth Des.* 2013, 13, (2), 740-751). These studies also revealed that the DS of carboxylic acid functionality and the polymer hydrophobicity were key factors influencing the performance of the ASDs. The long side chains enhance the interactions of the polymers with hydrophobic drugs, while the pendant carboxylic acids provide both specific polymer-drug interactions and the pH-trigger for drug release through swelling of the ionized polymer matrix.

Thus, despite these investigations there remains a need in the art for advances in the synthesis of polysaccharide derivatives.

SUMMARY OF THE INVENTION

In embodiments, the present invention provides a method for converting polysaccharide derivatives bearing olefin substituents to a wide variety of new derivatives in which the substituent has been elaborated to contain a new functional group by olefin cross metathesis with an unsaturated substrate, to the exclusion of self-metathesis. In some embodiments, the present invention provides a method for converting fundamentally hydrophobic polysaccharide derivatives like esters and ethers into water-soluble derivatives by a simple olefin cross-metathesis reaction. In an exemplary embodiment, reaction of polysaccharide derivatives bearing terminal olefin groups with acrylates affords polysaccharide derivatives that are amphiphilic and are easily dispersed in water. Fundamentally hydrophobic polymer products of the invention that are readily dispersed in water can be used for a variety of applications including waterborne coating applications, adhesives, lubricants, or any product in need of dispersion in an aqueous media. In particular, coating applications may include industrial coatings of objects such as cars, furniture, appliances, or plastic goods such as computers, phones, or audio equipment.

Additional embodiments of the invention may include hydrogenation of the polysaccharide derivatives to eliminate the potential for radical-induced cross-linking during storage. In an exemplary embodiment, the cross-metathesis and hydrogenation reactions occur in the same vessel (i.e. one-pot reaction). Additional embodiments may include cross-metathesized products of the method of the invention as well as hydrogenated products of the cross-metathesized products.

BRIEF DESCRIPTION OF THE DRAWINGS

The accompanying drawings illustrate certain aspects of embodiments of the present invention, and should not be used to limit or define the invention. Together with the written description the drawings serve to explain certain principles of the invention.

Unless otherwise noted, chemical structures shown in the drawings and specification are not meant to imply regioselectivity; particular positions of substitution in all schemes are only for convenience of depiction and clarity.

Figures 1A, 1B, 1C:
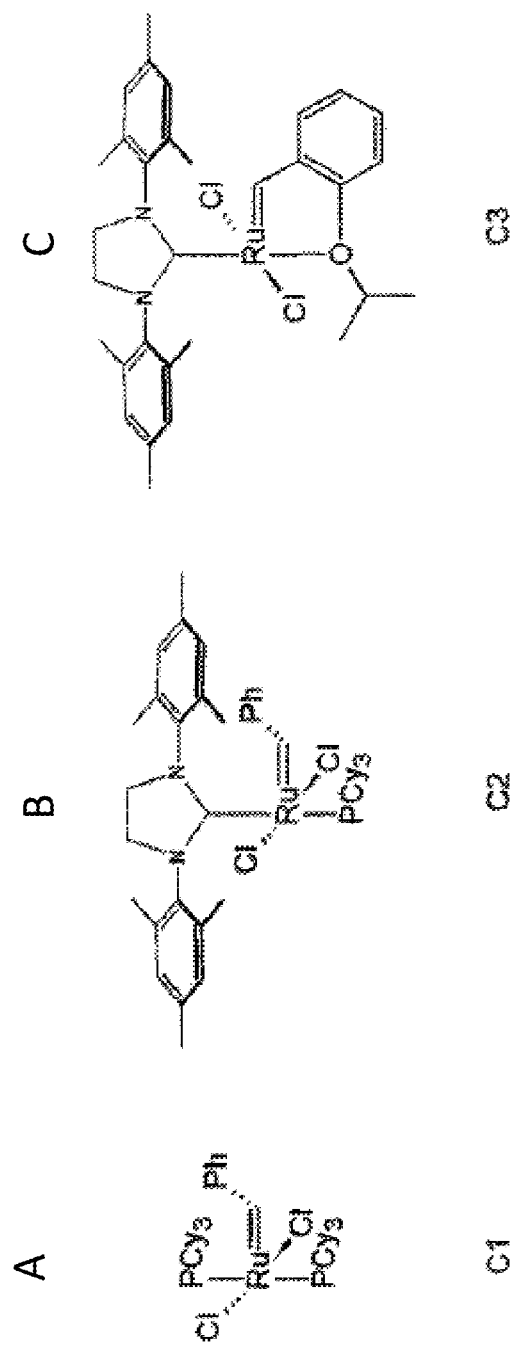

In the drawings and specification the following abbreviations are used AA=acrylic acid, MA=methylacrylate, HEA=hydroxyl ethyl acrylate, PEGMEA=poly(ethylene glycol) methyl ether acrylate, PPGA—poly(propyleneglycol) acrylate. The abbreviation convention "EC2.58C3AA" refers to EC=ethylcellulose, number=degrees of substitution, Cx=olefin side chain length AA=acrylic acid. Similar abbreviations are used throughout the drawings and specification.

FIG. 1A is a chemical formula showing Grubbs' $1^{st}$ generation catalyst.

FIG. 1B is a chemical formula showing Grubbs' $2^{nd}$ generation catalyst.

FIG. 1C is a chemical formula showing Hoveyda-Grubbs' $2^{nd}$ generation catalyst.

Figure 2:
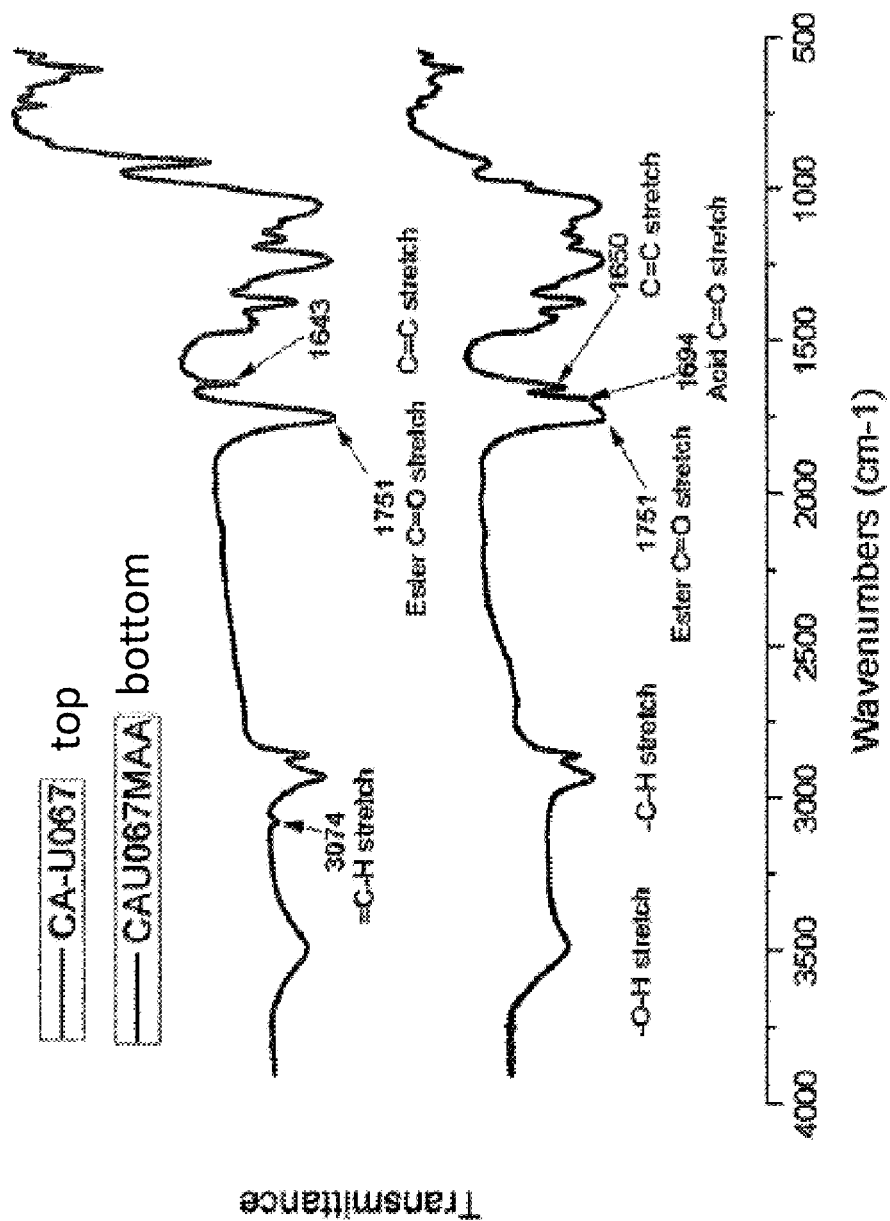

FIG. 2 is a diagram showing FTIR spectra of CA-U067 and CAU067MAA.

Figure 3A:
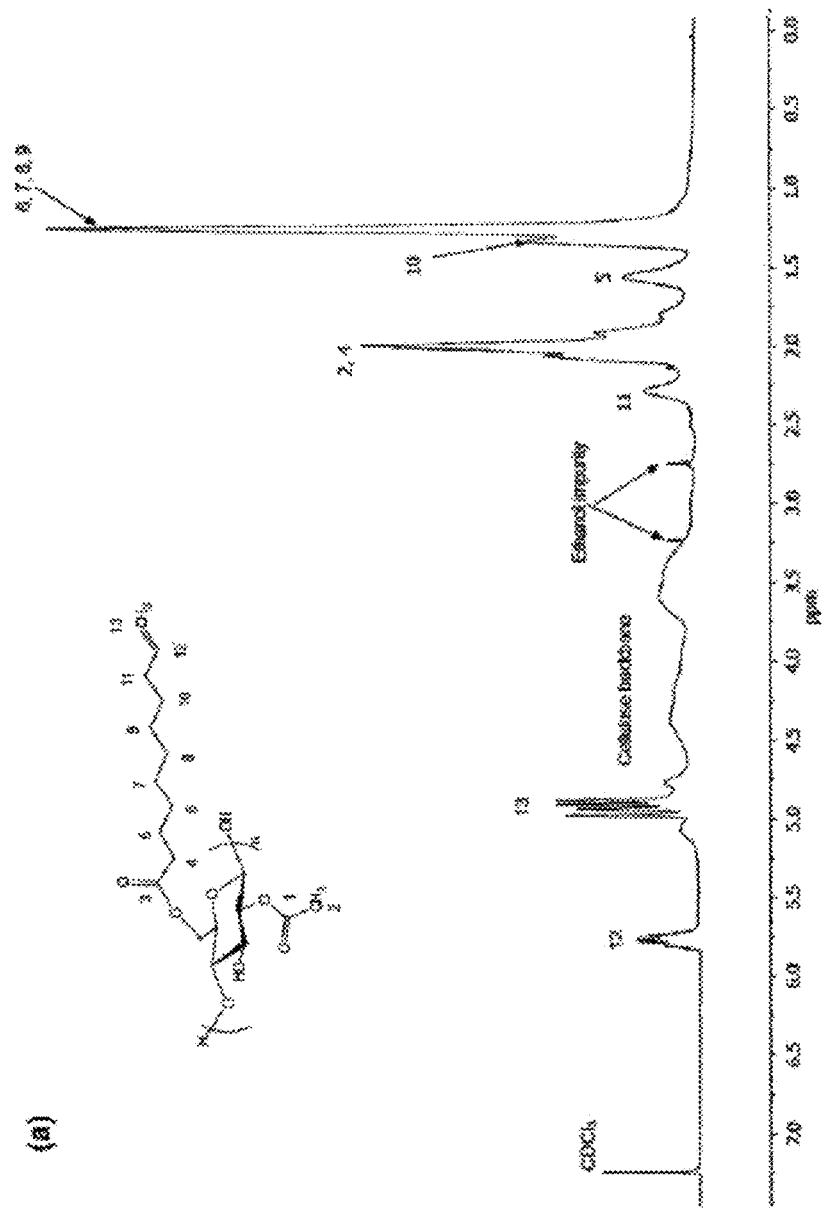
Figure 3B:
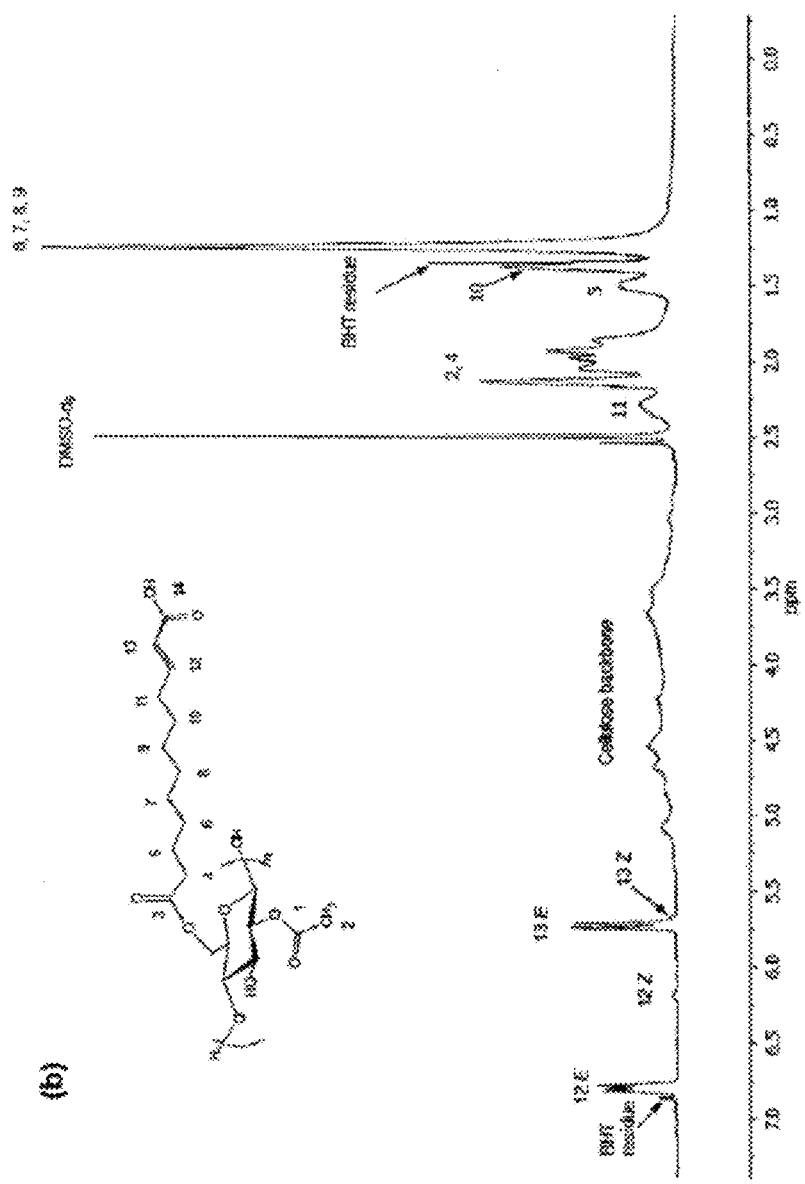

FIGS. 3A and 3B are diagrams showing $^1$H NMR spectra of CA-U067 (FIG. 3A) and CAU067MAA (FIG. 3B).

Figure 4A:
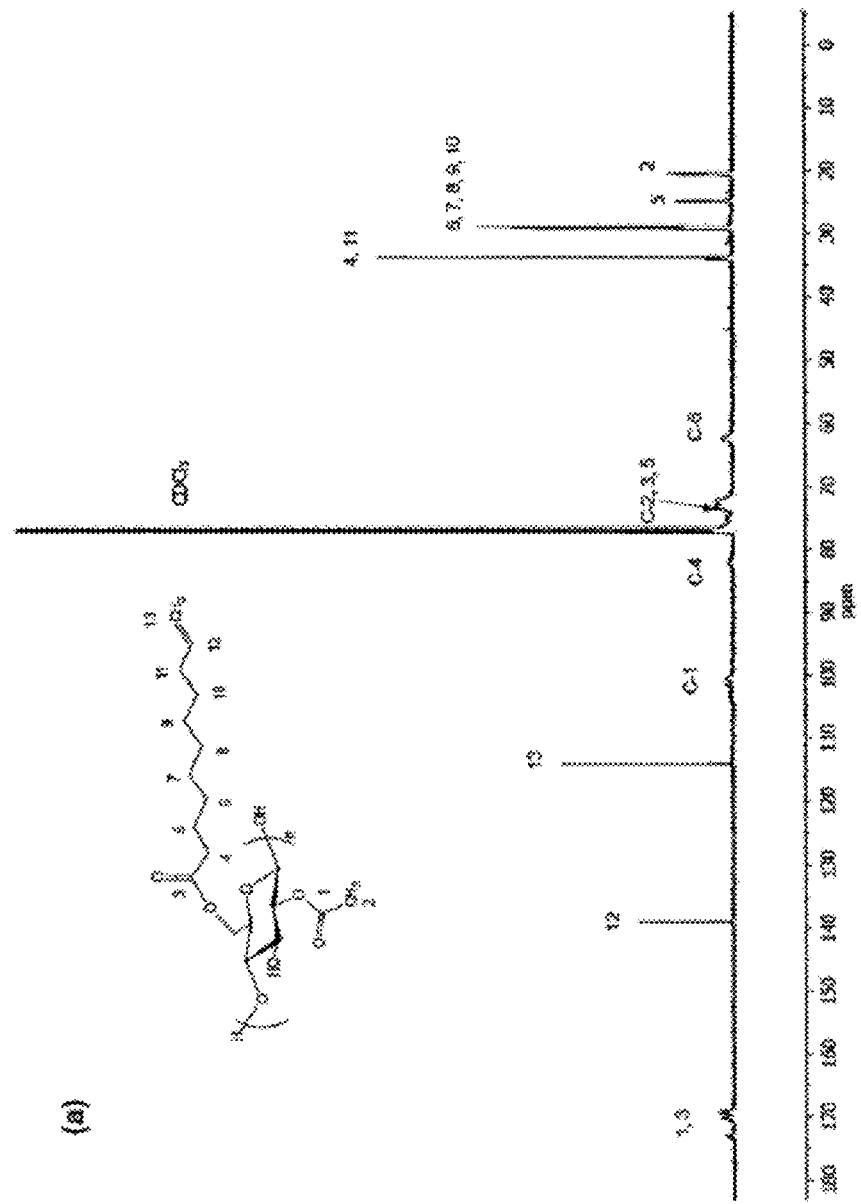
Figure 4B:
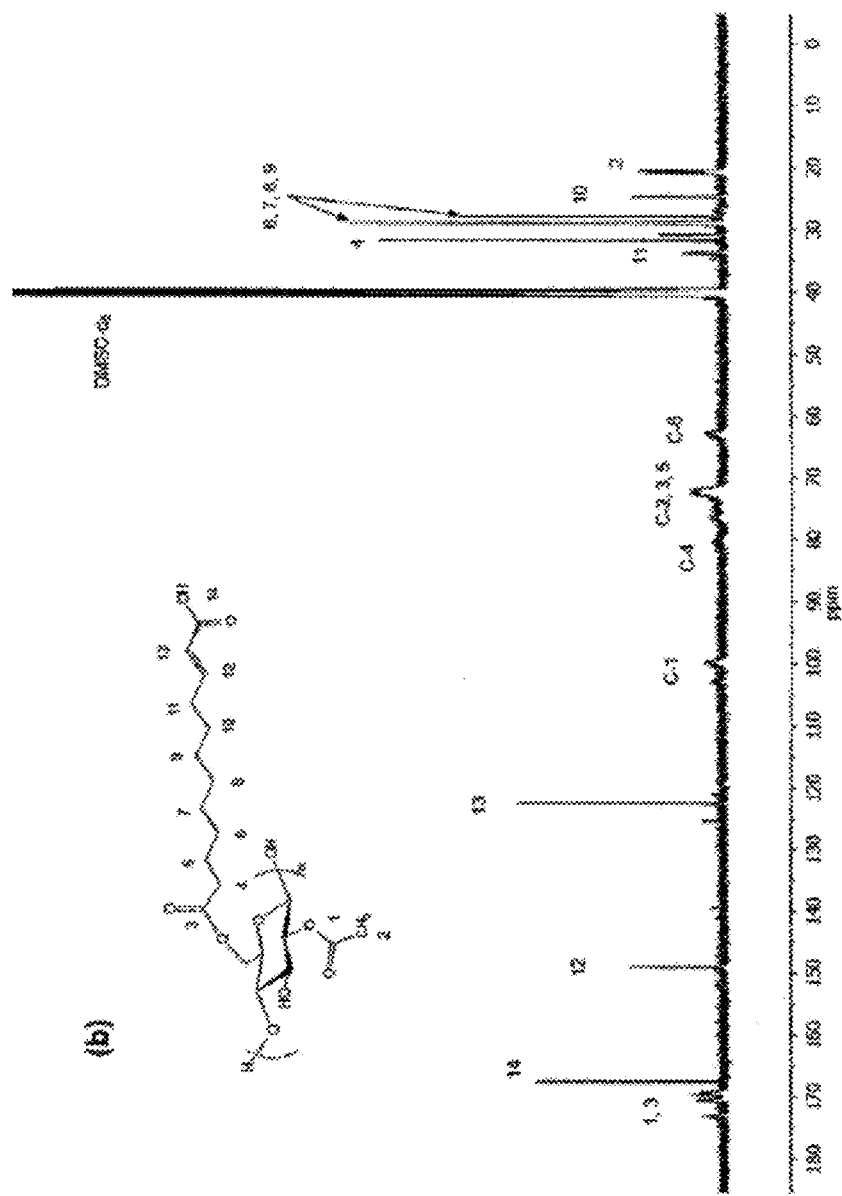

FIGS. 4A and 4B are diagrams showing $^{13}$C NMR spectra of CA-U067 (FIG. 4A) and CAU067MAA (FIG. 4B).

Figures 5A, 5B:
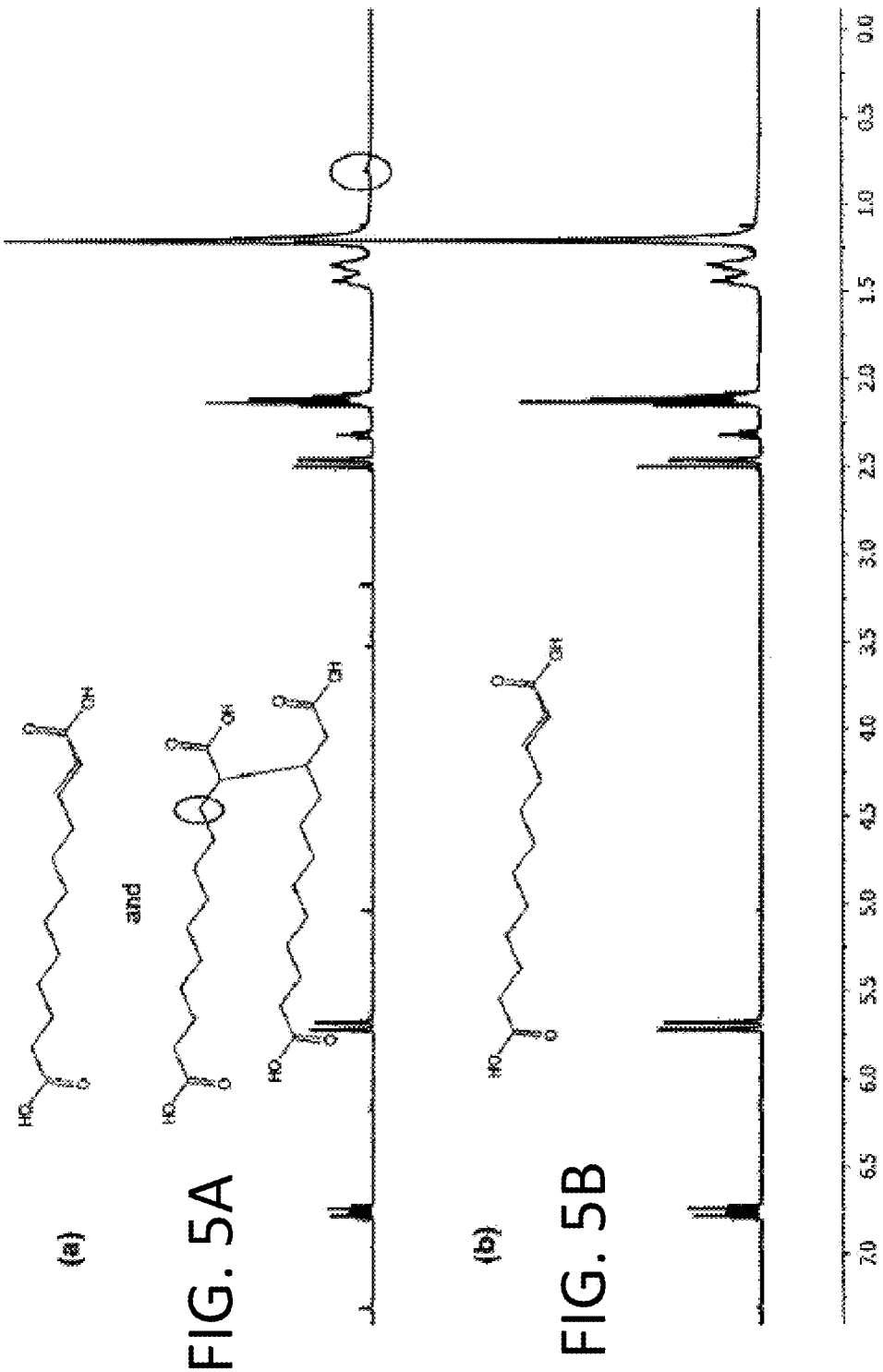

FIGS. 5A and 5B are diagrams showing $^1$H NMR spectra of alkaline hydrolysis products of cellulose esters having (FIG. 5A) and not having (FIG. 5B) solubility problems.

Figure 6:
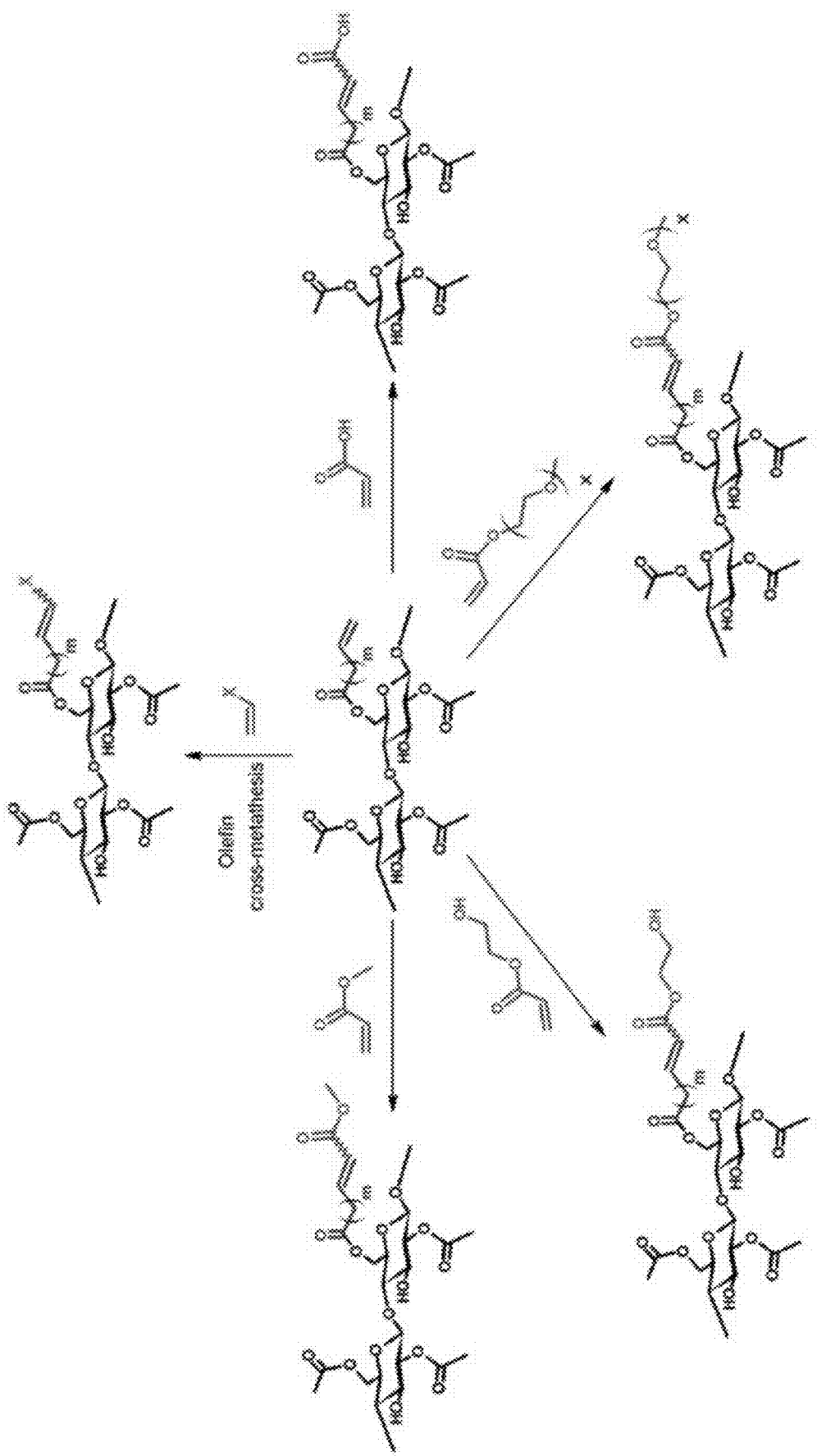

FIG. 6 is a schematic diagram showing a general scheme of olefin CM between terminally olefinic cellulose acetate and different CM partners.

Figure 7:
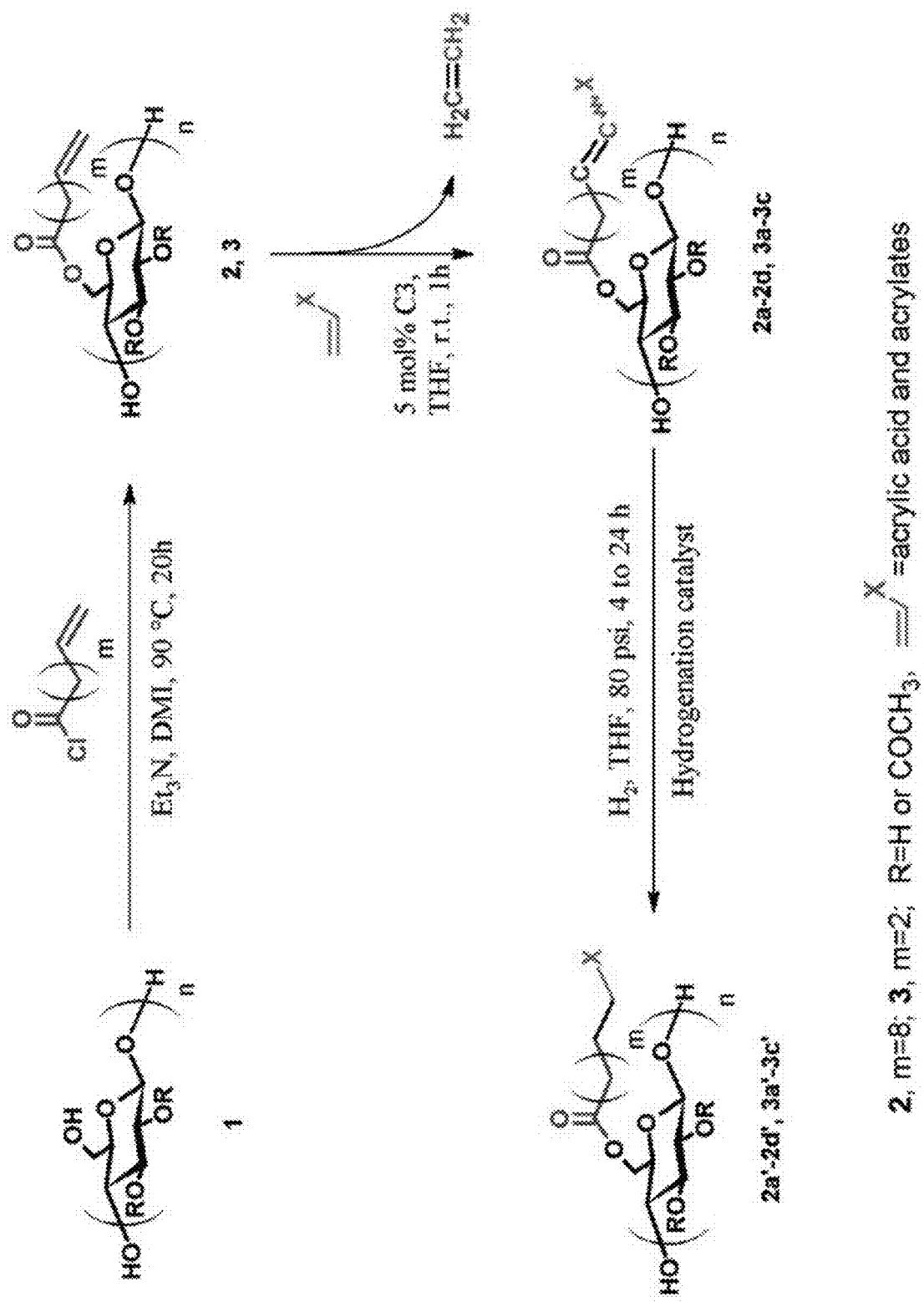

FIG. 7 is a schematic diagram showing a general three-step synthetic method for functionalized cellulose esters via olefin cross-metathesis.

Figure 8:
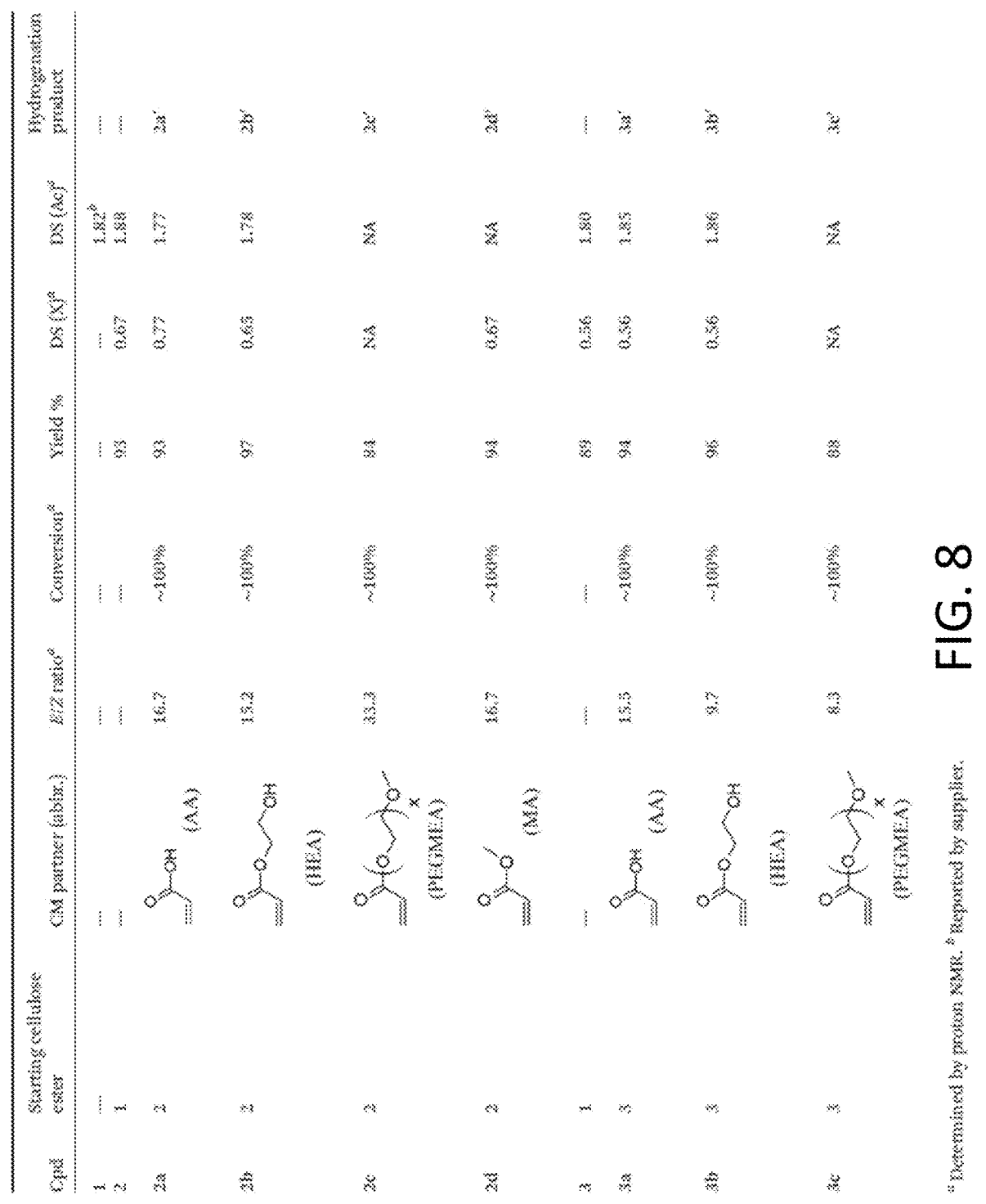

FIG. 8 is a table showing CM of olefin terminated cellulose acetate with acrylic acid and acrylates.

Figure 9:
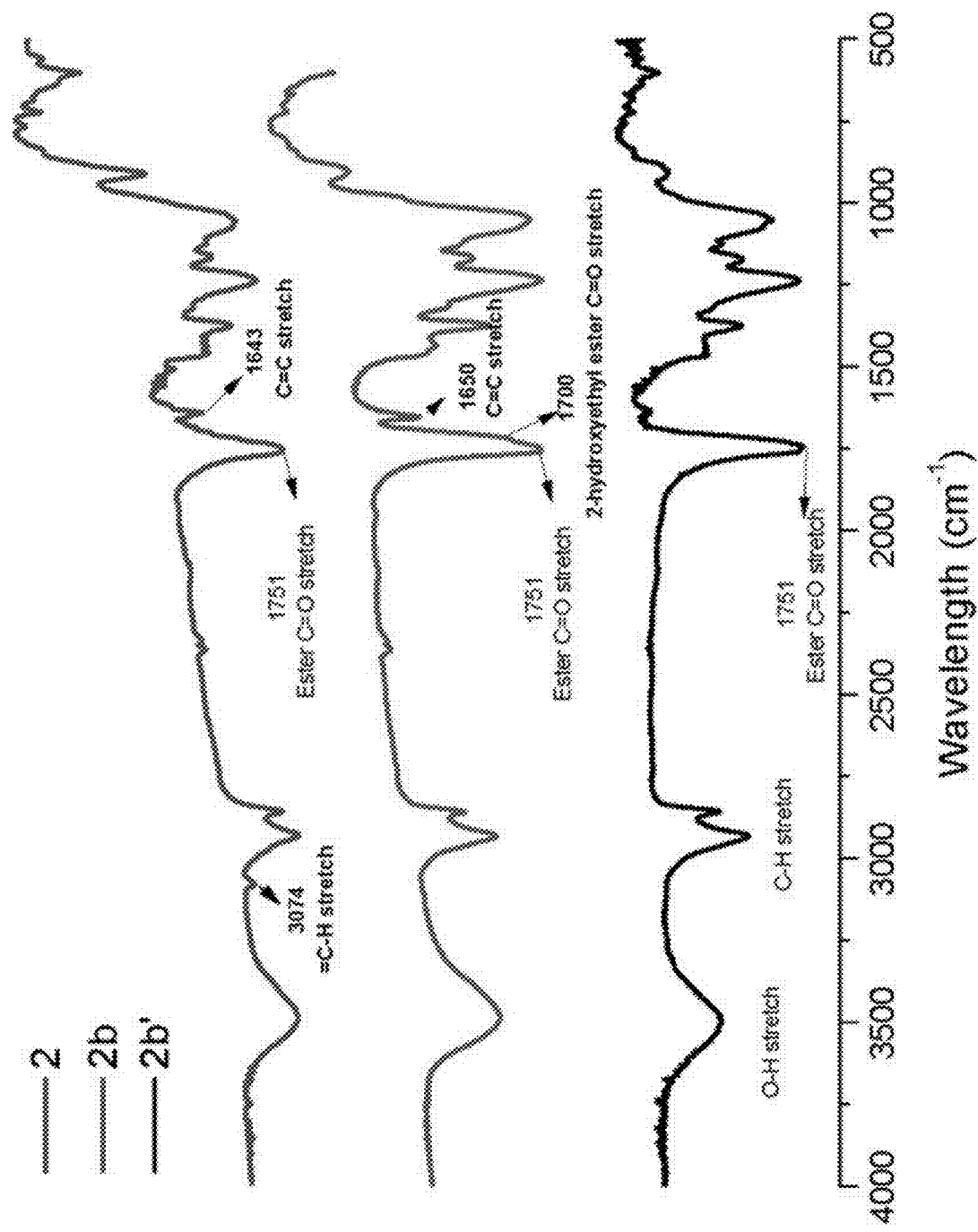

FIG. 9 is a diagram showing FTIR spectra of terminally olefinic cellulose acetate undec-10-enoate 2, the CM product (with HEA) 2b, and the hydrogenated product 2b'.

Figure 10:
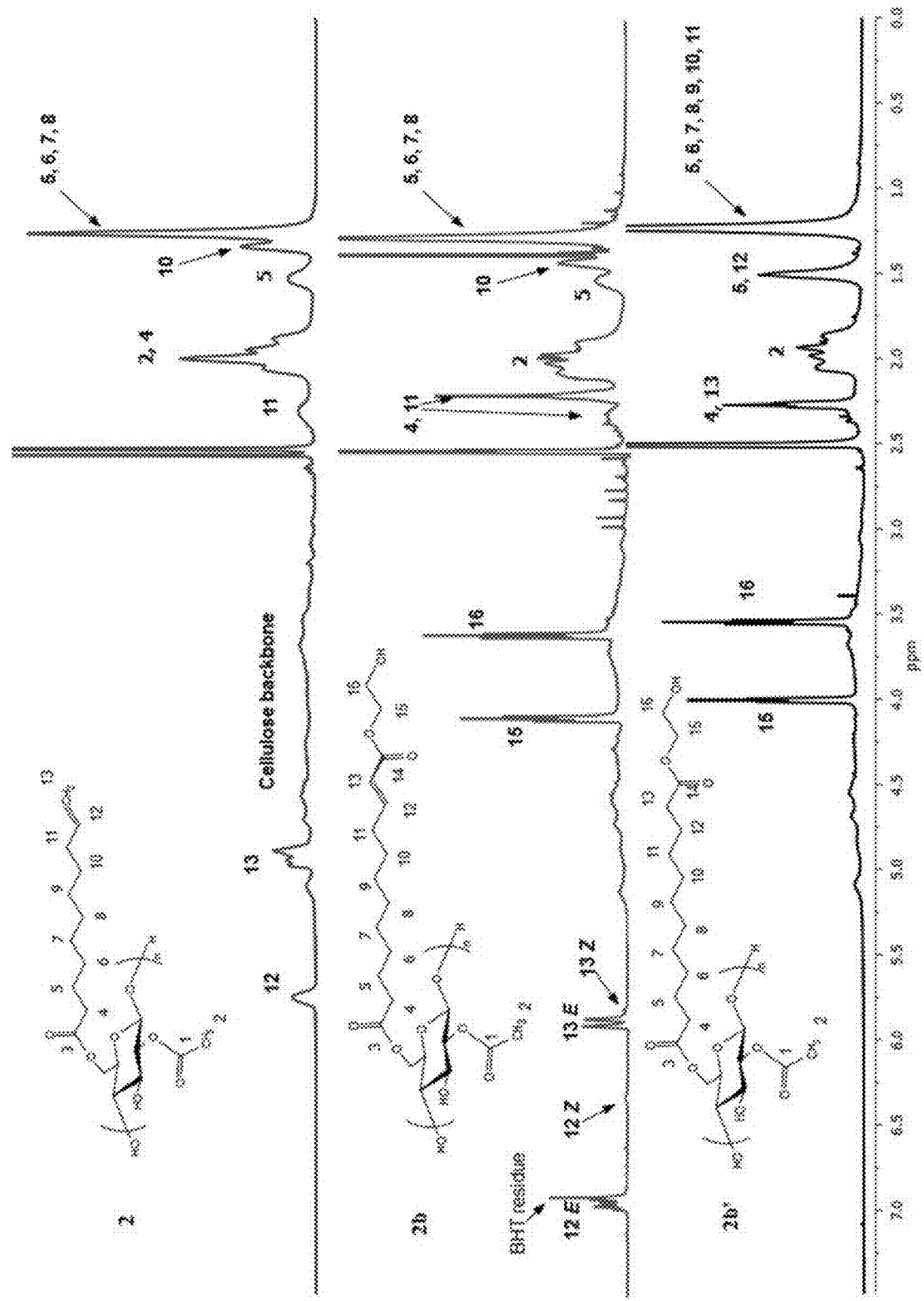

FIG. 10 is diagram showing $^1$H NMR spectra of terminally olefinic cellulose acetate undec-10-enoate 2, CM product (with HEA) 2b, and hydrogenated product 2b'.

Figure 11:
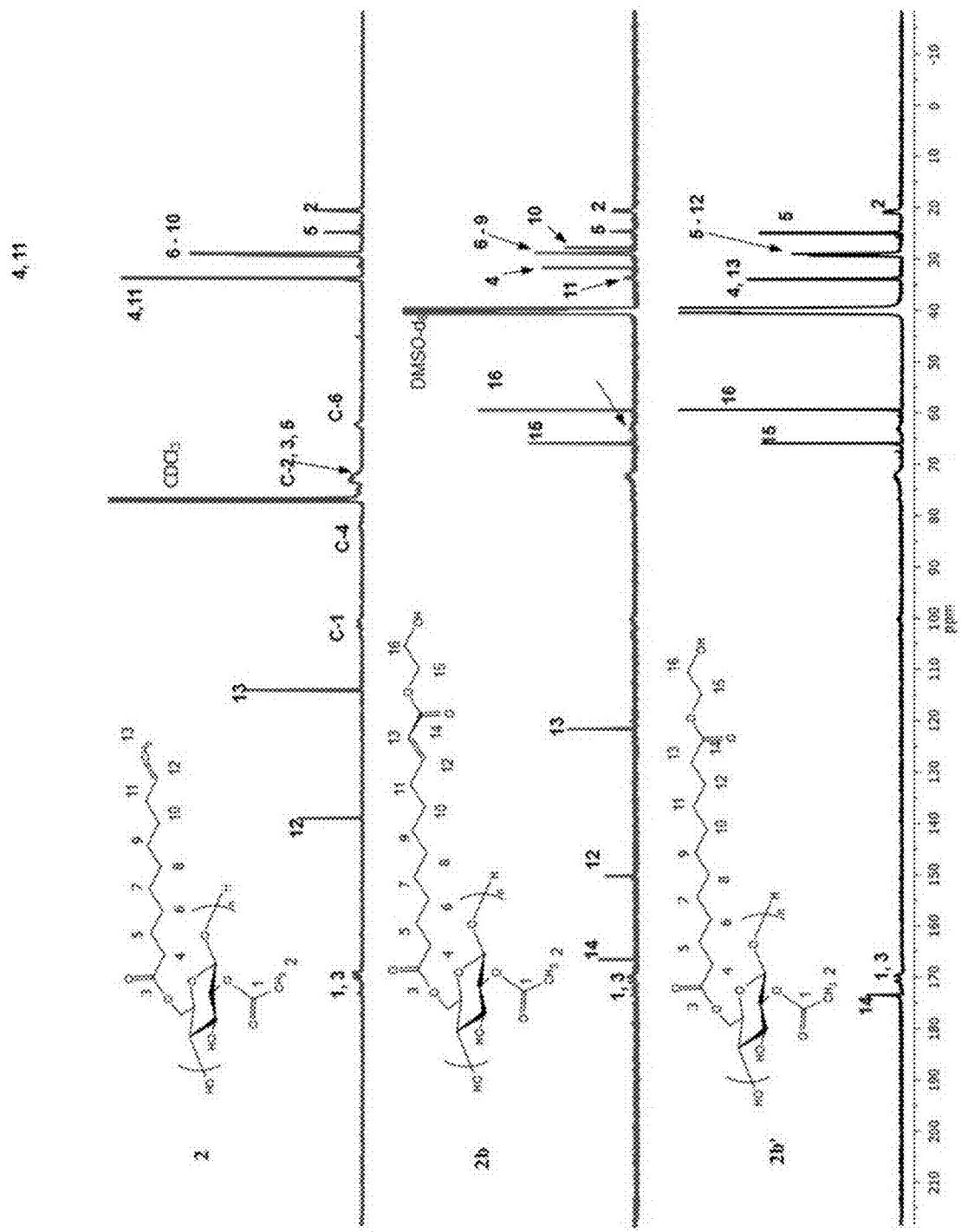

FIG. 11 is a diagram showing $^{13}$C NMR spectra of terminally olefinic cellulose acetate undec-10-enoate 2, CM product (with HEA) 2b, and hydrogenated product 2b'.

Figure 12:
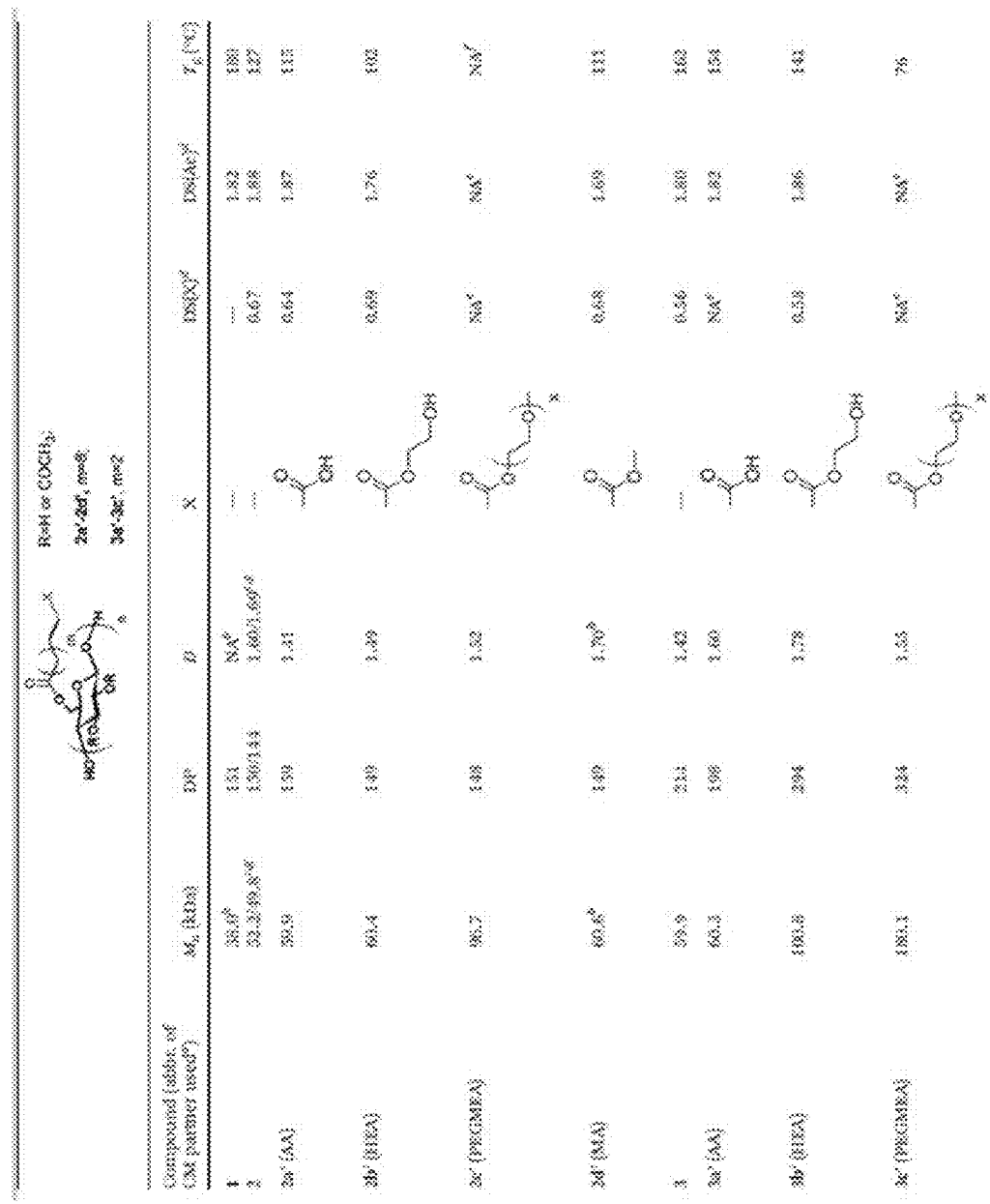

FIG. 12 is a table showing molecular weight, DS and $T_g$ of cellulose ester CM products.

Figure 13:
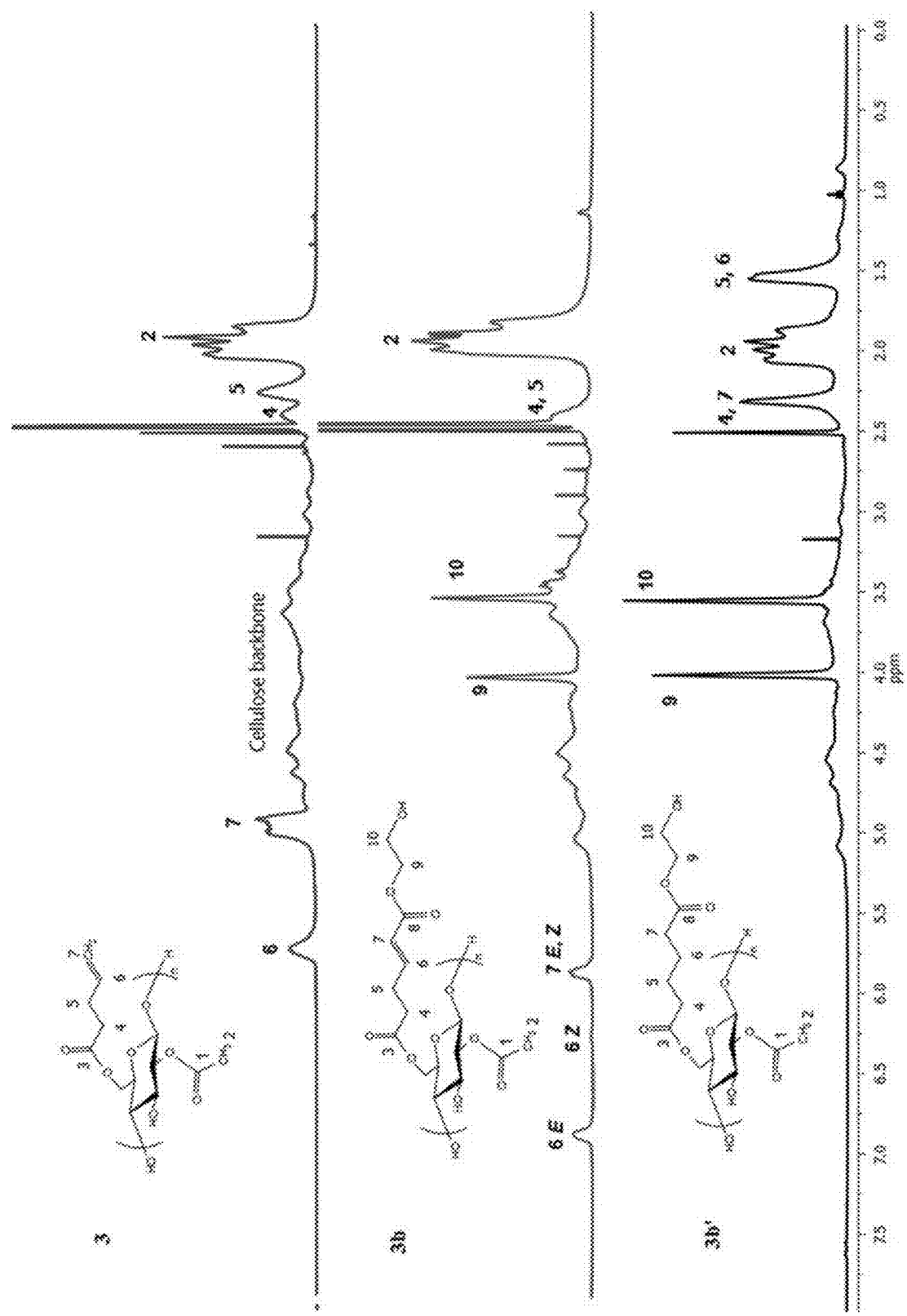

FIG. 13 is a diagram showing $^1$H NMR spectra of terminally olefinic cellulose acetate pent-4-enoate 3, CM product (with HEA) 3b, and hydrogenated product 3b'.

Figure 14:
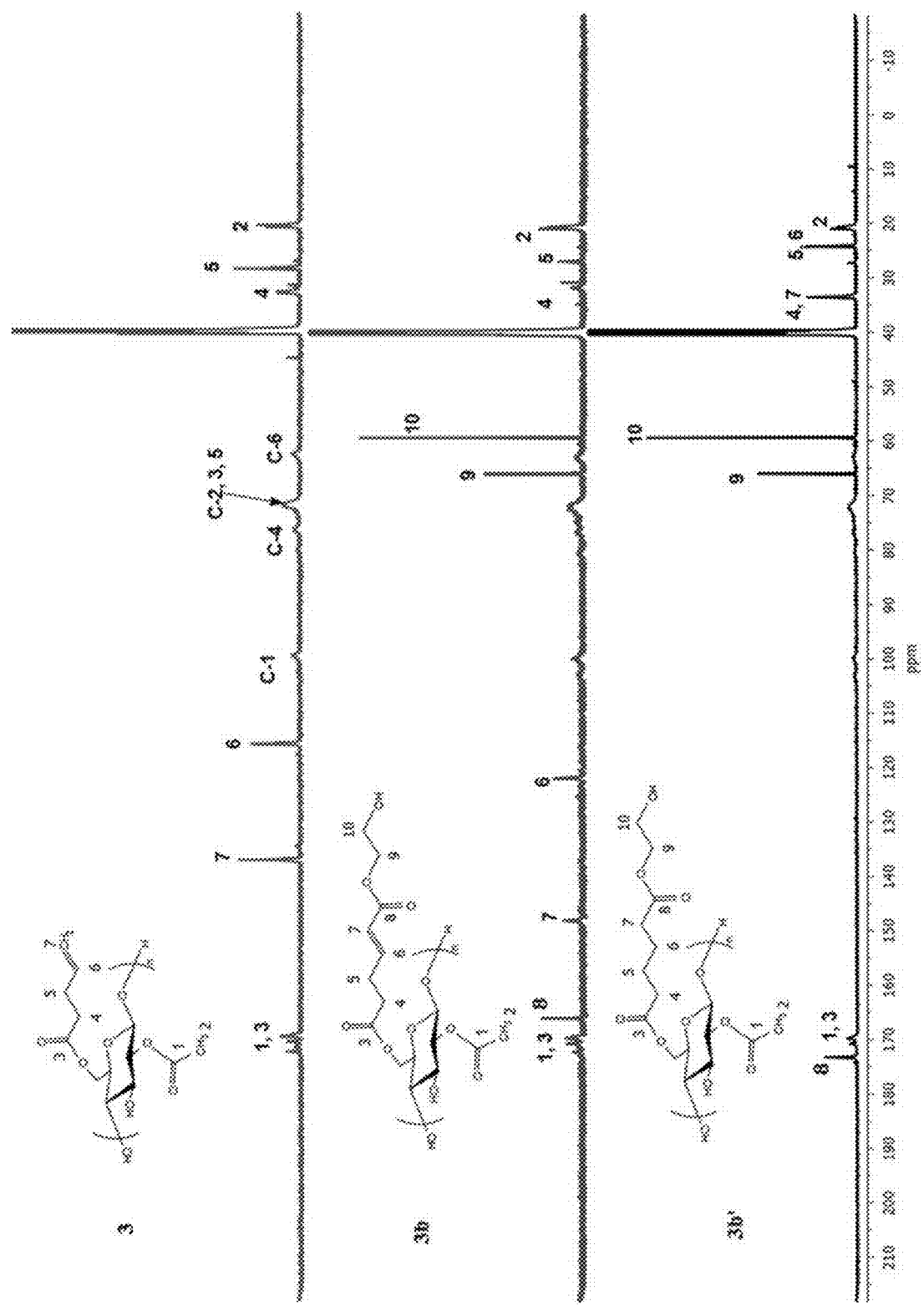

FIG. 14 is a diagram showing $^{13}$C NMR spectra of terminally olefinic cellulose acetate pent-4-enoate 3, CM product (with HEA) 3b, and hydrogenated product 3b'.

Figures 15A, 15B:
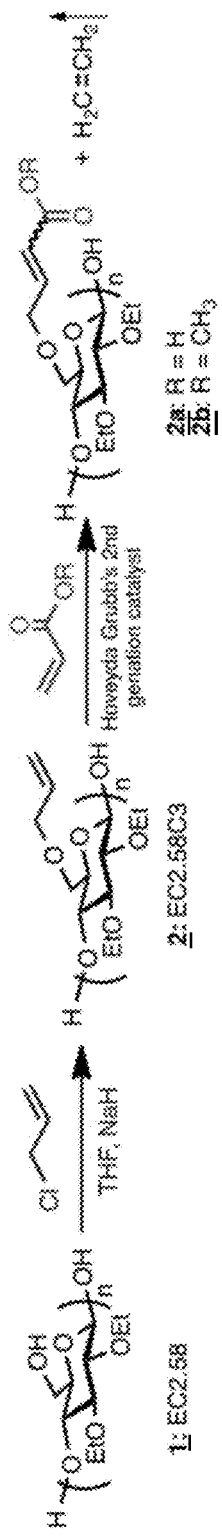

FIG. 15A is a schematic diagram showing synthesis of EC2.58C3 followed by CM with AA/MA.

FIG. 15B is a table showing CM results of EC2.58C3 with AA/MA.

Figure 16A:
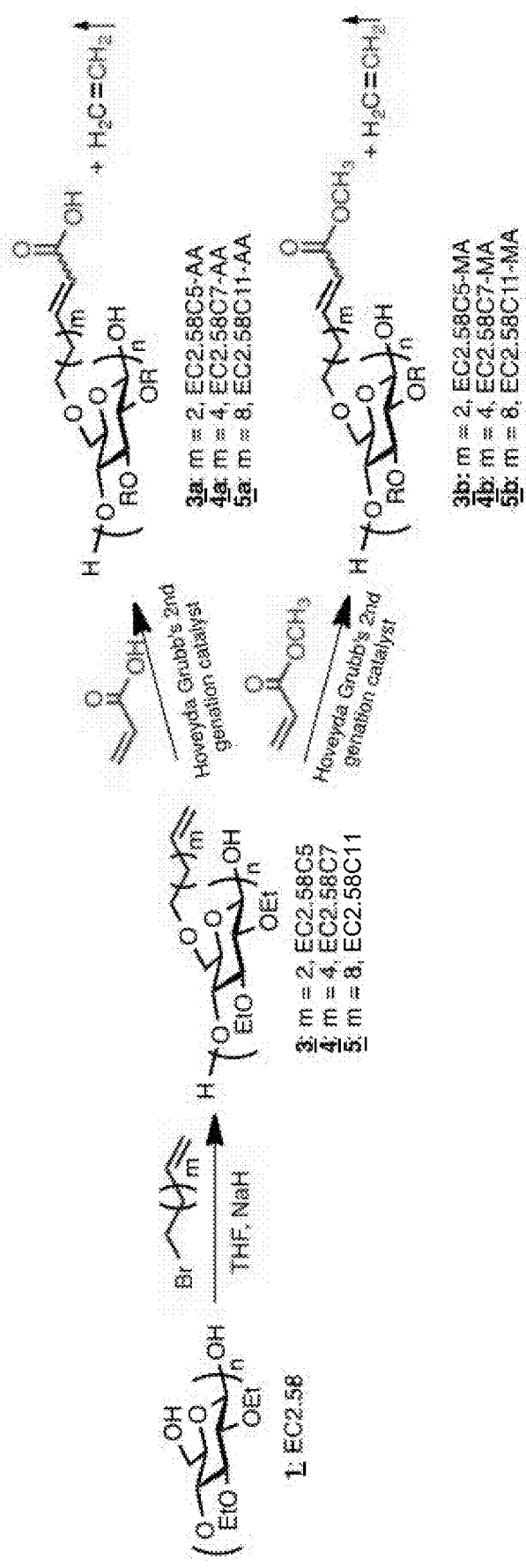

FIG. 16A is a schematic diagram showing modification of EC2.58 with ω-unsaturated alkyl halide followed by CM reaction with AA and MA.

FIG. 16B is a table showing cross-metathesis results of EC2.58C5, EC 2.58C7, and EC 2.58C11.

Figures 17A, 17B:
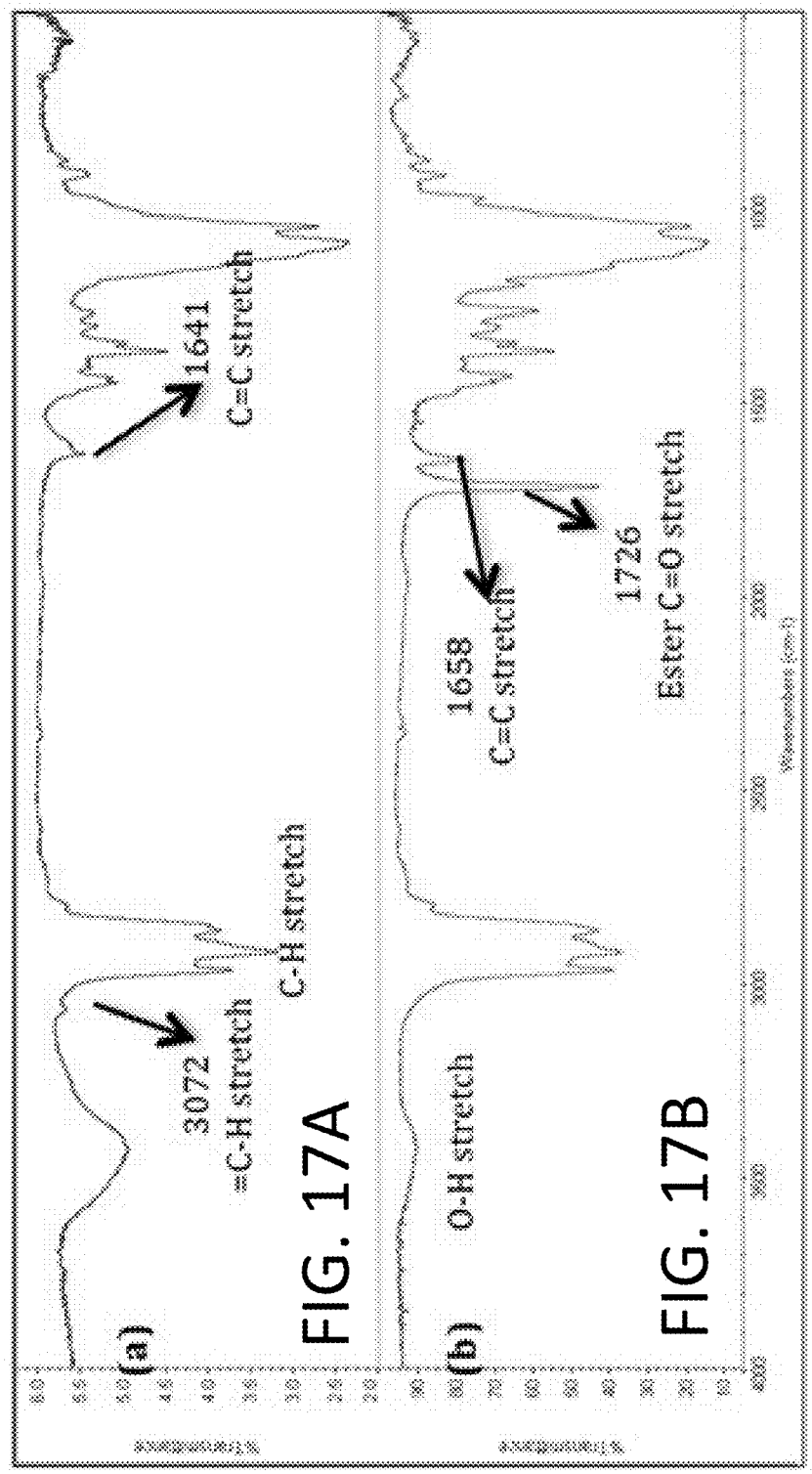

FIG. 17A is a diagram showing FT-IR spectra of EC2.58C5

FIG. 17B is a diagram showing FT-IR spectra of EC2.58C5-MA.

Figure 18A:
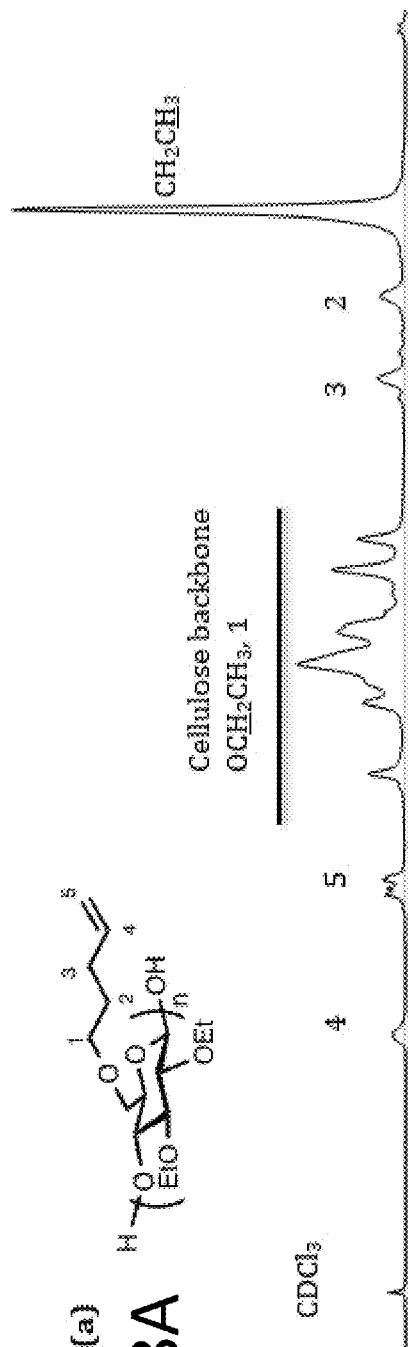

FIG. 18A is a diagram showing $^1$H NMR spectra of EC2.58C5.

Figure 18B:
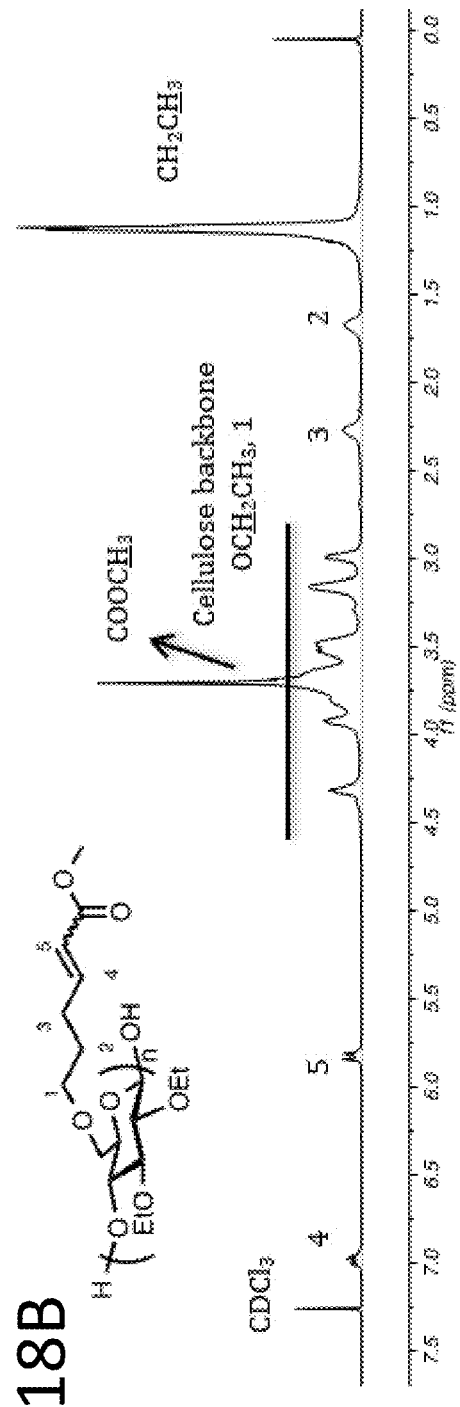

FIG. 18B is a diagram showing $^1$H NMR spectra of EC2.58C5-MA.

Figures 19A, 19B:
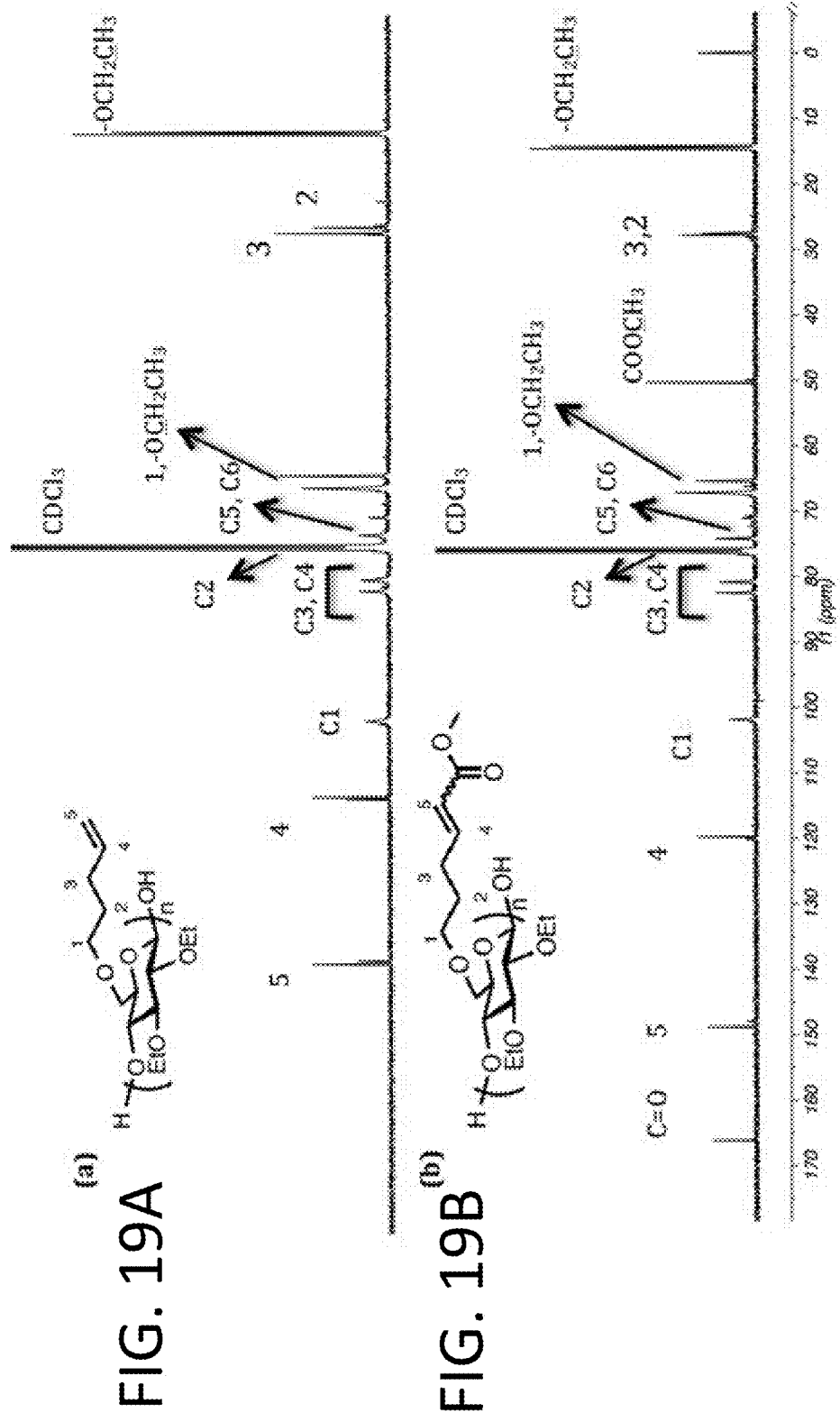

FIG. 19A is a diagram showing $^{13}$C NMR spectra of EC2.58C5.

FIG. 19B is a diagram showing $^{13}$C NMR spectra of EC2.58C5-MA.

Figures 20A, 20B:
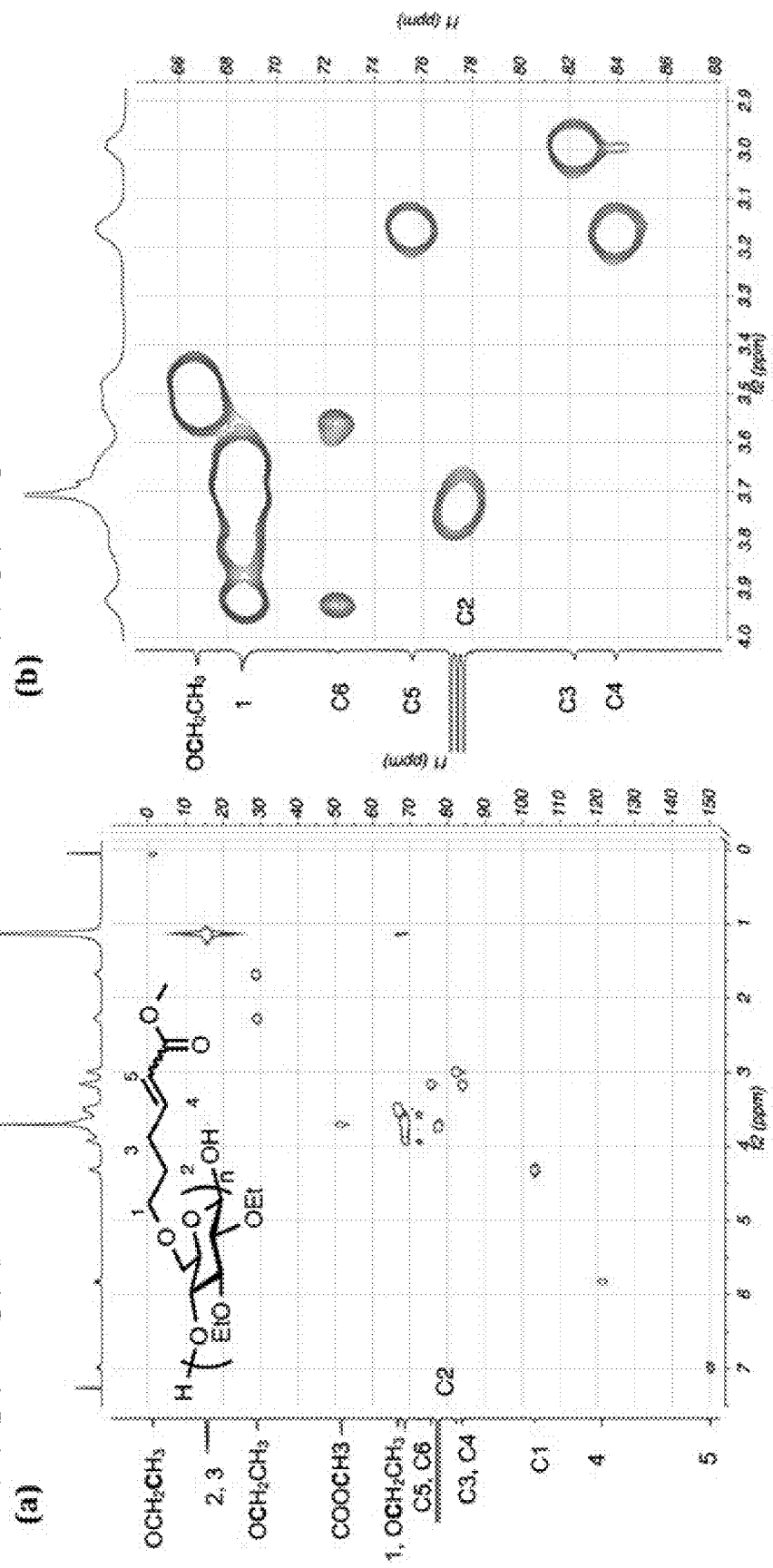

FIG. 20A is a diagram showing $^1$H-$^{13}$C HSQC spectrum of EC2.58C5-MA.

FIG. 20B is a diagram showing enlarged cellulose backbone region of FIG. 20A.

FIG. 21 is a table showing solubility of cellulose ether derivatives in various solvents.

FIG. 22 is table showing molecular weight and $T_g$ values for cellulose ethers and derivatives.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The present inventors have shown for the first time that cross-metathesis may be a useful method for the synthesis of polysaccharide derivatives. In one embodiment, the present invention provides a method for the synthesis of a cross-metathesized polysaccharide derivative, comprising: (a) providing or synthesizing a polysaccharide comprising one or more olefin-terminated side chains; (b) providing a solvent capable of dissolving the polysaccharide; (c) providing an acrylate, e.g., at an acrylate: terminal olefin ratio exceeding 1:1; (d) providing a catalyst, such as Hoveyda-Grubbs 2$^{nd}$ Generation Catalyst; and (e) reacting the acrylate and the polysaccharide in the solvent for a time and under conditions sufficient to obtain a cross-metathesized (CM) product of the polysaccharide. Additional embodiments also include (f) hydrogenating the CM product, e.g., by providing a hydrogenation catalyst and a hydrogen atmosphere to hydrogenate the cross-metathesized product.

Embodiments of the invention include methods of synthesizing polysaccharides having one or more olefin-terminated side chains, which can be used to synthesize cross-metathesized polysaccharide derivatives. In one embodiment, the olefin side chain has a chain length varying from 1-20 carbons, such as from 3 carbons to 11 carbons. In an exemplary embodiment, the synthesized olefin-substituted polysaccharides for use as starting materials are cellulose undec-10-enoate derivatives. A detailed procedure for the synthesis of cellulose undec-10-enoate derivatives is provided in the non-limiting Example 1 at the end of this Detailed Description. In this non-limiting Example, cellulose acetate propionate, cellulose acetate butyrate, or cellulose acetate was dissolved in 1,3-dimethyl-2-imidazolidinone or methyl ethyl ketone and heated to 60 or 90° C. under nitrogen. Triethylamine and 10-undecenoyl chloride were added and the reaction was allowed to proceed at 60 or 90° C. for 20 hours. The reaction mixture was filtered, and the filtrate was added to 50:50 water/ethyl alcohol to precipitate the product. The product was redissolved in a minimal amount of dichloromethane and reprecipitated in hexane; the product was then washed with hexane and dried under vacuum. Cellulose undec-10-enoate derivatives were prepared: cellulose acetate undec-10-enoate, cellulose acetate propionate undec-10-enoate, and cellulose acetate butyrate undec-10-enoate.

In another embodiment, the synthesized olefin-substituted polysaccharides for use as starting materials are pent-4-enoate derivatives or hept-4-enoate derivatives. In another embodiment, the synthesized olefin-substituted polysaccharides for uses as starting materials include ethyl cellulose substituted with allyl chloride, 5-bromo-1-pentene, 7-bromo-1-heptene, or 11-bromo-1-undecene. However, this invention contemplates that other polysaccharides bearing one or more olefin-terminated side chains may be used as starting materials, either synthesized or obtained commercially. For example, the polysaccharides may be linear or branched polysaccharide or oligosaccharide molecules comprising monosaccharide, disaccharide, or trisaccharide repeating monomer units. The repeating units may be chosen from glucose, sucrose, lactose, cellobiose, mannose, ribose, galactose, arabinose, fructose, sorbose, cellotriose and raffinose. Polysaccharides of the current invention include but are not limited to cellulose, cellulose ester, cellulose ether, amylose, amylopectin, curdlan, pullulan, dextran, chitin, chitosan, alginic acid, xylan, glucuronoxylan, glucomannan, galactoglucomannan, pectin, chondroitin sulfate, dermatan sulfate, hyaluronic acid, heparan sulfate, and heparin. Conceivably, any polysaccharide structure bearing terminal olefins may be used as starting material. The polysaccharide may bear any type of olefin-terminated side chain such that a very wide variety of olefin groups can be used in the method. Olefin groups ranging from 2 carbon atoms to 50 carbon atoms having at least one carbon-carbon double bond may be used in the method, including olefin groups with 1-4 carbon atoms, 5-10 carbon atoms, 10-16 carbon atoms, 12-20 carbon atoms, 18-30 carbon atoms, or 30-50 carbon atoms, or any number of carbon atoms in between. The olefin groups may be linear or branched, and unsubstituted or substituted with one or more functional groups, such as hydroxyl, carboxyl, carbonyl, amine, amide, aldehyde, carboxylate, ester, ether, nitrate, nitroso, sulfide, and sulfydryl. The olefin groups may comprise at least one heteroatom chosen from phosphorus, sulfur, oxygen, nitrogen, boron, chlorine, bromine, iodine, and fluorine. The polysaccharides bearing olefin groups may be obtained commercially or synthesized according to procedures described in the non-limiting Examples or in the scientific literature.

A wide variety of solvents can be used to dissolve the polysaccharide, including acetic acid, propionic acid, acrylic acid, tetrahydrofuran, dichloromethane, or trichloromethane. The particular solvent may be chosen depending on its ability to dissolve the particular polysaccharide used in the method. Additional solvents that may be used include, without limitation, $H_2O$, acetone, ethyl acetate, dimethyl sulfoxide (DMSO), dimethylformamide (DMF), N,N-dimethylacetamide (DMAc), N,N-dimethylimidazolidinone (DMI), and isopropyl alcohol. These and other solvents may be chosen based on the relative hydrophobicity or hydrophilicity of the polysaccharide or the type and number of charged groups.

In other embodiments, the method may further comprise providing a free radical scavenger. The free radical scavenger may be butylated hydroxytoluene or butylated hydroxyanisole. The free radical scavenger may be added to the solvent before or at the time that the polysaccharide is added (prior to the metathesis reaction), or it may be added to the reaction mixture at the completion of the metathesis reaction.

In other embodiments, one or more post-CM reactions including hydrogenation, Michael addition, and thiol-ene reactions may also be performed on the CM products to get rid of the unsaturation and thus eliminate the instability of the CM product caused by the α, β-unsaturation. Hydrogenation may be performed in heterogeneous (Pd/C catalyst) or homogeneous conditions (Crabtree's or Wilkinson's catalyst) to totally reduce the α, β-unsaturation without altering other functionalities ($H_2$, 20-150 psi; 3-24 hours). However, other hydrogenation catalysts known in the art may be used, including $PtO_2$ and Ra—Ni. In one embodiment, hydrogenation catalyst (Pd/C) may be added directly to the reaction mixture after completion of CM, and the reaction mixture subjected to hydrogen pressure, to provide a one-pot reaction. In one embodiment, the hydrogen pressure is at least 20 psi.

One exemplary embodiment provides for a one-pot reaction comprising the following steps: (a) providing or synthesizing a cellulose derivative comprising one or more olefin-terminated side chains; (b) providing a solvent capable of dissolving the cellulose derivative; (c) providing an acrylate, e.g., at an acrylate: terminal olefin ratio exceeding 1:1; (d) providing a catalyst, such as Hoveyda-Grubbs $2^{nd}$ Generation Catalyst; and (e) reacting the acrylate and the cellulose derivative in the solvent for a time and under conditions sufficient to obtain a cross-metathesized product of the polysaccharide and (f) hydrogenating the CM product, e.g., by providing a providing a hydrogenation catalyst and a hydrogen atmosphere to hydrogenate the cross-metathesized product.

The α, β-unsaturation may also serve as a handle for Michael addition and thiolene reaction. Under catalysis of a base such as triethylamine, compounds containing Michael donors such as amino and thiol groups may be added to the α, β-unsaturation. A reaction between the α, β-unsaturation and a thiol containing compound may also occur via thiol-ene mechanism where a free radical initiates the reaction. In cases where mono-functional amino/thiol compounds such as 3-mercaptopropionic acid are employed, discrete adducts may be obtained along with a new functional group (carboxylic acid in the case of 3-mercaptopropionic acid). In other embodiments, the reaction between a CM product with a multi-functional amino/thiol compound such as PEG dithiol may lead to a cross-linked product, which may be useful as a hydrogel, a water-swellable film or a thermoset resin.

Once the olefin-substituted polysaccharide material has been obtained or synthesized, the cross-metathesis partner may be obtained. As used herein, the term "cross-metathesis partner" refers to a compound that undergoes a cross-metathesis reaction with a particular starting material. Examples of such cross-metathesis reactions with terminally olefinic cellulose acetate are shown in FIG. 6. In embodiments of the invention, the cross-metathesis partner may be an acrylic acid, an acrylate (such as, but not limited to methyl acrylate, 2-hydroxyethyl acrylate, methyl ether acrylate, poly(ethylene glycol) methyl ether acrylate (PEG-MEA), poly(propylene glycol) acrylate (PPGA), ethyl acrylate, propyl acrylate, isopropyl acrylate, butyl acrylate, isobutyl acrylate, 2-ethylhexyl acrylate, 2-hydroxypropryl acrylate, ethylene glycol monoacrylate, ethylene glycol diacrylate, diethylene glycol diacrylate, triethylene glycol diacrylate, propylene glycol diacrylate, 1,3-propanediol diacrylate, 1,4-butanediol diacrylate, 1,6-hexanediol diacrylate, pentaerythritol triacrylate, and trimethylolpropane triacrylate), a methacrylate (such as, but not limited to butyl methacrylate, methyl methacrylate, ethyleneglycol dimethacrylate, and hydroxyethyl methacrylate), or an acrylamide (such as, but not limited to acrylamide, N,N-dimethylacrylamide and N-phenyl acrylamide). Thus, in some cases, such as acrylic acid, the cross-metathesis partner may serve as both solvent and cross-metathesis partner reagent. In other embodiments, the cross-metathesis partner may be an alcohol such as allyl alcohol or 3-buten-2-ol. In other embodiments, the cross-metathesis partner may be N-vinylpyrrolidone. In other embodiments, the cross-metathesis partner may be a protected allylamine such as phthalimide or succinimide-protected amines. The cross-metathesis partner could conceivably be any compound with an appropriate olefinic group. Specific cross-metathesis partners can for example include acrylates, acrylamides, acrylic acid, acrolein, vinyl ketones, unprotected tertiary allylic alcohols, vinyl epoxides, secondary allylic alcohols, perfluorinated alkyl olefins, 1,1-disubstituted olefins, non-bulky tri-substituted olefins, vinyl phosphonates, phenyl vinyl sulfone, quaternary allylic carbons, and protected tertiary allylic alcohols. Even further, cross-metathesis partners can be chosen from amino acids (protected or unprotected), mono-, oligo- and polysaccharides (protected or unprotected), DNA, nucleotides, or other nucleobases (protected or unprotected) that bear any of the functional groups noted above. It is preferred and most conducive to cross-metathesis rather than self-metathesis when one partner is an electron rich olefin and the other is an electron poor olefin.

Embodiments of the method of the invention provide that the cross-metathesis partner is provided in excess of the terminal olefin side chain such that the cross-metathesis partner:terminal olefin ratio exceeds 1:1. In embodiments, for synthesis of certain functionalized and cross-linked products the ratio can be less than 1:1. In other embodiments, the cross-metathesis partner:terminal olefin ratio is in a range of 1:1 to 50:1 or any ratio in between, including 2:1, 4:1, 5:1, 8:1, 10:1, 12:1, 15:1, 18:1, 20:1. 25:1, 30:1, 35:1, 40:1, or 45:1. Additional information on the molar, mass, and/or volume ratio of these and other reactants may be obtained in the non-limiting Examples 1-3. While not intended to be limiting, these serve as guidance for a skilled artisan to reproduce the method in their hands.

Hoveyda-Grubbs 2nd Generation Catalyst, which is known in the art, may be added, preferably once the reagents are dissolved. Its chemical structure is shown in FIG. 1C. In embodiments, the amount of Hoveyda-Grubbs' 2nd Generation Catalyst may be at least 3 mol %. In other embodiments, the amount of Hoveyda-Grubbs 2nd Generation Catalyst may be in the range of 0.1 to 2 mol %, 0.5 to 5 mol %, 2 to 20 mol %, 3 to 12 mol %, 6 to 12 mol %, 4 to 8 mol %, 5 to 10 mol %, or any range in between. It is within the capabilities of a skilled artisan to choose the amount of catalyst based on the reactants used in the synthesis method. In some embodiments the catalyst is added last, in other embodiments it added prior to or with the other reagents. A skilled artisan will recognize different orders of addition of the reagents that do not sacrifice the efficiency of the reaction.

In embodiments, conditions to obtain a cross-metathesized product of the polysaccharide may be relatively mild, ranging anywhere from a temperature of room temperature to 50° C. or any temperature in between, including room temperature to 30° C., room temperature to 35° C., 30 to 35° C., 35 to 40° C., 40 to 45° C., 35 to 45° C., 30 to 50° C., 40 to 50° C., 45 to 50° C., or any range in between. Additionally, reaction times may vary from 0.5 hour to 24 hours or any time in between, including 1 to 2 hours, 1 to 3 hours, 1 to 4 hours, 1 to 5 hours, 2 to 4 hours, 3 to 6 hours, 5 to 10 hours, 10 to 20 hours, 15 to 24 hours, or any range in between. In one embodiment, the cross-metathesis reaction occurs at least at room temperature for at least one hour. The reaction may proceed by stirring the reagents under nitrogen for the stated temperatures and times. In embodiments, the reaction may be terminated by adding ethyl vinyl ether or diethylene glycol monovinyl ether. The products may be precipitated by addition of or to water or other appropriate non-solvent for the cross-metathesis product, and washed by water or other non-solvent before being dried under vacuum. In certain cases, if the CM product cannot be precipitated, dialysis may be applied.

Embodiments of the invention include methods employing scaled-up reactions for use in industrial-scale cross-metathesis reactions. For example, the solvents and reagents may be provided in batch reactors with a capacity ranging from 1 liter to 15,000 liters. The solvents and reagents may be introduced by connections into the reactor and mixed by an agitator. Reaction temperatures and times may be controlled through a programmable interface. These embodiments are particularly useful for industrial scale chemical manufacture. The fast and mild nature of the cross-metathesis reaction described herein may in some cases lend itself to continuous manufacturing processes. Furthermore, with many cross-metathesis partners (e.g., acrylic acid), the excess partner reagent is unchanged under the reaction conditions, and so can be readily recovered and recycled so as to minimize waste and cost in a manufacturing process.

In an exemplary embodiment, the method of the present invention can be used for the synthesis of cellulose derivatives that exhibit water-soluble properties and are hydrogenated to prevent cross-linking. In an exemplary embodiment, cellulose or its derivatives (A) with a terminal olefin side-chain (B) react with acrylates (C) in a CM reaction under the catalysis of Hoveyda-Grubbs' 2nd generation catalyst. The reaction completes within 2 hours at room temperature. In addition, a further hydrogenation reaction can be performed on the cross-metathesis product to reduce the formed α, β-unsaturated double bond. In an exemplary embodiment, the CM reaction and hydrogenation reaction occur in the same reaction vessel (i.e. one-pot reaction).

In embodiments, cellulose or its derivatives (A) include but are not limited to cellulose; cellulose esters (e.g, CA, CAB, and CAP) and cellulose ethers.

In embodiments, the terminal olefin side-chain (B) has a chain length varying from 3 carbons to 11 carbons. The DS of the olefin side-chain on cellulose or its derivatives varies from 0 to 3.0.

In embodiments, the acrylates (C) may include methyl acrylate, 2-hydroxyethyl acrylate, methyl ether acrylate, poly(ethylene glycol) methyl ether acrylate (PEGMEA), and poly(propylene glycol) acrylate (PPGA) as demonstrated in the Examples. In other embodiments, the acrylates may include other compounds non-limiting examples of which include ethyl acrylate, propyl acrylate, isopropyl acrylate, butyl acrylate, isobutyl acrylate, 2-ethylhexyl acrylate, 2-hydroxypropryl acrylate, ethylene glycol monoacrylate, ethylene glycol diacrylate, diethylene glycol diacrylate, triethylene glycol diacrylate, propylene glycol diacrylate, 1,3-propanediol diacrylate, 1,4-butanediol diacrylate, 1,6-hexanediol diacrylate, pentaerythritol triacrylate, and trimethylolpropane triacrylate. The acrylates may also include methacrylates non-limiting examples of which include butyl methacrylate, methyl methacrylate, ethyleneglycol dimethacrylate, hydroxyethyl methacrylate.

A general, three-step scheme for the reaction is provided below and is also shown schematically in FIG. 7.

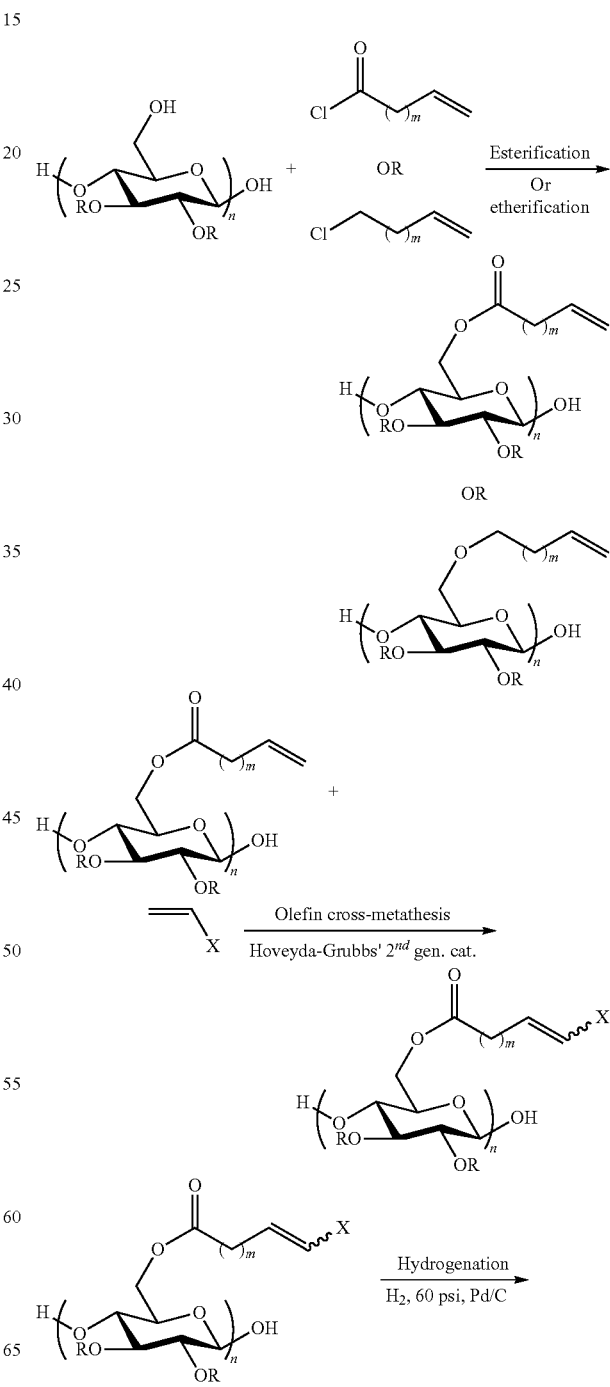

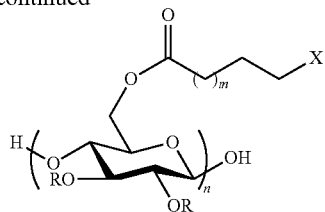

Wherein:
R can be H, ethyl, methyl, acetyl, propionyl and butyryl
m=0–8

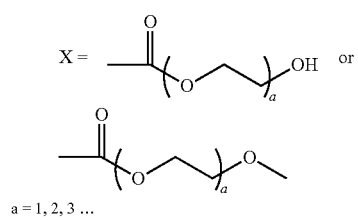

a = 1, 2, 3 ...

n=10–10,000

In non-limiting Example 1, which will is provided in detail below, commercially available cellulose esters were first acylated with undec-10-enoyl chloride, providing esters with olefin-terminated side chains. Subsequent cross-metathesis of these terminal olefin moieties with acrylic acid was performed in solvents selected from a group that includes acrylic acid, THF, DMF, DMAc, DMI, and CH$_2$Cl$_2$ In non-limiting Example 1 of this disclosure, complete conversion to discrete, soluble cross-metathesis products was achieved by using an excess of acrylic acid and the Hoveyda-Grubbs' 2nd generation ruthenium catalyst. Oligomerization during storage, caused by a free radical mechanism, was observed and successfully suppressed by the addition of a free radical scavenger (BHT). Furthermore, the cross-metathesis products exhibited glass transition temperatures ($T_g$s) that were at least 50° C. higher than ambient temperature, supporting the potential for application of these polymers as amorphous solid dispersion matrices for enhancing drug aqueous solubility.

The process demonstrated in the non-limiting Example 1 of this disclosure can be applied to any polysaccharide containing an appropriate olefinic group, in combination and reaction with any reaction partner containing an appropriate olefinic group. While no one had previously shown conditions for synthesis of discrete, soluble polysaccharide derivatives by olefin metathesis, there have been studies of olefin cross metathesis (CM) reactions of small molecules. As a result of these studies, a set of rules have been developed that are now termed "Grubbs' Rules"; these rules are the product of work in Professor Robert Grubbs' laboratory. The olefin-substituted polysaccharides and the appropriate monomeric olefin partners appear to follow Grubbs rules as summarized herein.

TABLE 2

Example combination of polysaccharides bearing terminal olefinic side-chains and CM partners.

| Example polysaccharide | Olefinic R group | Example CM partner |
|---|---|---|
| Cellulose 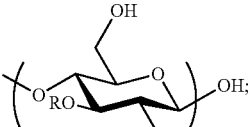 | 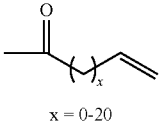 x = 0–20 | 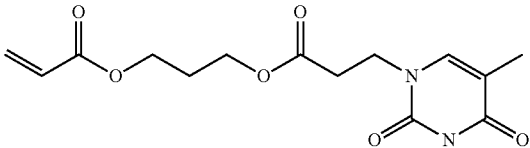 |
| or | | or |
| Dextran 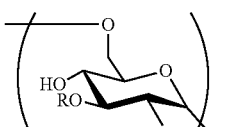 | | 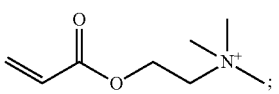 |
| or | | or |
| Chitosan 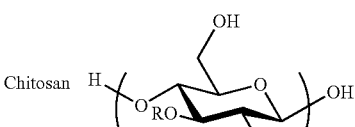 | | 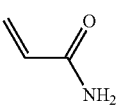 |

The cellulose derivatives (e.g., olefin-substituted polysaccharides) used in the non-limiting Example 1 of this disclosure include cellulose acetate undec-10-enoate, cellulose acetate butyrate undec-10-enoate, cellulose acetate propionate undec-10-enoate, cellulose acetate pent-4-enoate, cellulose acetate pent-4-enoate propionate, and cellulose acetate butyrate pent-4-enoate, with DS of undec-10-enoate or pent-4-enoate ranging from 0.47 to 1.28. Hoveyda-Grubbs' catalyst 2nd generation ((1,3-bis-(2,4,6-trimethylphenyl)-2-imidazolidinylidene)dichloro(o-isopropoxyphenylmethylene)ruthenium) has proven to be most useful as the olefin metathesis catalyst. In an exemplary embodiment, the conversion to CM can reach ca. 100% for CM partners including acrylic acid, acrylate esters (methyl acrylate, 2-hydroxyethyl acrylate and poly(ethylene glycol) methyl ether acrylate), and acrylamide. In other embodiments, such as for CM, partners including allyl alcohol, 3-buten-2-ol, dimethyl acrylamide and N-vinylpyrrolidone, only partial CM conversions may be achieved, varying from 30 to 75%, the precise value depending mainly on catalyst loading (6-12 mol %) and solvent used. For allylamine (unprotected), no obvious cross-metathesis was observed by $^1$H NMR at 6 mol % catalyst loading; however the inventors fully expect that protected allylamines or those otherwise less able to coordinate with and deactivate the ruthenium catalyst would work well (for example phthalimide or succinimide protected amines).

Further expanding on the work in Example 1, non-limiting Example 2 shows cross-metathesis of olefin terminated cellulose acetate with acrylic acid and acrylates. In Example 2, three representative acrylate partners were studied: methyl acrylate, 2-hydroxyethyl acrylate, and poly(ethylene glycol) ethyl ether acrylate (PEGMEA), as well as acrylic acid for comparison. These CM partners were reacted with cellulose esters bearing terminal olefins under mild conditions (40° C., 1 hour, THF solvent, 5 mol % Hoveyda-Grubbs catalyst, 20:1 ratio of acrylate to cellulose ester). Successful CM was observed with nearly 100% conversion observed (the table in FIG. 8). Additionally, non-limiting Example 3 explores CM of cellulose ethers with different side chain lengths reacted with similar acrylate partners. The results show that CM conversions were high for longer ethers, including C5, C7, and C11 (FIG. 16B).

In an exemplary embodiment, the present invention provides a method for the synthesis of a cellulose ω-carboxyester, having the reaction:

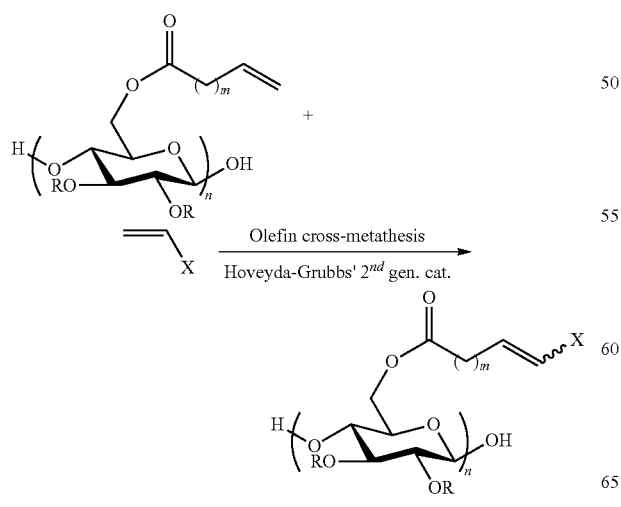

wherein:
R can be H, ethyl, methyl, acetyl, propionyl and butyryl
m=0–8

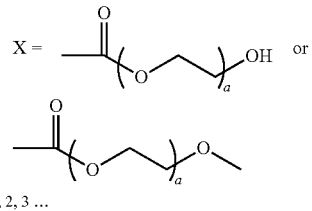

a = 1, 2, 3 ...

n=10-10,000

In an exemplary embodiment, the cross-metathesized polysaccharide derivative product is a cellulose acetate monodec-10-endioate (CADod), a cellulose acetate butyrate monododec-2-endioate (CABDod), or a cellulose acetate propionate monododec-2-endioate (CAPDod). More particularly, the cross-metathesized polysaccharide derivative product may include CADod067, CADod128, CABDod036, and CABDod051 (number refers to degree of substitution of the olefin-containing substituent modified by the metathesis reaction; 067 e.g. means 0.67 substituents per monosaccharide unit). Conceivably, the product may have a wide range of olefin densities, and is therefore not limited to these particular examples. The scope of the invention may include products of the method not described explicitly herein.

In another exemplary embodiment, the cross-metathesized polysaccharide derivative product is one or more of 2a-2d and 3a-3c or their hydrogenated products 2a'-2d' and 3a'-3c' as defined in Example 2 and corresponding figures.

In another exemplary embodiment, the cross-metathesized polysaccharide derivative product is 2a (EC2.58C3-AA), 2b (EC2.58C3-MA), 3a (EC2.58C5-AA), 3b (EC2.58C5-MA), 3c (EC2.58C5-HEA), 3d (EC2.58C5-PEGMEA), 3e (EC2.58C5-PPGA), 4a (EC2.58C7-AA), 4b (EC2.58C7-MA), 5a (EC2.58C11-AA), or 5b (EC2.58C11-MA) as defined in Example 3 and corresponding figures.

Another embodiment of the invention includes a compound having the formula:

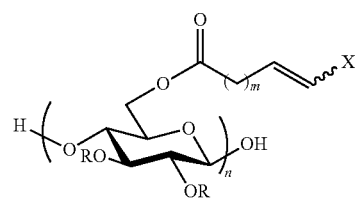

wherein:
R can be H, ethyl, methyl, acetyl, propionyl and butyryl
m=0–8

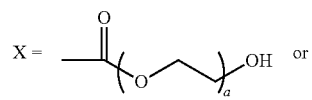

-continued

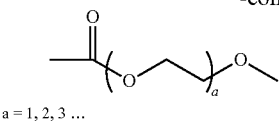

a = 1, 2, 3 ...

n=10-10,000

Another embodiment of the invention includes a compound having the formula:

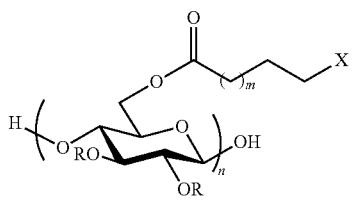

wherein:

R can be H, ethyl, methyl, acetyl, propionyl and butyryl
m=0–8

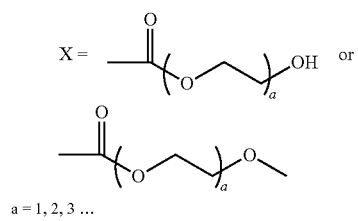

a = 1, 2, 3 ...

n=10-10,000

Particularly advantageous properties of the cross-metathesized products of the invention include dispersibility in aqueous media. In an exemplary embodiment, the present invention provides an aqueous solution, suspension, or colloid comprising a cross-metathesized polysaccharide derivative or hydrogenated product thereof described herein. In another exemplary embodiment, the present invention provides a commercial product comprising a cross-metathesized polysaccharide derivative or hydrogenated product thereof described herein. The commercial product may be or contain a waterborne coating, adhesive, lubricant that contains a cross-metathesized polysaccharide derivative described herein. Commercial products with waterborne coatings containing compounds of the invention may include by way of non-limiting example cars, furniture, appliances, or plastic goods such as computers, phones, or audio equipment. Commercial products with adhesives containing compounds of the invention may include by way of non-limiting example glues, tape, paper goods, and wood products. Commercial products with lubricants containing compounds of the invention may include by way of non-limiting example motors, engines, machinery, hydraulic systems, automobiles, airplanes. Included within the scope of the invention is any commercial product containing compounds of the invention in any form.

EXAMPLES

The following Examples are intended to illustrate certain principles of the invention. It is not intended to limit the scope of the invention. The principles disclosed in the Example are not limited to the particular reagents and parameters described herein and have broader applicability as recognized by a skilled artisan.

In Example 1, commercially available cellulose esters were first acylated with 10-undecenoyl chloride, providing esters with olefin-terminated side chains. Subsequent cross-metathesis of these terminal olefin moieties with acrylic acid was performed in solvents including acrylic acid, THF, and $CH_2Cl_2$. Complete conversion to discrete, soluble cross-metathesis products was achieved by using the Hoveyda-Grubbs second generation ruthenium catalyst and an excess of acrylic acid. Oligomerization during storage, caused by a free radical mechanism, was observed and successfully suppressed by the addition of a free radical scavenger (BHT). Furthermore, the cross-metathesis products exhibited glass transition temperatures (Tg) that were at least 50° C. higher than ambient temperature, supporting the potential for application of these polymers as amorphous solid dispersion matrices for enhancing drug aqueous solubility.

In Example 2, cellulose acetate was acylated with two terminally olefinic acid chlorides, pent-4-enoyl chloride and undec-10-enoyl chloride, providing olefin-terminated cellulose esters with different side-chain lengths. These α, β-unsaturated cellulose esters were then reacted with a variety of cross-metathesis partners, including acrylic acid, methyl acrylate, 2-hydroxyethyl acrylate, poly(ethylene glycol) methyl ether acrylate, acrylamide, and allyl alcohols, using Hoveyda-Grubbs' 2nd generation catalyst.

Complete conversion to cross-metathesis products was achieved in reactions with acrylic acid or acrylates using 3-5 mol % catalyst at 40° C. within 1 h. Successful hydrogenation of these α, β-unsaturated esters and acids was then demonstrated, thereby eliminating the potential for radical-induced crosslinking during storage.

In Example 3, starting from commercially available ethyl cellulose, terminally unsaturated alkyl groups were appended as metathesis handles: allyl chloride, 5-bromo-1-pentene, 7-bromo-1-heptene and 11-bromo-1-undecene to represent different side chain lengths (C3, C5, C7, and C11), employing sodium hydride catalyst. These olefin-terminal ethyl cellulose derivatives were then subjected to olefin cross-metathesis with a variety of electron-poor olefin substrates, including acrylic acid and acrylate esters under optimized conditions (5-10 mol % Hoveyda-Grubbs' $2^{nd}$ generation catalyst, 37° C., 2 h). The effects of varying the length of the ω-unsaturated alkyl handle, and of the solvent systems used were evaluated. Ethyl cellulose containing a pent-4-enyl substituent performed best in cross metathesis reactions and a hept-6-enyl substituent gave similar good results. Ethyl cellulose with allyl substituents gave low to moderate metathesis conversion (<50%), probably due to steric effects and the proximity of the ether oxygen to the terminal olefin. Interestingly, longer tethers (undec-10-enyl) gave high conversions (up to 90%) but relatively slow reactions (ca. 12 h needed for high conversion). While limited in this study by the relatively low DS (OH) of the starting commercial ethyl cellulose materials, this methodology has strong promise for introduction of diverse functionality to cellulose ethers in chemospecific and mild fashion, enabling amorphous solid dispersion and other applications.

Example 1

Materials. Cellulose acetate propionate (CAP-504-0.2), cellulose acetate butyrate (CAB-5530.4), and cellulose acetate (CA-320S) were from Eastman Chemical. Triethylamine ($Et_3N$) and 1,3-dimethyl-2-imidazolidinone (DMI) were purchased from Acros Organics. Toluene, N,N-dimethylformamide (DMF), N,N-dimethylacetamide (DMAc), methyl ethyl ketone (MEK) and dichloromethane were purchased from Fisher Scientific. Anhydrous tetrahydrofuran, acrylic acid, butylhydroxytoluene (BHT) and Grubbs' catalysts were purchased from Sigma Aldrich. Diethylene glycol monovinyl ether was purchased from TCI. Undec-10-enoyl chloride was purchased from Pfaltz & Bauer Inc. DMAc and DMI were dried over 4 Å molecular sieves and MEK was dried by refluxing over potassium carbonate before use. All other purchased reagents were used as received.

Measurements. $^1H$ NMR spectra were acquired on INOVA 400 or Bruker Avance 500 spectrometers operating at 400 or 500 MHz. Samples were analyzed as solutions in $CHCl_3$ or DMSO-$d_6$ (ca. 10 mg/mL) at 25° C. in standard 5 mm o.d. tubes. Three drops of trifluoroacetic acid were added to shift the water peak in DMSO-d6 downfield from the spectral region of interest. $^{13}C$ NMR and $^1H$-$^{13}C$ HSQC spectra were obtained on a Bruker Avance 500 MHz spectrometer with a minimum of 5000 scans in DMSO-d6 (ca. 50 mg/mL) at 80° C. To obtain the $T_g$ values of the cellulosic polymers, modulated DSC was performed on a TA Instruments Q2000 apparatus. Dry powders (ca. 5 mg) were loaded in TZERO™ aluminum pans. Each sample was equilibrated at −50 or −20° C. The scanning conditions were set as follows: the underlying ramp heating rate was 7° C., the oscillation amplitude was ±1° C., and oscillation period was 40 s. FTIR spectra were obtained on a Nicolet 8700 instrument. Size exclusion chromatography (SEC) was performed in HPLC grade THF at 40° C. at flow rate 1 mL/min using a Waters size exclusion chromatograph equipped with an autosampler, three in-line 5 μm PLgel Mixed-C columns, and a Waters 410 refractive index (Rr) detector operating at 880 nm, which was programmed to a polystyrene calibration curve. Cellulose ester solubility was tested by adding ca. 10 mg of sample into 2 mL each of various solvents. Each mixture was subjected to vortex mixing for 510 min at room temperature, and then solubility was judged by visual examination.

Preparation of Cellulose Acetate Undec-10-enoate. CA-320S (1.00 g, 4.19 mmol/AGU) was dissolved in DMI (30 mL), and the solution was heated to 90° C. with mechanical stirring under $N_2$. Triethylamine (1.29 mL, 9.22 mmol, 2.2 equiv.; or 3.20 mL, 23.0 mmol, 5.5 equiv.) was added; a condenser was used to avoid evaporative loss of the base catalyst. Undec-10-enoyl chloride (1.70 g, 8.36 mmol, 2.0 equiv.; or 4.25 g, 20.95 mmol, 5.0 equiv.) was added dropwise and allowed to react at 90° C. for 20 h. The reaction mixture was then filtered, and the filtrate was precipitated in 300 mL 50:50 water/ethyl alcohol. The precipitate was redissolved in a minimal amount of $CH_2Cl_2$ and reprecipitated in hexane. The product was washed with hexane and dried under vacuum at 40° C.

$^1H$ NMR ($CDCl_3$):
1.22 (br s, $COCH_2CH_2C\underline{H}_2C\underline{H}_2C\underline{H}_2C\underline{H}_2CH_2CH=CH2$),
1.33 (br s, $COCH_2CH_2CH_2CH_2CH_2C\underline{H}_2CH_2CH_2CH=CH2$),
1.53 (br s, $COCH_2C\underline{H}_2CH_2CH_2CH_2CH_2CH_2CH_2CH=CH2$),
1.88-2.03 (m, $COC\underline{H}_2CH_2CH_2CH_2CH_2CH_2CH_2CH_2CH=CH2$ and $COC\underline{H}_3$),
2.26 (br s, $COCH_2CH_2CH_2CH_2CH_2CH_2CH_2C\underline{H}_2CH=CH2$),
3.25-5.24 (m, cellulose backbone),
4.85-4.94 (q, $COCH_2CH_2CH_2CH_2CH_2CH_2CH_2CH_2CH=C\underline{H}2$),
5.75 (m, o 13 $COCH_2CH_2CH_2CH_2CH_2CH_2CH_2CH_2C\underline{H}=CH2$).

$^{13}C$ NMR ($CDCl_3$):
20.4 ($CO\underline{C}H_3$),
24.8 ($COCH_2\underline{C}H_2CH_2CH_2CH_2CH_2CH_2CH=CH2$),
28.8 ($COCH_2CH_2\underline{C}H_2CH_2CH_2\underline{C}H_2CH_2CH=CH2$),
33.6 ($CO\underline{C}H_2CH_2CH_2CH_2CH_2\underline{C}H_2CH_2CH=CH2$),
114.1 ($COCH_2CH_2CH_2CH_2CH_2CH_2CH_2CH=\underline{C}H2$),
139.0 ($COCH_2CH_2CH_2CH_2CH_2CH_2CH_2\underline{C}H=CH2$),
168.9-173.1 (C=O),
62.2 (C-6),
72.0-76.4 (C2, C3, C5),
82.3 (C-4),
100.7 (C-I).

For the batch with 2.0 equivalents/AGU undec-10-enoyl chloride, degrees of substitution (DS) by $^1H$ NMR: undec-10-enoate 0.67, acetate 1.73; yield: 93.6%. For the batch with 5.0 equivalents/AGU undec-10-enoyl chloride, DS by $^1H$ NMR: undec-10-enoate 1.28, acetate 1.73; yield: 90.7%.

Preparation of Cellulose Acetate Propionate Undec-10-enoate.

CAP-504-0.2 (1.00 g, 1.78 mmol/AGU) was dissolved in MEK (20 mL), and the solution was heated to 60° C. with magnetic stirring under $N_2$. After the addition of triethylamine (0.54 mL, 1.96 mmol, 1.1 equiv.), undec-10-enoyl chloride (0.72 g, 3.56 mmol, 1.0 equiv.) was added dropwise, and the mixture was stirred for 20 h at 60° C. After filtration to remove triethylammonium chloride, the filtrate was precipitated into 300 mL 50:50 water/ethyl alcohol. Product was redissolved in $CH_2Cl_2$, reprecipitated in hexane and dried under vacuum at 40° C.

Cellulose Acetate Propionate Undec-10-enoate.
$^1H$ NMR ($CDCl_3$):
0.99-1.18 (m, $COCH_2C\underline{H}_3$),
1.27-1.35 (m, $COCH_2CH_2C\underline{H}_2C\underline{H}_2C\underline{H}_2C\underline{H}_2CH_2CH=CH_2$),
1.55-1.63 (m, $COCH_2C\underline{H}_2CH_2CH_2CH_2CH_1CH_2CH=CH_2$),
2.01 (m, $COC\underline{H}_2CH_2CH_2CH_2CH_2CH_2CH2CH=CH_2$), 2.15-2.36 (m, COCH₃, COCH₂CH₃, and COCH₂CH₂CH₂CH₂CH₂CH₂CH₂CH₂CH=CH₂), 3.25-5.24 (m, cellulose backbone), 4.89-4.99 (q, COCH₂CH₂CH₂CH₂CH₂CH₂CH₂CH₂CH=CH₂), 5.78 (m, COCH₂CH₂CH₂CH₂CH₂CH₂CH₁CH₂CH=CH₂).

DS by ¹H NMR: undec-10-enoate 0.51. Yield: 94.2%.

A similar procedure was followed for the preparation of CAB undec-10-enoate.

Cellulose Acetate Butyrate Undec-10-enoate.

¹H NMR (CDCl₃):

0.87-0.97 (m, COCH₂CH₂CH₃), 1.27-1.35 (m, COCH₂CH₂CH₂CH₂CH₂CH₂CH₂CH₂CH=CH₂, 1.50-1.67 (m, COCH₂CH₂CH₂CH₂CH₂CH₂CH₂CH₂CH=CH₂, and COCH₂CH₂CH₃), 2.03-2.32 (m, COCH₂CH₂CH₂CH₂CH₂CH₂CH₂CH=CH₂, COCH₂CH₂CH₃, and COCH₃), 3.25-5.24 (m, cellulose backbone), 4.89-4.99 (q, COCH₂CH₂CH₂CH₂CH₂CH₂CH₂CH₂CH=CH₂), 5.78 (m, COCH₂CH₂CH₂CH₂CH₂CH₂CH₂CH₂CH=CH₂).

DS by ¹H NMR: undec-10-enoate 0.47. Yield: 98.0%.

General Procedure for Olefin Metathesis of Cellulose Undec-10-enoate derivatives with Acrylic Acid as Solvent and Reagent. To a flask charged with cellulose undec-10-enoate derivative (100 mg, 1.0 equiv. of olefin), 5 mg BHT and 3 mL acrylic acid were added. After the reagents were completely dissolved, Hoveyda-Grubbs Catalyst 2nd Generation (0.03 equiv in THF) was added via syringe. After stirring for 1 h under N₂ at 30° C., the reaction was stopped by adding 1-2 drops of diethylene glycol monovinyl ether. The product was precipitated by adding to water, and the precipitate was filtered, then sufficiently washed with water before being dried under vacuum at 40° C.

General Procedure for Olefin Metathesis of Cellulose Undec-10-enoate derivatives with Acrylic Acid in THF. To a flask charged with cellulose undec-10-enoate derivatives (100 mg, 1.0 equiv. olefin), 5 mg BHT and 3 mL THF were added. After the reagents were completely dissolved, acrylic acid (20 equiv) was added followed by the addition of Hoveyda-Grubbs Catalyst 2nd Generation (0.03 equiv in THF) via syringe. After stirring for 1 h under N₂ at 30° C., the reaction was stopped by adding 1-2 drops of diethylene glycol monovinyl ether. The product was precipitated by addition to water, the precipitate isolated by filtration, and then sufficiently washed with water before being dried under vacuum at 40° C. Similar procedures were followed for the metathesis reaction performed in other solvent systems.

Cellulose Acetate Monododec-10-endioate

¹H NMR (DMSO-d₆):

1.23 (br s, COCH₂CH₂CH₂CH₂CH₂CH₂CH₂CH₂CH=CHCOOH), 1.38 (br s, COCH₂CH₂CH₂CH₂CH₂CH₂C$\underline{H}_2$C₂CH₂CH=CHCOOH), 1.50 (br. s, COCH₂CH₂CH₂CH₂CH₂CH₂CH₂CH=CHCOOH), 1.86-2.14 (m, COCH₂CH₂CH₂CH₂CH₂CH₂CH₂CH₂CH=CHCOOH, and COCH₃), 2.28 (br s, COCH₂CH₂CH₂CH₂CH₂CH₂CH₂CH=CHCOOH), 2.75-5.25 (m, cellulose backbone), 5.68 (br s, COCH₂CH₂CH₂CH₂CH₂CH₂CH₂CH₂CH=CHCOOH, Z configuration), 5.74 (d, COCH₂CH₂CH₂CH₂CH₂CH₂CH₂CH₂CH=CHCOOH, E configuration), 6.19 (m, COCH₂CH₂CH₂CH₂CH₂CH₂CH₂CH₂CH=CHCOOH, Z configuration), 6.80 (m, COCH₂CH₂CH₂CH₂CH₂CH₂CH₂CH₂CH=CHCOOH, E configuration).

¹³C NMR (DMSO-d6):

20.7 (COCH3), 24.8 (COCH₂CH₂CH₂CH₂CH₂CH₂CH₂CH₂CH=CHCOOH), 28.0 (COCH₂CH₂CH₂CH₂CH₂CH₂CH₂CH=CHCOOH), 29.0 (COCH₂CH₂CH₂CH₂CH₂CH₂CH₂CH=CHCOOH), 31.8 (COCH₂CH₂CH₂CH₂CH₂CH₂CH₂CH=CHCOOH), 33.8 (COCH₂CH₂CH₂CH₂CH₂CH₂CH₂CH=CHCOOH), 122.4 (COCH₂CH₂CH₂CH₂CH₂CH₂CH₂CH₂CH=CHCOOH), 149.0 (COCH₂CH₂CH₂CH₂CH₂CH₂CH₂CH₂CH=CHCOOH), 167.4 (COCH₂CH₂CH₂CH₂CH₂CH₂CH₂CH₂CH=CHCOOH), 169.1-173.3 (C=O), 63.0 (C-6), 72.0-76.4 (C2, C3, C5), 80.4 (C-4), 100.0 (C-1).

For cellulose acetate undec-10-enoate with DS of 0.67, conversion by ¹H NMR: 100%, E/Z ratio by ¹H NMR: 16.7, yield: 92.6%. For cellulose acetate undec-10-enoate with DS of 1.28, conversion by ¹H NMR: 100%, E/Z ratio by ¹H NMR: 4.0, yield: 71.0%.

Cellulose Acetate Butyrate Monododec-2-endioate

¹H NMR (DMSO-6₆):

0.83-0.91 (m, COCH₂CH₂CH₃), 1.26 (br s, COCH₂CH₂CH₂CH₂CH₂CH₂CH₂CH₂CH=CHCOOH), 1.38 (br s, COCH₂CH₂CH₂CH₂CH₂CH₂CH₂CH=CHCOOH), 1.50 (br. s, COCH₂CH₂CH₂CH₂CH₂CH₂CH₂CH₂CH=CHCOOH), 1.86-2.14 (m, COCH₂CH₂CH₂CH₂CH₂CH₂CH₂CH=CHCOOH, and COCH₃), 2.28 (br s, COCH₂CH₂CH₂CH₂CH₂CH₂CH₂CH=CHCOOH), 2.75-5.25 (m, cellulose backbone), 5.68 (br s, COCH₂CH₂CH₂CH₂CH₂CH₂CH₂CH₂CH=CHCOOH, Z configuration), 5.73 (d, COCH₂CH₂CH₂CH₂CH₂CH₂CH₂CH₂CH=CHCOOH, E configuration), 6.19 (m, COCH₂CH₂CH₂CH₂CH₂CH₂CH₂CH₂CH=CHCOOH, Z configuration), 6.79 (m, COCH$_2$CH$_2$CH$_2$CH$_2$CH$_2$CH$_2$CH$_2$CH=CHCOOH, E configuration).

Conversion by $^1$H NMR: 100%, E/Z ratio by $^1$H NMR: −5, yield: 85.2%.

Cellulose Acetate Propionate monododec-2-endioate $^1$H NMR (DMSO-d$_6$):

0.93-1.04 (m, COCH$_2$CH$_3$), 1.24 (br s, COCH$_2$CH$_2$CH$_2$CH$_2$CH$_2$CH$_2$CH$_2$CH$_2$CH=CHCOOH), 1.37 (br s, COCH$_2$CH$_2$CH$_2$CH$_2$CH$_2$CH$_2$CH$_2$CH=CHCOOH), 1.48 (br. s, COCH$_2$CH$_2$CH$_2$CH$_2$CH$_2$CH$_2$CH$_2$CH=CHCOOH), 2.13-2.29 (m, COCH$_2$CH$_2$CH$_2$CH$_2$CH$_2$CH$_2$CH$_2$CH=CHCOOH and COCH$_3$), 2.75-5.25 (m, cellulose backbone), 5.68 (br s, COCH$_2$CH$_2$CH$_2$CH$_2$CH$_2$CH$_2$CH$_2$CH$_2$CH=CHCOOH, Z configuration), 5.72 (d, COCH$_2$CH$_2$CH$_2$CH$_2$CH$_2$CH$_2$CH$_2$CH$_2$CH=CHCOOH, E configuration), 6.18 (m, COCH$_2$CH$_2$CH$_2$CH$_2$CH$_2$CH$_2$CH$_2$CH=CHCOOH, Z configuration), 6.79 (m, COCH$_2$CH$_2$CH$_2$CH$_2$CH$_2$CH$_2$CH$_2$CH=CHCOOH, E configuration).

Conversion by $^1$H NMR: 100%, E/Z ratio by $^1$H NMR: 20.0, yield: 95.2%.

between unsaturated fatty acids from natural oils and ethylene (Rybak, A.; Fokou, P. A.; Meier, M. A. R., Metathesis as a Versatile Tool in Oleochemistry. *Eur. J. Lipid Sci. Technol.* 2008, 110, (9), 797-804). The present inventors prepared esters of cellulose containing long chain esters with terminal unsaturation (CA-, CAB-, CAP-10-undecenoate) by methods similar to those previously used for synthesis of esters of cellulose with saturated long chain acids (Liu, H.; Ilevbare, G. A.; Cherniawski, B. P.; Ritchie, E. T.; Taylor, L. S.; Edgar, K. J., Synthesis and Structure-Property Evaluation of Cellulose ω-Carboxyesters for Amorphous Solid Dispersions. *Carbohydr. Polym.*, (2012); and Edgar, K. J.; Buchanan, C. M.; Debenham, J. S.; Rundquist, P. A.; Seiler, B. D.; Shelton, M. C.; Tindall, D., Advances in Cellulose Ester Performance and Application. *Prog. Polym. Sci.* 2001, 26, (9), 1605-1688; and Edgar, K. J., Cellulose Esters in Drug Delivery. *Cellulose* 2007, 14, (1), 49-64; and Wilken, L. O., Jr.; Kochhar, M. M.; Bennett, D. P.; Cosgrove, F. P., Cellulose Acetate Succinate as an Enteric Coating for Some Compressed Tablets. *J. Pharm. Sci.* 1962, Sl, 484-90; and Crepy, L.; Chaveriat, L.; Banoub, J.; Martin, P.; Joly, N., Synthesis of Cellulose Fatty Esters as Plastics-Influence of the Degree of Substitution and the Fatty Chain Length on Mechanical Properties. *Chemsuschem* 2009, 2, (2), 165-170) in particular by esterifying commercially available cellulose esters with undec-10-enoyl chloride in the presence of Et$_3$N (Table 3).

TABLE 3

Synthesis of Cellulose Ester Undec-10-enoates

| Sample | Starting cellulose ester | Solvent | Molar ratio[a] | Temp. (° C.) | DS (Un)[b] | DS (other)[c] | Product |
|---|---|---|---|---|---|---|---|
| 1 | CA-320S | DMI | 2.0 | 90 | 0.67 | Ac 1.82 1.72[b] | CA-U067 |
| 2 | CA320S | DMI | 5.0 | 90 | 1.28 | Ac 1.82, 1.72[b] | CA-U128 |
| 3 | CAB-553-0.4 | MEK | 1.0 | 60 | 0.47 | Ac 0.14, Bu 1.99 | CAB-U047 |
| 4 | CAP-504-0.2 | MEK | 1.0 | 60 | 0.51 | Ac 0.04, Pr 2.09 | CAP-U051 |

[a]Mol 10-undecenoyl chloride per mol anhydroglucose unit.
[b]Determined by $^1$H-NMR.
[c]Reported in a previous publication[14]

Results and Discussion

Terminally-unsaturated fatty acids are type I olefins in Grubbs' classification, prone to rapid homodimerization. Many researchers have studied CM of such small molecules with methyl acrylate (Djigoue, G. B.; Meier, M. A. R., Improving the Selectivity for the Synthesis of Two Renewable Platform Chemicals via Olefin Metathesis. *Appl. Catal. A-Gen.* 2009, 368, (1-2), 158-162; and Miao, X.; Fischmeister, C.; Dixneuf, P. H.; Bruneau, c.; Dubois, J. L.; Couturier, J. L., Polyamide Precursors from Renewable 10-Undecenenitrile and Methyl Acrylate via Olefin Cross-metathesis. *Green Chem.* 2012, 14, (8), 2179-2183 ("Miao et al.")), acrylonitrile ("Miao et al."), allyl chloride ("Miao et al.") and alkynes (Le Ravalec, V.; Dupe, A.; Fischmeister, C.; Bruneau, C., Improving Sustainability in Ene-Yne Cross-Metathesis for Transformation of Unsaturated Fatty Esters. *Chemsuschem* 2010, 3, (11), 1291-1297), leading to a variety of end functionalized fatty acids. In fact, terminally-unsaturated fatty acids can be made by cross metathesis DS(undec-10-enoate) (DS(Un)) of adducts with CA, CAB, and CAP was kept mostly in the range 0.4 to 0.7 in order to obtain derivatives with relatively high glass-transition temperature (T$_g$) values, advantageous for minimizing drug mobility and thus crystallization in ASD formulations (Glasser, W. G.; Samaranayake, G.; Dumay, M.; Dave, V., Novel Cellulose Derivatives. III. Thermal Analysis of Mixed Esters with Butyric and Hexanoic Acid. *J. Polym. Sci. Phys.* 1995,33, (14), 2045-2054; and Weuts, I.; Van Dycke, F.; Voorspoels, J.; De Cort, S.; Stokbroekx, S.; Leemans, R.; Brewster, M. E.; Xu, D.; Segmuller, B.; Turner, Y. T. A.; Roberts, C. J.; Davies, M. C.; Qi, S.; Craig, D. Q. M.; Reading, M., Physicochemical Properties of the Amorphous Drug, Cast Films, and Spray Dried Powders to Predict Formulation Probability of Success for Solid Dispersions: Etravirine. *J. Pharm. Sci.* 2011,100, (1), 260-274). One higher DS(Un) sample (DS 1.28) was prepared in order to examine whether the CM reaction would still be effective at higher olefin densities.

For successful synthesis of soluble, uncrosslinked cellulose ω-carboxyalkanoates, the present inventors needed to maximize CM between the terminal olefin of the cellulose alkanoate undecenoate and acrylic acid, and suppress SM of both starting materials and products. The present inventors explored the impact of several factors known to be important in CM of small molecules, including catalyst type and loading, stoichiometry, and reaction time and temperature (Table 4).

TABLE 4

CM of Cellulose Undec-10-enoate Derivatives With Acrylic Acid

| Exp. | Start. mat. | Cat. type | Cat. Load. (mol %) | Solvent | Mol. ratio[a] | Temp. (° C.) | Time (h) | Conv. | Product |
|---|---|---|---|---|---|---|---|---|---|
| 1 | CA-U067 | C2 | 2 | AA | — | 50 | 24 | ~0 | — |
| 2 | CA-U067 | C3 | 2 | AA | — | 50 | 2.4 | ~90 | — |
| 3 | CA-U067 | C3 | 3 | AA | — | 30/r.t. | 0.5/1 | ~100 | CAU067MAA |
| 4 | CA-U128 | C3 | 3 | AA | — | 30 | 1 | ~100 | CAU128MAA |
| 5 | CA-U067 | C3 | 3 | DCM | 1:5 | 30 | 1 | N.A.[b] | — |
| 6 | CA-U067 | C3 | 3 | DCM | 1:20 | 30 | 1 | ~100 | CAU067MAA CH$_2$Cl$_2$ |
| 7 | CA-U067 | C3 | 3 | CHCl$_3$ | 1:20 | 30 | 1 | ~90[b] | — |
| 8 | CA-U067 | C3 | 3 | THF | 1:5 | 30 | 1 | ~90 | — |
| 9 | CA-U067 | C3 | 3 | THF | 1:20 | 30 | 1 | ~100 | CAU067MAATHF |
| 10 | CAB-U047 | C3 | 3 | AA | — | r.t. | 1 | ~100 | CABU047MAA |
| 11 | CAP-U051 | C3 | 3 | AA | — | r.t. | 1 | ~100 | CAPU051MAA |

[a]mol of terminal double bond:mol of acrylic acid.
[b]Gelation was observed during the reaction.

Grubbs' 2nd generation catalyst (C2) and Hoveyda-Grubbs' 2nd generation catalyst (C3) were compared using CA-U067 as starting material and acrylic acid as both reagent and solvent. Clearly C3 was much more effective than C2 (Exp. 1, 2) in this system. Catalyst loading also significantly affected CM conversion (characterized herein as the percent of the terminal olefin groups that underwent CM); 2 mol % C3 afforded approximately 90% conversion, while the present inventors were gratified to observe that 3 mol % catalyst loading gave complete conversion, even under very mild conditions (room temperature) and with rapid kinetics (complete in 30 min). Such mild conditions and short reaction times were encouraging for cases in which acrylic acid was used as both reactant and solvent, promising to minimize any acid-catalyzed solvolysis of glycosidic linkages. From the FTIR spectra (FIG. 2), it can be seen that the peak at 1643 cm$^{-1}$ which was assigned to the C=O stretch of the starting cellulose ester undecenoates, was shifted to 1650 cm$^{-1}$ after CM. The appearance of a C=O stretch absorbance at 1694 cm$^{-1}$ on the shoulder of the ester C=O stretch peak at 1751 cm$^{-1}$ was also observed, further supporting the success of CM. Proton NMR was a useful tool for following the reaction (FIGS. 3A and 3B), by following disappearance of the terminal olefin protons of the starting material at 4.90 and 5.75 ppm. New proton signals appeared at 5.73 and 6.80 ppm, which were assigned to protons of the α, β-unsaturated carboxylic acid in its E configuration. Correspondingly, the signals of the product olefin in the Z configuration were found at 5.68 and 6.19. $^{13}$C NMR spectra (FIGS. 4A and 4B) showed the complete disappearance of starting terminal olefin signals at 114 and 139 ppm, and the appearance of new peaks at 122 and 149 ppm, supporting the conclusion that 100% CM conversion had occurred. To further confirm the assignment of proton peaks of E/Z configuration, $^1$H-$^{13}$C HSQC was performed, which showed correlation of the carbon signal at 122 ppm with proton signals at 5.73 and 5.68 ppm, and correlation of the carbon signal at 149 ppm with proton signals at 6.80 and 6.19 ppm. Integration of the $^1$H NMR spectrum showed that the E configuration was obtained in strong preference to the Z configuration, which is inconsistent with previous reports (Choi, T. L.; Chatterjee, A, K.; Grubbs, R. H., Synthesis of α, β-Unsaturated Amides by Olefin Crossmetathesis. *Angew. Chem. Int. Ed.* 2001, 40, (7), 1277; and Djigoue, G. B.; Meier, M. A. R., Improving the Selectivity for the Synthesis of Two Renewable Platform Chemicals via Olefin Metathesis. *Appl. Catal. A-Gen.* 2009, 368, (1-2), 158-162; and Miao, X.; Fischmeister, C.; Dixneuf, P. H.; Bruneau, C.; Dubois, J. L.; Couturier, J. L., Polyamide Precursors from Renewable 10-Undecenenitrile and Methyl Acrylate via Olefin Cross-metathesis. *Green Chem.* 2012, 14, (8), 2179-2183). However, the E/Z ratio for the CA product was observed to vary from experiment to experiment; this phenomenon was also observed in reactions of CAB and CAP undecenoates. It should be noted that to whatever extent the E/Z mixture is an issue for a particular application, it could be alleviated by subsequently subjecting the product α, β-unsaturated carboxylic acids to reactions such as Michael addition (Miyata, O.; Shinada, T.; Ninomiya, I.; Naito, T.; Date, T.; Okamura, K.; Inagaki, S., Stereospecific nucleophilic addition reactions to olefins. Addition of Thiols to α, β-Unsaturated Carboxylic Acid Derivatives. *J. Org. Chem.* 1991,56, (23), 6556-6564) or hydrogenation (Mori, A.; Miyakawa, Y.; Ohashi, E.; Haga, T.; Maegawa, T.; Sajiki, H., Pd/C-catalyzed chemoselective hydrogenation in the presence of diphenylsulfide. *Org. Lett.* 2006, 8, (15), 3279-3281) that would eliminate the double bond. Highly selective cross-metathesis with CAB-U047, CAP-U051 and CA-UI28 was also observed under similar conditions, also reaching 100% conversion ($^1$H NMR). Even in the case of CM of acrylic acid with CA-UI28, which has nearly twice the olefin density of CA-U067, 100% CM was observed, with no sign of crosslinking.

The present inventors were pleased with the success of the CM reaction in acrylic acid as reagent and solvent, but were watchful about two potential problems: 1) the possibility of acid-catalyzed solvolysis of the glycosidic linkages due to the preponderance of acrylic acid, and 2) the possibility that other terminal and electron-deficient olefins might be incompatible with acrylic acid solvent due to solubility or miscibility issues (e.g. acrylamide, unpublished results). For these reasons, other solvent systems were investigated using CA-U067 as starting material. Dichloromethane, commonly used as an OM solvent, was investigated first. However, with an acrylic acid: terminal olefin ratio of 5:1 and all other conditions the same as those in acrylic acid solvent, gelation was observed at the end of the reaction, indicating the possibility that substantial intermolecular SM had occurred. Upon using THF as solvent and an acrylic acid: terminal olefin ratio of 5:1, incomplete CM (~90% conversion) was observed, though there was no gelation. Increasing the acrylic acid: olefin ratio to 20:1 afforded completely cross-metathesized products in either $CH_2Cl_2$ or THF. In contrast, incomplete CM and slight gelation were observed under the same conditions when $CHCl_3$ was used as solvent. The results obtained in different solvents can be rationalized by a change in polymer solubility as a result of the CM reaction. Although the starting polymer was readily soluble in either $CH_2Cl_2$ or $CHCl_3$ (Table 5), the acrylic acid CM product was no longer soluble in these solvents.

TABLE 5

Solubility of Cellulose Undec-10-enoate Derivatives and Cellulose Monododec-10-endioate Derivatives in Various Solvents

| Solvent | $CH_2Cl_2$ | $CHCl_3$ | EtOAc | iPrOH | THF | Acetone | DMSO | DMF |
|---|---|---|---|---|---|---|---|---|
| CA-U067 | + | + | + | − | + | + | + | + |
| CAU067MAA | − | − | − | − | + | + | + | + |
| CA-U128 | + | + | + | − | + | + | + | + |
| CAU128MAA | P | P | + | − | + | + | + | + |
| CAB-U047 | + | + | + | − | + | + | + | + |
| CABU047MAA | P | P | + | − | + | + | + | + |
| CAP-U051 | + | + | + | − | + | + | + | + |
| CAPU051MAA | P | P | + | − | + | + | + | + |

(+) soluble;
(−) insoluble;
(P) partially soluble

While the polymer may not necessarily precipitate as the reaction proceeds, its decreased solubility may cause it to aggregate, increasing the likelihood of intra- and intermolecular SM. THF, on the other hand, is a good solvent for both the starting material and the final product. As a result, no precipitation, aggregation, or aggregation-induced SM is observed in THF.

SEC was used to determine the degree of molecular weight change during the reaction (Table 6).

TABLE 6

Molecular Weight and $T_g$ of the Cellulose Esters

| Sample | Mn (kDa) | Mw (kDa) | PDI | $T_g$ (° C.) |
|---|---|---|---|---|
| CA-320S | 38.8[a] | NA | NA | 180[b] |
| CA-U067 | 36.8 | 72.8 | 1.98 | — |
| CAU067MAA | 16.4 | 25.5 | 1.56 | 115 |
| CAU067MAATHF | 26.6 | 57.7 | 2.16 | 109 |
| CA-U128 | 25.4 | 43.6 | 1.72 | — |
| CAU128MAA | 19.9 | 27.0 | 1.36 | −15, 94 |
| CAB-553-04 | 20.0[a]/22.1 | 56.3 | 2.54 | 100[b] |
| CAB-U047 | 24.8 | 55.5 | 2.24 | — |
| CABU047MAA | 23.4 | 52.7 | 2.25 | 93 |
| CAP-504-02 | 15.0[a]/15.2 | 31.0 | 2.04 | 158[b] |
| CAP-U051 | 17.7 | 34.0 | 1.92 | — |
| CAPU051MAA | 16.4 | 30.6 | 1.86 | 81 |

[a]Data reported by supplier, versus polystyrene standards.
[b]Data reported in previous publication[28].

Polydispersity index (PDI) data from SEC chromatograms can be used as an indicator of intermolecular SM. While a decreased PDI indicates some degree of chain scission, an increased PDI can be interpreted as a sign of chain coupling and crosslinking. For CAB-U047, CAP-U051 and CA-UI28, polymer molecular weights decreased slightly after 1 h reaction in acrylic acid at either room temperature or 30° C., showing that the mild reaction conditions did preserve polymer molecular weight even in an acidic solvent. The observed slight decrease in PDI strongly indicated that intermolecular SM was successfully suppressed. As for CA-U067, its higher starting chain length and shorter side chain esters (acetate) compared with the butyrate and propionate derivatives render it more susceptible to chain scission catalyzed by acids. As a result, more than 50% loss of Mn was observed after reaction of CA-U067 for 1 h at 30° C. in acrylic acid solvent. Performing the reaction in THF preserved DP to some extent (30% loss of Mn). However, PDI increased from 1.98 to 2.16, possibly due to a small amount of chain coupling caused by intermolecular SM.

Polymer glass transition temperature is an important parameter influencing the potential for its use as an ASD matrix. As the glassy state restricts drug mobility and resulting crystallization, a polymer with $T_g$ that is at least 50° C. higher than ambient temperature is preferred in ASD formulations. This keeps the formulation $T_g$ above ambient temperature in spite of the plasticizing effects of both drug and atmospheric moisture. For the long chain CM product synthesized herein, only very weak thermal transitions were observed by standard DSC methods. Modulated DSC was employed to give sharper transitions (Table 6). Although the $T_g$ values of the CM products decreased 10 to 80° C. compared with those of the starting cellulose esters, they still remained at least 50° C. higher than room temperature. As expected, the higher DS of long side chain produced a lower $T_g$ value for CAU128MAA than that for CAU067MAA. The high DS CM product CAU128MAA also displayed an extra low temperature transition at 15° C., which the inventors attribute to cooperative motion of the long side chains by analogy to results from other studies of long chain cellulose esters (Kar, N.; Liu, H.; Edgar, K. J., Synthesis of Cellulose Adipate Derivatives. *Biomacromolecules* 2011; and Sealey, J. E.; Samaranayake, G.; Todd, J. G.; Glasser, W. G., Novel Cellulose Derivatives. IV. Preparation and Thermal Analysis of Waxy Esters of Cellulose. *J. Polym. Sci. Phys.* 1996,34, (9), 1613-1620).

During the investigation of the CM reaction, an intriguing and disturbing phenomenon was observed. CM products lost solubility during storage, and the polymer with higher DS of α, β unsaturated carboxylic acid lost solubility faster than those with lower DS. Moreover, dissolving the originally soluble polymer in THF and then precipitating it in hexane in some cases generated insoluble product immediately. Apparently, certain reaction(s) caused rapid, substantial crosslinking, and the crosslinking had something to do with the α, β unsaturated carboxylic acid groups. The present inventors were concerned about the possibility of continuing, secondary metathesis of the pendant α, β unsaturated carboxylic acid groups of the product, which could be caused by residual catalyst. To exclude this possibility, diethylene glycol monovinyl ether was added at the end of metathesis reactions; diethylene glycol monovinyl ether not only can quench the CM reaction, but the glycol tail makes the catalyst water-soluble so that it can be easily removed by washing the product with water. The addition of diethylene glycol monovinyl ether did not mitigate the solubility issue, showing that CM was not the cause of the insolubility. The present inventors then turned their attention to two other possible undesired reactions of the CM products, Michael reaction or free radical polymerization. The inventors thought that Michael addition to the α, β unsaturated carboxylic acid groups was less likely, due to the absence of strong base catalyst, and the relatively low reactivity of the possible Michael donors (—OH or methylene groups). The inventors therefore examined whether the crosslinking was caused by a free radical mechanism. Experiments were carried out in which 3,5-di-tert-4-butylhydroxytoluene (BHT), a commonly used antioxidant capable of scavenging free radicals, was added before the reaction. As BHT is not soluble in water, the majority of it would remain in the polymer upon addition of the reaction mixture to water to precipitate the product. The presence of BHT would be expected to suppress the generation of free radicals during reaction, isolation, and product storage. Indeed, the BHT containing products remained soluble after two months storage at room temperature. Furthermore, dissolution of these products in THF and precipitation in hexane afforded products that were still readily soluble in THF. Prevention of crosslinking by BHT addition strongly supports the notion that the cross-linking and solubility loss was caused by a free radical mechanism, while providing a useful means to avoid the problem.

Alkaline hydrolysis of the ester groups of metathesis products was performed according to a previously reported method (Freire, C. S. R.; Silvestre, A. J. D.; Pascoal Neto, C.; Rocha, R. M. A., An Efficient Method for Determination of the Degree of Substitution of Cellulose Esters of Long Chain Aliphatic Acids. *Cellulose* 2005, 12, (5), 449-458). After acidification, long chain acids were extracted into $CH_2Cl_2$, and then the $CH_2Cl_2$ extract was washed extensively by water. A suitable amount of BHT was added to prevent coupling during this process. $^1H$ NMR was performed on the acid products collected from samples with and without solubility problems. While samples without solubility problems afforded an ester product with a spectrum identical with undec-2-enedioic acid, those with solubility problems afforded acids with an extra peak at 0.79 ppm in the proton spectrum, indicating the occurrence of dimerization (FIGS. 5A and 5B).

The synthesis of long chain α, βunsaturated carbonyl derivatives via olefin metathesis has been the topic of several studies (Rybak, A.; Meier, M. A. R., Cross-metathesis of Fatty Acid Derivatives with Methyl Acrylate: Renewable Raw Materials for the Chemical Industry. *Green Chem.* 2007, 9, (12), 1356-1361; and Djigoue, G. B.; Meier, M. A. R., Improving the Selectivity for the Synthesis of Two Renewable Platform Chemicals via Olefin Metathesis. *Appl. Catal. A-Gen.* 2009, 368, (1-2), 158-162; and Zerkowski, J. A.; Solaiman, D. K. Y., Omega-Functionalized Fatty Acids, Alcohols, and Ethers via Olefin Metathesis. *J. Am. Oil Chem. Soc.* 2012, 89, (7), 1325-1332). Recently, de Espinosa et al. reported side-chain modification of poly(2-oxazoline) employing 10-undecenoyl as the side chain, via crossmetathesis with acrylates (de Espinosa, L. M.; Kempe, K.; Schubert, U. S.; Hoogenboom, R.; Meier, M. A. R., Side-Chain Modification and "Grafting Onto" via Olefin Cross-Metathesis. *Macrom. Rapid Comm.* 2012, 33, (23), 2023-2028). However, none of these studies have mentioned the crosslinking problem that the inventors report herein. The inventors' results may provide a way to understand and avoid such crosslinking, while retaining the possibility that the double bond can be preserved should it be desirable to do so.

Example 2

EXPERIMENTAL

Materials and instruments. Cellulose acetate (CA-320S, Mn~38.0 kDa, DP~151, DS(Ac)~1.82 (data provided by supplier)) was from Eastman Chemical. Triethylamine and 1,3-dimethyl-2-imidazolidinone (DMI) were purchased from Acros Organics. Anhydrous tetrahydrofuran, acrylic acid, methyl acrylate, 2-hydroxyethyl acrylate, poly(ethylene glycol) methyl ether acrylate, allyl alcohol, 3-buten-2-ol, allylamine, 4-pentenoyl chloride, 10-undecenoyl chloride, ethyl vinyl ether, butylhydroxytoluene (BHT), palladium on carbon (10 wt % loading), Wilkinson's catalyst, Crabtree's catalyst, and Hoveyda-Grubbs' $2^{nd}$ generation catalyst were purchased from Sigma Aldrich. Diethylene glycol monovinyl ether was purchased from TCI. DMI were dried over 4 Å molecular sieves before use. All other purchased reagents were used as received. The high pressure reactor used in hydrogenation was mini bench top reactor 4560 purchased from Parr Instrument Company.

Measurement. $^1H$ NMR spectra were acquired on a Bruker Avance 500 spectrometer operating at 500 MHz. Samples were analyzed as solutions in $CDCl_3$ or DMSO-d6 (ca. 10 mg/mL) at 25° C. in standard 5 mm o.d. tubes. Three drops of trifluoroacetic acid were added to shift the water peak in DMSO-d6 downfield from the spectral region of interest. To obtain the $T_g$ values of the cellulosic polymers, DSC was performed on a TA Instruments Q2000 apparatus using heat/cool/heat mode. Dry powders (ca. 5 mg) were loaded in Tzero™ aluminum pans. The scanning conditions were set as follows: each sample was equilibrated at 35° C., and then heated to 150° at 20° C./min. The sample was then cooled at 100° C./min to −50° C. During the second heating cycle the sample was heated to 200° C. at 20° C./min. If the heat/cool/heat mode failed to give a clear transition, modulated DSC was performed as follows: each sample was equilibrated at −50° C., the underlying ramp heating rate was 7° C., the oscillation amplitude was ±1° C., and oscillation period was 40 s. FTIR spectra were obtained on a Nicolet 8700 instrument. Size exclusion chromatography (SEC), if not otherwise specified, was performed on Agilent 1260 Infinity Multi-Detector SEC using NMP with 0.05 M LiBr as the mobile phase (50° C.) with 3 PLgel 10 μm mixed-B 300×7.5 mm columns in series. A system of multiple detectors connected in series was used for the analysis. A multi-angle laser light scattering (MALS) detector (DAWN-HELEOS II, Wyatt Technology Corporation, Goleta, Calif.), operating at a wavelength of 658 nm, a viscometer detector (Viscostar, Wyatt Technology Corporation, Goleta, Calif.), and a refractive index detector operating at a wavelength of 658 nm (Optilab T-rEX, Wyatt Technology Corporation, Goleta, Calif.) provided online results. Data acquisition and analysis was conducted using Astra 6 software (Wyatt Technology Corporation, Goleta, Calif.). For several samples, SEC was performed in THF as mobile phase (40° C.) on Agilent 1260 Infinity Multi-Detector SEC. Both the systems used polystyrene calibration curves.

Preparation of cellulose acetate 10-undecenoate (CA-Un, 2). CA-320S (1, 1.00 g, 4.19 mmol/AGU) was dissolved in DMI (30 mL), and the solution was heated to 90° C. with mechanical stirring under $N_2$. Triethylamine (1.29 mL, 9.22 mmol, 2.2 equiv.) was added; a condenser was used to avoid evaporative loss of the base catalyst. 10-Undecenoyl chloride (1.70 g, 8.36 mmol, 2.0 equiv.) was added dropwise and allowed to react at 90° C. for 20 h. The reaction mixture was then filtered, and the filtrate was precipitated in 300 mL 50:50 water/ethyl alcohol. The precipitate was redissolved in a minimal amount of $CH_2Cl_2$ and reprecipitated in hexane. The product was washed with hexane and dried under vacuum at 40° C.

$^1$H NMR (DMSO-$d_6$):
1.21 (br s, $COCH_2CH_2C\underline{H}_2C\underline{H}_2C\underline{H}_2C\underline{H}_2CH_2CH=CH_2$),
1.32 (br s, $COCH_2CH_2CH_2CH_2CH_2CH_2C\underline{H}_2CH=CH_2$),
1.50 (br s, $COCH_2C\underline{H}_2CH_2CH_2CH_2CH_2CH_2CH=CH_2$),
1.8-2.1 (m, $COC\underline{H}_2CH_2CH_2CH_2CH_2CH_2CH_2CH=CH_2$, and $COC\underline{H}_3$),
2.30 (br s, $COCH_2CH_2CH_2CH_2CH_2CH_2C\underline{H}_2CH=CH_2$),
3.3-5.3 (m, cellulose backbone),
4.8-5.0 (q, $COCH_2CH_2CH_2CH_2CH_2CH_2CH_2CH_2CH=C\underline{H}_2$),
5.7 (m, $COCH_2CH_2CH_2CH_2CH_2CH_2CH_2CH_2C\underline{H}=CH_2$).

$^{13}$C NMR (CDCl$_3$):
20.4 (CO$\underline{C}$H$_3$),
24.8 (COCH$_2$$\underline{C}$H$_2$CH$_2$CH$_2$CH$_2$CH$_2$CH$_2$CH=CH$_2$),
28.8 (COCH$_2$CH$_2$$\underline{C}$H$_2$CH$_2$CH$_2$CH$_2$CH$_2$CH=CH$_2$),
33.6 (COCH$_2$CH$_2$CH$_2$CH$_2$CH$_2$CH$_2$$\underline{C}$H$_2$CH=CH$_2$),
114.1 (COCH$_2$CH$_2$CH$_2$CH$_2$CH$_2$CH$_2$CH$_2$CH$_2$CH=$\underline{C}$H$_2$),
139.0 (COCH$_2$CH$_2$CH$_2$CH$_2$CH$_2$CH$_2$CH$_2$CH$_2$$\underline{C}$H=CH$_2$),
168.9-173.1 (C=O),
62.2 (C-6),
72.0-76.4 (C2, C3, C5),
82.3 (C-4),
100.7 (C-1).

Degree of substitution (DS) by $^1$H NMR: DS(10-undecenoate) (DS(Un)) 0.67, DS(acetate) (DS(Ac)) 1.88; yield: 93%.

Preparation of cellulose acetate 4-pentenoate (CA-Pen, 3). CA-320S (1, 1.00 g, 4.19 mmol/AGU) was dissolved in DMI (20 mL), and the solution was heated to 90° C. with mechanical stirring under $N_2$. Triethylamine (2.6 mL, 9.22 mmol, 2.2 equiv.) was added; a condenser was used to avoid evaporative loss of the base catalyst. 4-Pentenoyl chloride (1.99 g, 8.38 mmol, 2.0 equiv.) was added dropwise and allowed to react at 90° C. for 20 h. The reaction mixture was then filtered, and the filtrate was precipitated in 300 mL 50:50 water/ethyl alcohol. The precipitate was redissolved in a minimal amount of $CH_2Cl_2$ and reprecipitated in hexane. The product was washed with hexane and dried under vacuum at 40° C.

$^1$H NMR (DMSO-$d_6$):
1.8-2.1 (m, COC$\underline{H}_3$),
2.28 (br s, COC$\underline{H}_2$CH$_2$CH=CH$_2$),
2.42 (br s, COC$\underline{H}_2$CH$_2$CH=CH$_2$),
2.9-5.3 (m, cellulose backbone),
4.9-5.1 (q, COCH$_2$CH$_2$CH=C$\underline{H}_2$),
5.8 (m, COCH$_2$CH$_2$C$\underline{H}$=CH$_2$).

$^{13}$C NMR (DMSO-$d_6$):
20.4 (CO$\underline{C}$H$_3$),
28.6 (COC$\underline{H}_2$CH$_2$CH=CH$_2$),
32.8 (COC$\underline{H}_2$CH$_2$CH=CH$_2$),
116.0 (COCH$_2$CH$_2$CH=$\underline{C}$H$_2$),
137.3 (COCH$_2$CH$_2$$\underline{C}$H=CH$_2$),
168.9-173.1 (C=O),
62.2 (C-6),
72.0-76.4 (C2, C3, C5),
82.3 (C-4),
100.7 (C-1).

Degree of substitution (DS) by $^1$H NMR: DS(4-pentenoate) (DS(Pen)) 0.56, DS(acetate) (DS(Ac)) 1.80; yield: 89%.

General procedure for olefin cross-metathesis reactions. To a flask charged with cellulose derivative 2 CA-Un or 3 CA-Pen (100 mg, 1.0 equiv. olefin), 5 mg BHT and 5 mL anhydrous THF were added. After the reagents were completely dissolved, cross-metathesis partner (acrylic acid, methyl acrylate, 2-hydroxylethyl acrylate, poly(ethylene glycol) methyl ether acrylate, acrylamide, or allyl alcohol; 20 equiv.) was added followed by the addition of Hoveyda-Grubbs Catalyst $2^{nd}$ Generation (0.05 equiv. in 2 mL THF) via syringe. After stirring for 1 h under $N_2$ at 40° C., the reaction was stopped by adding 1-2 drops of diethylene glycol monovinyl ether or ethyl vinyl ether. The product was collected by either dialysis and freeze-drying, or by precipitating in $H_2O$/ethanol followed by sufficient washing by $H_2O$ before being dried under vacuum at 40° C.

2a. Cellulose acetate 10-undecenoate (2) CM with acrylic acid $^1$H NMR (DMSO-$d_6$):
1.23 (br s, COCH$_2$CH$_2$C$\underline{H}_2$C$\underline{H}_2$C$\underline{H}_2$CH$_2$CH$_2$CH=CHCOOH),
1.38 (br s, COCH$_2$CH$_2$CH$_2$CH$_2$CH$_2$CH$_2$C$\underline{H}_2$CH=CHCOOH), 1.50 (br. s, COCH₂CH₂CH₂CH₂CH₂CH₂CH₂CH=CHCOOH),
1.86-2.05 (m, COCH₃),
2.14 (br s, COCH₂CH₂CH₂CH₂CH₂CH₂CH₂CH=CHCOOH),
2.28 (br s, COCH₂CH₂CH₂CH₂CH₂CH₂CH₂CH=CHCOOH),
2.75-5.25 (m, cellulose backbone),
5.68 (d, COCH₂CH₂CH₂CH₂CH₂CH₂CH₂CH=CHCOOH, Z configuration),
5.74 (d, COCH₂CH₂CH₂CH₂CH₂CH₂CH₂CH=CHCOOH, E configuration),
6.19 (m, COCH₂CH₂CH₂CH₂CH₂CH₂CH₂CH=CHCOOH, Z configuration),
6.80 (m, COCH₂CH₂CH₂CH₂CH₂CH₂CH₂CH=CHCOOH, E configuration).

$^{13}$C NMR (DMSO-d₆):
20.7 (COCH₃),
24.8 (COCH₂CH₂CH₂CH₂CH₂CH₂CH₂CH=CHCOOH),
28.0 (COCH₂CH₂CH₂CH₂CH₂CH₂CH₂CH=CHCOOH),
29.0 (COCH₂CH₂CH₂CH₂CH₂CH₂CH₂CH=CHCOOH),
31.8 (COCH₂CH₂CH₂CH₂CH₂CH₂CH₂CH=CHCOOH),
33.8 (COCH₂CH₂CH₂CH₂CH₂CH₂CH₂CH=CHCOOH),
122.4 (COCH₂CH₂CH₂CH₂CH₂CH₂CH₂CH=CHCOOH),
149.0 (COCH₂CH₂CH₂CH₂CH₂CH₂CH₂CH=CHCOOH),
167.4 (COCH₂CH₂CH₂CH₂CH₂CH₂CH₂CH=CHCOOH),
169.1-173.3 (C=O),
63.0 (C-6),
72.0-76.4 (C2, C3, C5),
80.4 (C-4),
100.0 (C-1).

Conversion by $^1$H NMR: 100%, E/Z ratio by $^1$H NMR: 16.7, yield: 93%.

2b. Cellulose acetate 10-undecenoate (2) CM with 2-hydroxyethyl acrylate $^1$H NMR (DMSO-d₆):
1.22 (br s, COCH₂CH₂CH₂CH₂CH₂CH₂CH₂CH=CHCOOCH₂CH₂OH),
1.37 (br s, COCH₂CH₂CH₂CH₂CH₂CH₂CH₂CH=CHCOOCH₂CH₂OH),
1.50 (br. s, COCH₂CH₂CH₂CH₂CH₂CH₂CH₂CH=CHCOOCH₂CH₂OH),
1.8-2.1 (m, COCH₃),
2.18 (br s, COCH₂CH₂CH₂CH₂CH₂CH₂CH₂CH=CHCOOCH₂CH₂OH),
2.28 (br s, COCH₂CH₂CH₂CH₂CH₂CH₂CH₂CH=CHCOOCH₂CH₂OH),
2.75-5.25 (m, cellulose backbone),
3.56 (t, COCH₂CH₂CH₂CH₂CH₂CH₂CH₂CH=CHCOOCH₂CH₂OH),
4.06 (t, COCH₂CH₂CH₂CH₂CH₂CH₂CH₂CH=CHCOOCH₂CH₂OH),
5.77 (d, COCH₂CH₂CH₂CH₂CH₂CH₂CH₂CH=CHCOOCH₂CH₂OH, Z configuration),
5.86 (d, COCH₂CH₂CH₂CH₂CH₂CH₂CH₂CH=CHCOOCH₂CH₂OH, E configuration),
6.28 (m, COCH₂CH₂CH₂CH₂CH₂CH₂CH₂CH=CHCOOCH₂CH₂OH, Z configuration),
6.89 (m, COCH₂CH₂CH₂CH₂CH₂CH₂CH₂CH=CHCOOCH₂CH₂OH, E configuration).

$^{13}$C NMR (DMSO-d₆):
20.9 (COCH₃),
24.8 (COCH₂CH₂CH₂CH₂CH₂CH₂CH₂CH=CHCOOCH₂CH₂OH),
27.9 (COCH₂CH₂CH₂CH₂CH₂CH₂CH₂CH=CHCOOCH₂CH₂OH),
29.0 (COCH₂CH₂CH₂CH₂CH₂CH₂CH₂CH=CHCOOCH₂CH₂OH),
31.8 (COCH₂CH₂CH₂CH₂CH₂CH₂CH₂CH=CHCOOCH₂CH₂OH),
33.9 (COCH₂CH₂CH₂CH₂CH₂CH₂CH₂CH=CHCOOCH₂CH₂OH),
59.6 (COCH₂CH₂CH₂CH₂CH₂CH₂CH₂CH=CHCOOCH₂CH₂OH),
65.9 (COCH₂CH₂CH₂CH₂CH₂CH₂CH₂CH=CHCOOCH₂CH₂OH),
121.4 (COCH₂CH₂CH₂CH₂CH₂CH₂CH₂CH=CHCOOCH₂CH₂OH),
149.8 (COCH₂CH₂CH₂CH₂CH₂CH₂CH₂CH=CHCOOCH₂CH₂OH),
166.2 (COCH₂CH₂CH₂CH₂CH₂CH₂CH₂CH=CHCOOCH₂CH₂OH),
169.1-173.3 (C=O),
63.0 (C-6),
72.0-76.4 (C2, C3, C5),
80.4 (C-4),
100.0 (C-1).

Conversion by $^1$H NMR: 100%, E/Z ratio by $^1$H NMR: 15.2, yield: 97%.

2c. Cellulose acetate 10-undecenoate (2) CM with poly(ethyl glycol) methyl ether acrylate $^1$H NMR (DMSO-d₆):
1.25 (br s, COCH₂CH₂CH₂CH₂CH₂CH₂CH₂CH=CHCOO(CH₂CH₂O)$_x$CH₃),
1.41 (br s, COCH₂CH₂CH₂CH₂CH₂CH₂CH₂CH=CHCOO(CH₂CH₂O)$_x$CH₃),
1.49 (br s, COCH₂CH₂CH₂CH₂CH₂CH₂CH₂CH=CHCOO(CH₂CH₂O)$_x$CH₃),
1.8-2.1 (m, COCH₃),
2.18 (br s, COCH₂CH₂CH₂CH₂CH₂CH₂CH₂CH=CHCOO(CH₂CH₂O)$_x$H),
2.28 (br s, COCH₂CH₂CH₂CH₂CH₂CH₂CH₂CH=CHCOO(CH₂CH₂O)$_x$CH₃),
2.75-5.25 (m, cellulose backbone),
3.23 (s, COCH₂CH₂CH₂CH₂CH₂CH₂CH₂CH=CHCOO(CH₂CH₂O)$_x$CH₃),
3.42, 3.50, 3.61 and 4.17 (m, COCH₂CH₂CH₂CH₂CH₂CH₂CH₂CH=CHCOO(CH₂CH₂O)$_x$CH₃),
5.77 (d, COCH₂CH₂CH₂CH₂CH₂CH₂CH₂CH=CHCOO(CH₂CH₂O)$_x$CH₃, Z configuration),
5.86 (d, COCH₂CH₂CH₂CH₂CH₂CH₂CH₂CH=CHCOO(CH₂CH₂O)$_x$CH₃, E configuration),
6.28 (m, COCH₂CH₂CH₂CH₂CH₂CH₂CH₂CH=CHCOO(CH₂CH₂O)$_x$CH₃, Z configuration),
6.89 (m, COCH₂CH₂CH₂CH₂CH₂CH₂CH₂CH=CHCOO(CH₂CH₂O)$_x$CH₃, E configuration).

Conversion by $^1$H NMR: 100%, E/Z ratio by $^1$H NMR: 33.3, yield: 84%.

2d. Cellulose acetate 10-undecenoate (2) CM with methyl acrylate $^1$H NMR (DMSO-d$_6$):

1.24 (br s, COCH$_2$CH$_2$CH$_2$CH$_2$CH$_2$CH$_2$CH$_2$CH$_2$CH=CHCOOCH$_3$), 1.39 (br s, COCH$_2$CH$_2$CH$_2$CH$_2$CH$_2$CH$_2$CH$_2$CH=CHCOOCH$_3$), 1.50 (br. s, COCH$_2$CH$_2$CH$_2$CH$_2$CH$_2$CH$_2$CH$_2$CH=CHCOOCH$_3$), 1.8-2.1 (m, COCH$_3$), 2.17 (br s, COCH$_2$CH$_2$CH$_2$CH$_2$CH$_2$CH$_2$CH$_2$CH=CHCOOCH$_3$), 2.28 (br s, COCH$_2$CH$_2$CH$_2$CH$_2$CH$_2$CH$_2$CH$_2$CH=CHCOOCH$_3$), 2.75-5.25 (m, cellulose backbone), 5.77 (d, COCH$_2$CH$_2$CH$_2$CH$_2$CH$_2$CH$_2$CH$_2$CH=CHCOOCH$_3$, Z configuration), 5.83 (d, COCH$_2$CH$_2$CH$_2$CH$_2$CH$_2$CH$_2$CH$_2$CH=CHCOOCH$_3$, E configuration), 6.27 (m, COCH$_2$CH$_2$CH$_2$CH$_2$CH$_2$CH$_2$CH$_2$CH=CHCOOCH$_3$, Z configuration), 6.87 (m, COCH$_2$CH$_2$CH$_2$CH$_2$CH$_2$CH$_2$CH$_2$CH=CHCOOCH$_3$, E configuration).

Conversion by $^1$H NMR: 100%, E/Z ratio by $^1$H NMR: 16.7, yield: 94%.

3a. Cellulose acetate 4-pentenoate CM with acrylic acid $^1$H NMR (DMSO-d$_6$):

1.8-2.1 (m, COCH$_3$), 2.43 (br s, COCH$_2$CH$_2$CH=CHCOOH), 2.9-5.3 (m, cellulose backbone), 5.78 (m, COCH$_2$CH$_2$CH=CHCOOH, E and Z configuration), 6.19 (m, COCH$_2$CH$_2$CH=CHCOOH, Z configuration), 6.79 (m, COCH$_2$CH$_2$CH=CHCOOH, E configuration).

Conversion by $^1$H NMR: 100%, E/Z ratio by $^1$H NMR: 15.5, yield: 94%.

3b. Cellulose acetate 4-pentenoate CM with 2-hydroxyethyl acrylate $^1$H NMR (DMSO-d$_6$):

1.8-2.1 (m, COCH$_3$), 2.45 (br s, COCH$_2$CH$_2$CH=CHCOOCH$_2$CH$_2$OH), 2.9-5.3 (m, cellulose backbone), 3.60 (t, COCH$_2$CH$_2$CH=CHCOOCH$_2$CH$_2$OH), 4.07 (t, COCH$_2$CH$_2$CH=CHCOOCH$_2$CH$_2$OH), 5.88 (m, COCH$_2$CH$_2$CH=CHCOOCH$_2$CH$_2$OH, E and Z configuration), 6.28 (m, COCH$_2$CH$_2$CH=CHCOOCH$_2$CH$_2$OH, Z configuration), 6.90 (m, COCH$_2$CH$_2$CH=CHCOOH, E configuration).

$^{13}$C NMR (DMSO-d$_6$):

20.6 (COCH$_3$), 27.9 (COCH$_2$CCH$_2$CH=CHCOOCH$_2$CH$_2$OH), 30.9 (COCH$_2$CH$_2$CH=CHCOOCH$_2$CH$_2$OH), 59.4 (COCH$_2$CH$_2$CH=CHCOOCH$_2$CH$_2$OH), 66.1 (COCH$_2$CH$_2$CH=CHCOOCH$_2$CH$_2$OH), 121.8 (COCH$_2$CH$_2$CH=CHCOOCH$_2$CH$_2$OH), 148.0 (COCH$_2$CH$_2$CH=CHCOOCH$_2$CH$_2$OH), 166.1 (COCH$_2$CH$_2$CH=CHCOOCH$_2$CH$_2$OH), 169.1-173.3 (C=O), 63.0 (C-6), 72.0-76.4 (C2, C3, C5), 80.4 (C-4), 100.0 (C-1).

Conversion by $^1$H NMR: 100%, E/Z ratio by $^1$H NMR: 9.7, yield: 96%.

3c. Cellulose acetate 4-pentenoate CM with poly(ethyl glycol) methyl ether acrylate $^1$H NMR (DMSO-d$_6$):

1.8-2.1 (m, COCH$_3$), 2.44 (br s, COCH$_2$CH$_2$CH=CHCOO(CH$_2$CH$_2$O)$_x$CH$_3$), 2.75-5.25 (m, cellulose backbone), 3.23 (s, COCH$_2$CH$_2$CH=CHCOO(CH$_2$CH$_2$O)$_x$CH$_3$), 3.41, 3.50, 3.61 and 4.17 (m, COCH$_2$CH$_2$CH=CHCOO(CH$_2$CH$_2$O)$_x$CH$_3$), 5.90 (m, COCH$_2$CH$_2$CH=CHCOO CH$_3$, E and Z configuration), 6.31 (m, COCH$_2$CH$_2$CH=CHCOO CH$_3$, Z configuration), 6.90 (m, COCH$_2$CH$_2$CH=CHCOO CH$_3$, E configuration).

Conversion by $^1$H NMR: 100%, E/Z ratio by $^1$H NMR: 8.3, yield: 88%.

General procedure for reduction of the all-unsaturated double bond of the CM products by Pd/C hydrogenation. To a solution of 500 mg CM product dissolved in 50 mL anhydrous THF, 150 mg palladium on carbon (10 wt % loading) was added. The mixture was stirred overnight under 80 psi H$_2$ at room temperature (for compound 3 based sample 3a, after filtrating the mixture through Celite, another 150 mg Pd/C was added and reacted under 80 psi H$_2$ for 12 hours. The cycle was repeated once more (total of three hydrogenations) to make sure that all the double bonds were hydrogenated). The mixture was filtered through Celite, concentrated, and then precipitated into hexanes. The precipitate was collected and dried under vacuum at 40° C.

General procedure for olefin cross-metathesis/hydrogenation one-pot reaction. To a Parr Reactor (vessel volume: 600 mL) charged with cellulose derivative 2 or 3 (400 mg, 1.0 equiv. olefin), 20 mg BHT and 40 mL anhydrous THF were added. After the reagents were completely dissolved, the cross-metathesis partner (acrylic acid, methyl acrylate, 2-hydroxylethyl acrylate, poly(ethylene glycol) methyl ether acrylate, acrylamide, or allyl alcohol; 20 equiv.) was added followed by the addition of Hoveyda-Grubbs Catalyst 2$^{nd}$ Generation (0.05 equiv. in 6 mL THF) via syringe. After stirring for 1 hour under N$_2$ at room temperature, 30 wt % Pd/C was added. The mixture was stirred under 80 psi H$_2$ at room temperature. The subsequent reaction and purification followed that in the general procedure above.

2a'. Hydrogenation product of 2a $^1$H NMR (DMSO-d$_6$):

1.23 (br s, COCH$_2$CH$_2$CH$_2$CH$_2$CH$_2$CH$_2$CH$_2$CH$_2$CH$_2$CH$_2$COOH), 1.47 (br s, COCH$_2$CH$_2$CH$_2$CH$_2$CH$_2$CH$_2$CHCH$_2$CH$_2$COOH), 1.8-2.1 (m, COCH$_3$), 2.17 (COCH$_2$CH$_2$CH$_2$CH$_2$CH$_2$CH$_2$CH$_2$CH$_2$CH$_2$COOH), 2.28 (COCH$_2$CH$_2$CH$_2$CH$_2$CH$_2$CH$_2$CH$_2$CH$_2$CH$_2$COOH), 2.75-5.25 (m, cellulose backbone).

Yield: 90%.

2b'. Hydrogenation product of 2b $^1$H NMR (DMSO-d$_6$):

1.24 (br s, COCH$_2$CH$_2$CH$_2$CH$_2$CH$_2$CH$_2$CH$_2$CH$_2$CH$_2$CH$_2$COOCH$_2$CH$_2$OH), 1.51 (br. s, COCH$_2$CH$_2$CH$_2$CH$_2$CH$_2$CH$_2$CH$_2$CH$_2$CH$_2$COOCH$_2$CH$_2$OH),
1.8-2.1 (m, COCH$_3$),
2.2-2.4 (m, COCH$_2$CH$_2$CH$_2$CH$_2$CH$_2$CH$_2$CH$_2$CH$_2$CH$_2$COOCH$_2$CH$_2$OH),
2.75-5.25 (m, cellulose backbone),
3.54 (t, COCH$_2$CH$_2$CH$_2$CH$_2$CH$_2$CH$_2$CH$_2$CH$_2$CH$_2$CH$_2$COOCH$_2$CH$_2$OH),
4.00 (t, COCH$_2$CH$_2$CH$_2$CH$_2$CH$_2$CH$_2$CH$_2$CH$_2$CH$_2$CH$_2$COOCH$_2$CH$_2$OH).

$^{13}$C NMR (DMSO-d$_6$):
20.9 (COCH$_3$),
24.9 (COCH$_2$CH$_2$CH$_2$CH$_2$CH$_2$CH$_2$CH$_2$CH$_2$CH$_2$COOCH$_2$CH$_2$OH),
28.9 (COCH$_2$CH$_2$CH$_2$CH$_2$CH$_2$CH$_2$CH$_2$CH$_2$CH$_2$COOCH$_2$CH$_2$OH),
33.9 (COCH$_2$CH$_2$CH$_2$CH$_2$CH$_2$CH$_2$CH$_2$CH$_2$CH$_2$COOCH$_2$CH$_2$OH),
59.4 (COCH$_2$CH$_2$CH$_2$CH$_2$CH$_2$CH$_2$CH$_2$CH$_2$CH$_2$COOCH$_2$CH$_2$OH),
65.9 (COCH$_2$CH$_2$CH$_2$CH$_2$CH$_2$CH$_2$CH$_2$CH$_2$CH$_2$CH$_2$COOCH$_2$CH$_2$OH),
173.4 (COCH$_2$CH$_2$CH$_2$CH$_2$CH$_2$CH$_2$CH$_2$CH$_2$CH$_2$CH$_2$COOCH$_2$CH$_2$OH),
169.1-173.3 (C=O),
63.0 (C-6),
72.0-76.4 (C2, C3, C5),
80.4 (C-4),
100.0 (C-1).
Yield: 93%.

2c'. Hydrogenation product of 2c
$^1$H NMR (DMSO-d$_6$):
1.23 (br s, COCH$_2$CH$_2$CH$_2$CH$_2$CH$_2$CH$_2$CH$_2$CH$_2$CH$_2$COO(CH$_2$CH$_2$O)$_x$CH$_3$),
1.50 (br s, COCH$_2$CH$_2$CH$_2$CH$_2$CH$_2$CH$_2$CH$_2$CH$_2$CH$_2$COO(CH$_2$CH$_2$O)$_x$CH$_3$),
1.8-2.1 (m, COCH$_3$),
2.27 (m, COCH$_2$CH$_2$CH$_2$CH$_2$CH$_2$CH$_2$CH$_2$CH$_2$CH$_2$COO(CH$_2$CH$_2$O)$_x$CH$_3$),
2.75-5.25 (m, cellulose backbone),
3.23 (s, COCH$_2$CH$_2$CH$_2$CH$_2$CH$_2$CH$_2$CH$_2$CH$_2$CH$_2$COO(CH$_2$CH$_2$O)$_x$CH$_3$),
3.42, 3.49, 3.58 and 4.10 (COCH$_2$CH$_2$CH$_2$CH$_2$CH$_2$CH$_2$CH$_2$CH$_2$CH$_2$COO(CH$_2$CH$_2$O)$_x$CH$_3$).
Yield: 79%.

2d'. Hydrogenation product of 2d
$^1$H-NMR (CDCl$_3$):
1.28 (br s, COCH$_2$CH$_2$CH$_2$CH$_2$CH$_2$CH$_2$CH$_2$CH$_2$CH$_2$COOCH$_3$),
1.61 (br s, COCH$_2$CH$_2$CH$_2$CH$_2$CH$_2$CH$_2$CH$_2$CH$_2$CH$_2$COOCH$_3$),
1.9-2.1 (m, COCH$_3$),
2.28 (m, COCH$_2$CH$_2$CH$_2$CH$_2$CH$_2$CH$_2$CH$_2$CH$_2$CH$_2$COO(CH$_2$CH$_2$O)$_x$CH$_3$),
3.23-5.25 (m, cellulose backbone),
3.66 (s, COCH$_2$CH$_2$CH$_2$CH$_2$CH$_2$CH$_2$CH$_2$CH$_2$CH$_2$COOCH$_3$).
Yield: 89%.

3a'. Hydrogenation product of 3a
$^1$H NMR (DMSO-d$_6$):
0.81 and 1.25 (alkyl CH$_2$ and CH$_3$), 1.8-2.1 (m, COCH$_3$),
2.49 (COCH$_2$CH$_2$CH$_2$CH$_2$COOH),
2.16 and 2.30 (COCH$_2$CH$_2$CH$_2$CH$_2$COOH),
2.9-5.3 (m, cellulose backbone).
Yield: 79%.

3b'. Hydrogenation product of 3b
$^1$H NMR (DMSO-d$_6$):
0.86 and 1.28 (alkyl CH$_2$ and CH$_3$),
1.54 (br s, COCH$_2$CH$_2$CH$_2$CH$_2$COOCH$_2$CH$_2$OH),
1.8-2.1 (m, COCH$_3$),
2.30 (br s, COCH$_2$CH$_2$CH$_2$CH$_2$COOCH$_2$CH$_2$OH),
2.9-5.3 (m, cellulose backbone),
3.56 (t, COCH$_2$CH$_2$CH$_2$CH$_2$COOCH$_2$CH$_2$OH),
4.02 (t, COCH$_2$CH$_2$CH$_2$CH$_2$COOCH$_2$CH$_2$OH).

$^{13}$C NMR (DMSO-d$_6$):
20.5 (COCH$_3$),
24.2 (COCH$_2$CH$_2$CH$_2$CH$_2$COOCH$_2$CH$_2$OH),
33.5 (COCH$_2$CH$_2$CH$_2$CH$_2$COOCH$_2$CH$_2$OH),
30.9 (COCH$_2$CH$_2$CH=CHCOOCH$_2$CH$_2$OH),
59.4 (COCH$_2$CH$_2$CH$_2$CH$_2$COOCH$_2$CH$_2$OH),
66.0 (COCH$_2$CH$_2$CH$_2$CH$_2$COOCH$_2$CH$_2$OH),
173.2 (COCH$_2$CH$_2$CH$_2$CH$_2$COOCH$_2$CH$_2$OH),
169.1-173.3 (C=O),
63.0 (C-6),
72.0-76.4 (C2, C3, C5),
80.4 (C-4),
100.0 (C-1).
Yield: 74%.

3c'. Hydrogenation product of 3c
0.86 and 1.28 (alkyl CH$_2$ and CH$_3$),
1.54 (br s, COCH$_2$CH$_2$CH$_2$CH$_2$COO(CH$_2$CH$_2$O)$_x$CH$_3$),
1.8-2.1 (m, COCH$_3$),
2.30 (br s, COCH$_2$CH$_2$CH$_2$CH$_2$COO(CH$_2$CH$_2$O)$_x$CH$_3$),
2.9-5.3 (m, cellulose backbone),
3.23 (s, COCH$_2$CH$_2$CH$_2$CH$_2$COO(CH$_2$CH$_2$O)$_x$CH$_3$),
3.41, 3.51, 3.58 and 4.12 (m, COCH$_2$CH$_2$CH$_2$CH$_2$COO(CH$_2$CH$_2$O)$_x$CH$_3$).
Yield: 67%.

Results and Discussion

The inventors' previous results (X. Meng et al. 2014, Biomacromolecules, 15, 177-187; "Meng, 2014a".) showed the power of olefin CM for synthesis of carboxylic acid functionalized cellulose derivatives. Using the selective Hoveyda-Grubbs' 2nd generation catalyst, cellulose alkanoate undec-10-enoate esters (e.g., cellulose acetate propionate undec-10-enoate) were reacted with acrylic acid, resulting in full conversion to cellulose ω-carboxyalkanoates within 1 hour at mild temperatures (40° C.). Not only did this approach provide a new pathway to a broader variety of cellulose ω-carboxyalkanoates, but also raised the possibility that this might be a more widely useful synthetic approach.

Cellulose acetate undec-10-enoate with DS 0.67 of undec-10-enoate (2, m=8 in FIG. 7) was first chosen as starting material. Eight methylene groups separate the terminal olefin and ester carbonyl, providing high olefin electron density and minimal steric hindrance, and making this terminal olefin a reactive substrate for Grubbs' catalysts (A. K. Chatterjee et al., *J. Am. Chem. Soc.*, 2003, 125, 11360-11370; "Chatterjee, 2003"). The inventors first tested the efficiency of allyl alcohol as a CM partner, but observed only about 60% conversion. Replacing allyl alcohol with 3-buten-2-ol, which has a more sterically hindered olefin and would hence be less prone to self-metathesis, did not improve conversion (data not shown). According to Grubbs' CM rules (Chatterjee, 2003) reaction efficiency depends largely on catalyst type, as well substrate reactivity. Generally, type I olefins (electron rich and/or less sterically hindered, e.g. terminal olefins) are reactive but unselective. In contrast, electron deficient and/or sterically hindered olefins, which can be categorized into type II or III olefins (e.g. acrylic acid and acrylates) are less reactive but more selective. While an olefin metathesis reaction between a type I olefin and a type II or type III olefin tends to give CM products, a reaction between two type I olefins is more likely to generate a mixture of CM and self-metathesis (SM) products. Apparently the olefin electron density of allyl alcohols is sufficient to make them react as type I olefins, leading to competition with allyl alcohol homodimerization and suboptimal conversions (Lin., *J. Am. Chem. Soc.,* 2008, 130, 9642-9643). Note however that in some cases 60% conversion could be more than adequate, especially since residual double bonds can be readily reduced (vide infra).

Unprotected allyl amine on the other hand provided no evidence of conversion to CM products (data not shown). This is likely due not only to the low selectivity of the electron-rich double bond of allyl amine, but also to the likely coordination of the amine with ruthenium, thereby suppressing its catalytic activity (T. L. Choi et al., *Angew. Chem., Int. Ed.,* 2001, 40, 1277-1279.; and C. P. Woodward et al., *Chem. Commun.,* 2011, 47, 779-781).

These unsatisfying results led the inventors to acrylates, which are typically type II or III olefins due to the proximity of the electron-withdrawing carbonyl group to the olefin. In this work the inventors studied three representative acrylate partners; the simple ester methyl acrylate (MA), as well as an acrylate ester with a bifunctional alcohol that can be used to append other functionality, 2-hydroxyethyl acrylate (HEA), as well as poly(ethylene glycol) methyl ether acrylate (PEGMEA) (average $M_n$=480 Da).

The inventors included acrylic acid (AA) for comparison, especially for the cellulose pentenoate examples (see table in FIG. 8). The inventors were pleased to find that all examined acrylates and acrylate esters gave nearly 100% conversion with perfect selectivity for CM products under mild conditions (40° C., 1 h, THF, 5 mol % Hoveyda-Grubbs catalyst, 20:1 ratio of acrylate to cellulose ester). CM reaction with HEA will serve to exemplify the results obtained. Successful CM was supported by the FTIR spectra (FIG. 9). For example, the peak at 3074 $cm^{-1}$ in the spectrum of starting cellulose undec-10-enoate 2, assigned to CHR stretch of the terminal olefin RCH=CH2, is absent from the spectrum of the new CM product 2b. A new absorbance at 1700 $cm^{-1}$, assigned to the C=O stretch of the α, β-unsaturated 2-hydroxyethyl ester, was observed for 2b on the shoulder of the cellulose ester C=O stretch peak at 1751 $cm^{-1}$. Further, the C=C stretch signal of the terminal olefin (CHR=CH2) in 2 at 1643 $cm^{-1}$ was shifted to higher frequency 1650 $cm^{-1}$ (CHR=CHR (mostly trans as determined by $^1$H NMR)).

Proton NMR (FIG. 10) is an excellent tool for monitoring the CM reaction; disappearance of the terminal olefin signals of 2 at 4.90 and 5.75 ppm, and emergence of new downfield signals for the α, β-unsaturation (E configuration, 5.86 and 6.89 ppm for 2b), are diagnostic for occurrence and extent of CM, since these resonances are sharp and well-separated from each other and all other resonances of these cellulose derivatives. The corresponding signals of olefinic protons from the minor Z configuration product were observed at 5.77 and 6.28 ppm (Z/E double bond ratios determined by integration of these signals are listed in Table 1). Complete conversion of terminal olefin to α, β-unsaturated ester was thereby confirmed. The inventors did not expect that there would be loss of the acyl groups (e.g. acetate) under these mild reaction conditions, but the $^1$H NMR spectra confirmed this. Substituent DS was calculated by $^1$H NMR integration (FIG. 8), confirming that under these benign CM conditions the ester substituents largely remain untouched. $^{13}$C NMR analysis provides further evidence of the clean and complete nature of these CM reactions (FIG. 11). The terminal olefin resonances of compound 2 at 114 and 139 ppm completely disappeared, while new peaks that were assigned to the α, β-unsaturated carbons of 2b appeared downfield at 122 and 148 ppm. Similar results were observed in CM reactions between 2 and AA, PEGMEA (average Mn=480 Da), and MA, giving complete conversion to CM products 2a, 2c and 2d respectively. Although it was not surprising that small acrylates like HEA and MA were effective CM partners, the inventors were pleasantly surprised to observe complete CM conversion with a PEG functionalized acrylate, PEGMEA, considering the potential for steric interference between the cellulose chain and that of the polymeric PEGMEA (average $M_n$ of 480 Da). This invites speculation that a variety of acrylate end-functionalized polymers might also be feasible CM partners for polysaccharide derivatives like these. This modular reaction, like click reactions such as the azide-alkyne Huisgen cycloaddition reaction (N. Pahimanolis et al., *Carbohydr. Polym.,* 2010, 82, 78-82; K. Negishi et al., *Polymers,* 2011, 3, 489-508; and A. M. Eissa et al. *Carbohydr. Polym.,* 2012, 90, 859-869) and "thiolene" reaction (G.-L. Zhao et al., *Rapid Commun.,* 2010, 31, 740-744; Q. Zhang et al., *Chem. Commun.,* 2012, 48, 8063-8065; and P. Tingaut et al., *J. Mater. Chem.,* 2011, 21, 16066-16076) may create potential for the synthesis of polysaccharide-based graft copolymers by a "grafting to" approach.

In the inventors' previous work, (Meng, 2014a), it was noticed that the CM products of cellulose 10-undecenoate esters and acrylic acid appeared to crosslink during storage. The inventors proposed that free radical oligomerization of the pendant α, β-unsaturated carboxylic acids was responsible for the crosslinking, as supported by the fact that added free radical scavenger (BHT) suppressed the crosslinking. In the current study, similar phenomena were observed for some of the inventors' products. Although adding BHT delayed the crosslinking process, the CM products became insoluble after weeks or months of storage, which may be attributed to consumption of the free radical scavenger, and/or the involvement of other crosslinking mechanisms (e.g. secondary olefin metathesis due to residual catalyst, although the inventors consider this unlikely).

Considering that most imaginable crosslinking mechanisms are related to the α, β-unsaturation, it should be possible to eliminate the possibility of crosslinking if one is able to reduce the olefin. Palladium catalyzed hydrogenation has been previously used in carbohydrate and polysaccharide chemistry to reduce double bonds (C. R. Reddy et al., *J. Org. Chem.,* 2013, 78, 4251-4260) without impacting other functional groups. Therefore the inventors pursued palladium catalyzed reduction of CM product olefins. Purified, dried CM products were hydrogenated ($H_2$, Pd/C (10 wt % Pd (dry basis)/C)) at room temperature in THF. For the undec-10-enoate-based derivatives (2a-2d), only ca. 50% olefin hydrogenation was observed using a hydrogen balloon and Pd/C. Higher hydrogen pressure (80 psi) in a Parr reactor was more successful, affording fully hydrogenated products (2a'-2d') (see table in FIG. 12). $^1$H NMR spectra of 2b and 2b' (FIG. 10) showed that both E olefinic protons at 5.8 and 6.9 ppm and Z olefinic protons at 5.3 and 6.7 ppm were entirely absent from the spectrum of 2b', indicating complete olefin hydrogenation. The $^{13}$C NMR spectrum of 2b provided further confirmation, showing disappearance of the α, β-unsaturated double bond carbon signals at 122 and 148 ppm in 2b after hydrogenation. FTIR spectra of 2b'

(FIG. 9) show disappearance of the previous shoulder peak at 1700 cm$^{-1}$, which was assigned to the C═O stretch of the α, β-unsaturated methyl ester 2b. Moreover, after hydrogenation, the sharp C═C stretch (CHR∇CHR, trans) signal around 1650 cm$^{-1}$ also disappeared, revealing the previously hidden H$_2$O vibrational peak. FIG. 13 shows $^1$H NMR spectra of terminally olefinic cellulose acetate pent-4-enoate 3, CM product (with HEA) 3b, and hydrogenated product 3b'. FIG. 14 shows $^{13}$C NMR spectra of terminally olefinic cellulose acetate pent-4-enoate 3, CM product (with HEA) 3b, and hydrogenated product 3b'.

Since THF is a good solvent for both the CM reaction and the subsequent hydrogenation, the inventors wished to explore the potential efficiency of a one-pot reaction. Therefore, hydrogenation catalyst (Pd/C) was added directly to the reaction mixture after completion of CM, and the reaction mixture subjected to hydrogen pressure (80 psi). After hydrogenation, product $^1$H NMR and FTIR spectra were identical to those of products obtained by the two-step pathway, showing the feasibility of this one-pot synthesis. Considering the possibility of crosslinking (sometimes rapid) of olefin-containing CM products already described (vide supra), the potential for immediate, one-pot olefin reduction is of special importance.

The inventors expected that the length of the tether between the terminal double bond and the ester carbonyl might impact CM efficiency, due to the potential for steric interference of the cellulose main chain with ruthenium complexation in the cases of shorter tethers. To test the potential for such effects, cellulose acetate pent-4-enoate (DS pent-4-enoate 0.56, (CA-Pen, 3)) was synthesized and used in CM reactions. Reaction of CM partners including AA, HEA and PEGMEA with CA-Pen under the same conditions as used for the reactions with the undec-10-enoate esters showed similar results. Full conversion to CM products was achieved ($^1$H NMR, FTIR), with essentially no loss of ester substituents during CM. These results show that a 2 carbon spacer between ester carbonyl and terminal double bond is enough for successful, complete CM reaction. For the pent-4-enoate-based derivatives (3a-3c), however, heterogeneous hydrogenation (Pd/C) reduced less than 30% of the double bonds in an overnight reaction at hydrogen pressure as high as 140 psi. Given the fact that the olefins in 3a-3c are only 3 carbons away from the cellulosic backbone, it is reasonable to attribute the failure of the heterogeneous hydrogenation to steric interference by the cellulose chain which kept the double bonds from proper interactions with the Pd/C surface (R. F. Heck, *Palladium Reagents in Organic Synthesis*, Academic Press, New York, 1985). To overcome this difficulty, homogeneous hydrogenation was performed on the 4-pentenoate-based derivatives using 2 wt % Crabtree's catalyst (R. Crabtree, *Acc. Chem. Res.*, 1979, 12, 331-337). or 3 mol % Wilkinson's catalyst (J. A. Osborn et al., *J. Chem. Soc. A: Inorg., Phys., Theoretical*, 1966, 1711-1732, DOI: 10.1039/J19660001711) under 80 psi H2 in THF. NMR spectra (FIGS. 13 and 14) of the hydrogenated products of 3a-3c clearly indicated successful hydrogenation in similar fashion as described for 2a-2c. However, for 3a, the resulting hydrogenated products could not be redissolved in THF, and were only partially soluble in DMSO. To obtain soluble hydrogenated product 3a', three cycles of heterogeneous hydrogenation (Pd/C) were performed (as described in the Methods section). The product obtained in this way was readily soluble, and the double bond was fully reduced as proven by $^1$H NMR as well as FTIR.

The inventors used SEC to characterize any change in DP resulting from the CM reaction. Considering that the CM products were prone to cross-link during storage, only hydrogenated samples were analyzed by SEC (FIG. 12). For 2a'-2d' and 3a', both chain scission and chain coupling (due to intermolecular self-metathesis (SM)) were negligible during CM as well as Pd/C catalyzed hydrogenation, indicated by the nearly unchanged DP and dispersity (Đ); IUPAC has discouraged use of the term polydispersity index (PDI), which had been used to describe polymer molecular weight distribution, and replaced it with the term dispersity, represented by the symbol Đ (R. F. T. Stepto, *Pure Appl. Chem.*, 2009, 81, 351-353). These results are consistent with the inventors' previous observations (Meng, 2014a). The excess of CM partner used (20 equiv.) enhanced the likelihood of the cellulosic terminal double bonds meeting and reacting with a CM partner rather than with another terminal double bond, effectively suppressing SM crosslinking. The mild reaction conditions of both the CM and catalytic hydrogenation reactions, on the other hand, minimized the likelihood of chain scission, and so preserved polymer DP. However, it is noteworthy that 3b' and 3c', for which the inventors employed homogeneous hydrogenation catalysts (Wilkinson's or Crabtree's) due to incomplete hydrogenation using Pd/C, had much higher DP than their shared starting material 3. The same phenomenon was observed upon homogeneous hydrogenation of 2b (DP~345 compared with DP~149 for 2b'). Combined with the fact that the homogeneous hydrogenation products of 3a lost their solubility, it is possible that the increased DP of 3b' and 3c' might be due to undetermined side reactions during homogeneous hydrogenation, or physical crosslinking by the hydrogenation catalysts.

Glass transition temperature ($T_g$), which reflects the molecular mobility of a polymer, influences the polymer's physicochemical properties including viscoelasticity, brittleness, and physical and chemical stability. It becomes a critical parameter in applications like amorphous solid dispersion formulation (J. A. Baird and L. S. Taylor, Adv. Drug Delivery Rev., 2012, 64, 396-421) where polymers are used as matrices to trap drug molecules in amorphous form, thereby enabling generation of supersaturated aqueous solutions. At temperatures below the formulation $T_g$, the restricted molecular mobility of the polymer will prevent drug molecule migration and therefore crystallization. For this reason, polymers with $T_g$ at least 50° C. higher than ambient temperature are highly desirable to keep the formulation $T_g$ above ambient temperature in spite of the plasticizing effects of both drug and atmospheric moisture. The inventors employed DSC to determine $T_g$ values of the inventors' CM products. Elimination of the double bond by hydrogenation did not significantly affect polymer Tg. Although all other polymers exhibited $T_g$ values at least 50° C. above room temperature, 2c' did not display a detectable glass transition between −40 and 190° C. either by standard or modulated DSC. This may be attributed to the relatively high DS of the PEG tail and its plasticizing effect. Polymers synthesized from 3 cellulose acetate pent-4-enoate (3a'-3c') had much higher $T_g$ values (≥25° C. higher) than those of their counterparts (2a'-2c') synthesize from the corresponding cellulose acetate undec-10-enoate (2), which is likely due to internal plasticization by the long (>11 carbons) chains, as well as the slightly lower DS of the pentenoate substituents compared to 2a'-2c'.

CONCLUSIONS

The inventors provide an expanded vision of a new, modular method for synthesis of cellulose derivatives that can expand the utility of conventional substitution methods like esterification and etherification. The inventors do so by introducing the concept of attaching a handle for olefin cross metathesis by these conventional methods, followed by modular CM to introduce a plethora of new functional groups. The inventors demonstrate that readily available acrylate esters are highly effective CM partners, providing the capability to introduce α, β-unsaturated ester moieties in controlled and selective fashion as side chains of cellulose. The inventors show how the unsaturation can be eliminated by catalytic hydrogenation, even in a one-pot overall reaction, to remove the reactivity and instability introduced by that functional group. At the same time it is clear that the α, β-unsaturation could be used alternatively as a handle for introduction of still other functionality, e.g. by Michael addition of an amine (C. Hiemstra et al., *Macromolecules*, 2007, 40, 1165-1173). The inventors demonstrate also that such acrylate esters may bear terminal hydroxyl groups and still be effective CM partners (2-hydroxyethyl acrylate, poly (ethylene glycol) methyl ether acrylate). These create still more potential for functionalization by reaction with the hydroxyl group (distant from the main cellulose chain and so relatively unhindered). The inventors predict that such functionalization could be carried out prior to the CM reaction by modifying the CM partner, or after CM and/or after the CM/hydrogenation sequence. Some limitations upon this modular CM method for functionalization of cellulose become apparent as well. The double bonds of allylic alcohols may in some cases be too self-reactive (Type 1 by Grubbs' rules) to serve as optimal CM partners, although the 60% conversions achieved might be perfectly useful and acceptable depending on the particular synthetic goal. In contrast, unprotected amines do not appear to be effective CM partners for these terminally unsaturated cellulose esters, most likely due to their propensity to coordinate and thus inactivate the ruthenium catalyst.

It is interesting to compare this chemistry to the definition of a polymer click chemistry reaction recently put forth in eloquent fashion by Barner-Kowollik et al. (C. Barner-Kowollik, et al., *Angew. Chem., Int. Ed.,* 2011, 50, 60-62). Clearly the reaction occurs rapidly and under mild conditions, is chemoselective and has a single reaction trajectory, affords high yields, is modular and wide in scope, and lends itself to easy product purification, as required by the authors' definition of a polymer click reaction. It does not meet their definition in the sense that the initial products are not fully stable (though they are after the hydrogenation step), and especially in that equimolarity of reagents is not ideal for achieving high yields and selectivity for CM to the exclusion of SM. Therefore the inventors feel that characterizing the reaction as modular and click-like is appropriate, though it does not meet all the click criteria as defined by these authors.

Overall, the mild nature of this CM chemistry, and the inventors' growing appreciation of the potential variety of CM partners that can be used, illustrate its high potential for modular modifications of terminally unsaturated cellulose derivatives. Compared with other potential "click" partners, the terminal olefins required for this "click-like" reaction are more readily accessible and can be elaborated with various functional moieties by, for example, simple esterification with acrylic acid.

Moreover, the approach is very likely to be applicable to other polysaccharides as well. This example of the marriage of polysaccharide chemistry with organometallic chemistry not only illuminates multiple pathways to novel polysaccharide derivatives, but also creates a valuable platform for structure-activity relationship studies. By modular addition of a variety of CM partners (potentially containing a variety of functional group types) to a single terminally unsaturated polysaccharide derivative, a family of polysaccharide derivatives can be prepared that share identical Mw, DS, substitution pattern, and monosaccharide sequence, differing only in the side-chain functional groups. This synthetic strategy will enable unambiguous investigation of structure—activity relationships with regard, for example, to different appended functional groups, thereby enriching our understanding of these attractive derivatives of natural polysaccharides.

Example 3

Experimental

Materials. Ethyl cellulose N50 (EC2.58, Mw=56 KDa, DP=240 as determined by size exclusion chromatography) was from Ashland Specialty Chemical Company. DS(Et) was determined by perpropionylation (SI). Allyl chloride, 5-bromo-pent-1-ene, 11-bromo-undec-1-ene, anhydrous tetrahydrofuran (THF), acrylic acid, methyl acrylate, 2-hydroxy ethyl acrylate, poly(ethylene glycol) methyl ether acrylate, poly(propylene glycol) methyl ether acrylate, 3,5-di-tert-butylhydroxytoluene (BHT), and Hoveyda-Grubb's $2^{nd}$ generation catalyst were purchased from Sigma-Aldrich. Monopotassium phosphate ($KH_2PO_4$), dimethyl sulfoxide (DMSO), dichloromethane, ethanol and isopropanol were purchased from Fisher Scientific. Sodium hydride (NaH) and potassium phosphate dibasic ($K_2HPO_4$) were from Acros Organics. Ethyl vinyl ether was purchased from Fluka Analytical. All reagents were used as received without further purification. Dialysis tubing (MWCO 3500 Da) was purchased from Fisher Scientific.

Measurements. $^1$H NMR spectra were acquired on a Bruker Avance 500 spectrometer operating at 500 MHz. Samples were analyzed as solutions in $CDCl_3$ or DMSO-$d_6$ (ca. 10 mg/mL) at 25° C. in standard 5 mm o.d. tubes. Three drops of trifluoroacetic acid were added to shift the water peak in DMSO-$d_6$ downfield from the spectral region of interest. $^{13}$C NMR spectra were acquired on Bruker 500 MHz spectrometer with a minimum of 5000 scans in DMSO-$d_6$ (ca. 40 mg/mL). FT-IR spectra were obtained on a Nicolet 8700 instrument using KBr powder as matrix. $T_g$ values were obtained by differential scanning calorimetry (DSC) on a TA instruments Q100 apparatus using heat/cool/heat mode. Dry powders (ca. 5 mg) were loaded in Tzero aluminum pans; each sample was equilibrated at −50 or −20° C. and then heated to 150° C. at 20° C. $min^{-1}$. The sample was then quenched at 100° C. $min^{-1}$ to −50° C. During the second heating cycle the sample was heated to 190° C. at 20° C. $min^{-1}$. For transitions that were not sufficiently resolved, modulated DSC (MDSC) was performed: sample first equilibrated at −25° C. and then gradually heated up to 190° C. with the underlying ramp heating rate as 3° C./min and the oscillation amplitude ±0.5° C. with oscillation period 60 s. Size exclusion chromatography (SEC) was performed in HPLC grade THF or DMAc/LiCl at 40° C. at flow rate 1 mL/min using a Waters size exclusion chromatography equipped with an autosampler, three in-line 5 μm PLgel Mixed-C columns, and a Waters 410 refractive index (RI) detector operating at 880 nm, which was programmed to a polystyrene calibration curve.

Preparation of Allyl Ethyl Cellulose (EC2.58C3) Ethyl cellulose EC2.58 (1.0 g, 4.30 mmol AGU, 1.85 mmol —OH) was dissolved in 10 mL anhydrous THF at room temperature with mechanical stirring. NaH (95%, 0.47 g, 18.5 mmol, 10 equiv) was added. The solution was cooled to 0° C., then allyl chloride (1.42 g, 18.5 mmol, 10 equiv) was added dropwise with vigorous stirring. The solution was stirred at room temperature for 1 day and at 50° C. for three days. Solidification occurred during this process, but after the temperature reached 50° C., the solid gradually disappeared. The reaction was quenched by isopropanol to destroy residual NaH, and then the mixture was poured into 500 mL pH 7.4 buffer (7.14 g $K_2HPO_4$ and 3.54 g $KH_2PO_4$ in 1000 mL deionized water). The resulting precipitate was collected by vacuum filtration, washed with water and ethanol, and dried overnight under vacuum at 40° C.

$^1$H NMR (500 MHz, $CDCl_3$):
1.14 (br s, $OCH_2C\underline{H}_3$),
2.85-5.58 (m, cellulose backbone, $OC\underline{H}_2CH_3$ and $OC\underline{H}_2CH=CH_2$),
4.95-5.35 (dq, $OCH_2CH=C\underline{H}_2$),
5.80-6.05 (m, $OCH_2C\underline{H}=CH_2$).

$^{13}$C NMR (500 MHz, $CDCl_3$):
16.0 ($OCH_2\underline{C}H_3$),
66.8 ($O\underline{C}H_2CH_3$),
68.6 ($O\underline{C}H_2CH=CH_2$),
72.4 (C6),
74.3 (C5),
75.6 (C2),
82.3 (C4),
83.9 (C3),
103.3 (C1),
115.6 ($OCH_2CH=\underline{C}H_2$),
136.7 ($OCH_2\underline{C}H=CH_2$).

DS by $^1$H NMR: DS (Et) 2.58, DS (allyl) 0.38; yield: 93%.

Similar procedures were followed for the preparation of EC2.58C5, EC2.58C7 and EC2.58C11 using 5-bromo-1-pentene, 7-bromo-1-heptene and 11-bromo-1-undecene under NaH catalyst. The last two polymers were purified as follows: EC2.58C7 was centrifuged after precipitation into buffer, the upper liquid was then discarded and the polymer was collected and washed sufficiently by hexane to remove the alkyl halide reagent before vacuum drying. EC2.58C11 was dialyzed against ethanol for three days with ethanol replaced five times and in water for another two days before freeze-drying.

EC2.58C5.
$^1$H NMR (500 MHz, $CDCl_3$):
1.14 (br s, $OCH_2C\underline{H}_3$),
1.63 (s, $OCH_2CH_2C\underline{H}_2CH=CH_2$),
2.08 (s, $OCH_2C\underline{H}_2CH_2CH=CH_2$),
2.85-4.50 (cellulose backbone, $OC\underline{H}_2CH_3$ and $OC\underline{H}_2CH_2CH_2CH=CH_2$),
4.80-5.12 (m, $OCH_2CH_2CH_2CH=C\underline{H}_2$),
5.81 (m, $OCH_2CH_2CH_2C\underline{H}=CH_2$).

$^{13}$C NMR (500 MHz, $CDCl_3$):
15.6 ($OCH_2\underline{C}H_3$),
29.5 ($OCH_2\underline{C}H_2CH_2CH=CH_2$),
30.3 ($OCH_2CH_2\underline{C}H_2CH=CH_2$),
66.4 ($O\underline{C}H_2CH_3$),
68.2 ($O\underline{C}H_2CH_2CH_2CH=CH_2$),
72.6 (C6),
75.5 (C5),
77.5 (C2),
81.8 (C3),
83.6 (C4),
102.8 (C1),
114.1 ($OCH_2CH_2CH_2CH=\underline{C}H_2$),
139.0 ($OCH_2CH_2CH_2\underline{C}H=CH_2$).

DS by $^1$H NMR: DS (Et) 2.58, DS (C5) 0.38; yield: 89%.

EC2.58C7.
$^1$H NMR (500 MHz, $CDCl_3$):
1.15 (m, $OCH_2C\underline{H}_3$),
1.25-1.37 (m, $OCH_2CH_2C\underline{H}_2C\underline{H}_2CH_2CH=CH_2$),
1.54 (m, $OCH_2C\underline{H}_2CH_2CH_2CH_2CH=CH_2$),
2.05 (q, $OC\underline{H}_2CH_2CH_2CH_2CH_2CH=CH_2$),
2.83-4.50 (m, cellulose backbone, $OC\underline{H}_2CH_2$ and $OC\underline{H}_2CH_2CH_2CH_2CH_2CH=CH_2$),
4.85-5.05 (dd, $OCH_2CH_2CH_2CH_2CH_2CH=C\underline{H}_2$),
5.79 (m, $OCH_2CH_2CH_2CH_2CH_2C\underline{H}=CH_2$).

DS by $^1$H NMR: DS (Et) 2.58, DS (C7) 0.41; yield: 86%.

EC2.58C11.
$^1$H NMR (500 MHz, $CDCl_3$):
1.15 (m, $OCH_2C\underline{H}_3$),
1.25-1.37 (m, $OCH_2CH_2C\underline{H}_2C\underline{H}_2CH_2CH_2CH_2C\underline{H}_2CH_2CH=CH_2$),
1.80-1.92 (m, $OCH_2C\underline{H}_2CH_2CH_2CH_2CH_2CH_2CH_2CH=CH_2$),
2.04 (q, $OC\underline{H}_2CH_2CH_2CH_2CH_2CH_2CH_2CH_2CH=CH_2$),
2.85-4.50 (m, cellulose backbone, $OC\underline{H}_2CH_2$ and $OC\underline{H}_2CH_2CH_2CH_2CH_2CH_2CH_2CH_2CH=CH_2$),
4.88-5.04 (dd, $OCH_2CH_2CH_2CH_2CH_2CH_2CH_2CH_2CH=C\underline{H}_2$),
5.82 (m, $OCH_2CH_2CH_2CH_2CH_2CH_2CH_2CH_2C\underline{H}=CH_2$).

DS by $^1$H NMR: DS (Et) 2.58, DS (C11) 0.36; yield: 74%.

General Procedure for Olefin Metathesis of Pent-4-enyl Ethylcellulose with Acrylic Acid in DCM or THF. To a flask charged with EC2.58C5 (100 mg, 0.38 mmol AGU, 0.14 mmol terminal olefin), 5 mg BHT and 3 mL DCM or THF were added. The mixture was stirred under $N_2$ protection at 37° C. for DCM system (or THF) until all reagents were completely dissolved. Then acrylic acid (0.42 g, 5.8 mmol, 40 equiv) was added, followed by Hoveyda-Grubbs' $2^{nd}$ generation catalyst C3 (4.4 mg, 5 mol % based on olefin, dissolved in DCM or THF). After stirring at 40° C. for 2 h, the reaction was stopped by adding 2 drops of ethyl vinyl ether. For DCM as solvent, after quenching the reaction with ethyl vinyl ether, the reaction solution was dialyzed in a 600 mL beaker against EtOH overnight, then the medium was changed to water and dialyzed for another day, with both EtOH and water changed twice during dialysis. When THF was the solvent, the product was precipitated in water and sufficiently washed by water before vacuum drying at 40° C.

General Procedure for Olefin Metathesis of Pent-4-enyl Ethylcellulose with Acrylic Acid as Solvent and Reagent. To a flask charged with EC2.58C5 (100 mg, 0.38 mmol AGU, 0.14 mmol terminal olefin), 5 mg BHT and 3 mL acrylic acid were added. The mixture was stirred under $N_2$ protection at 40° C. until all reagents were completely dissolved. Then Hoveyda-Grubbs' $2^{nd}$ generation catalyst C3 (4.4 mg, 5 mol %, dissolved in 3 mL acrylic acid) was added. After stirring at 40° C. for 2 h, the reaction was stopped by adding 2 drops of ethyl vinyl ether. The solution was added to water to precipitate the product. The product was collected by vacuum filtration, then was sufficiently washed with water before vacuum drying at 40° C.

General Procedure for Olefin Metathesis of Pent-4-enyl Ethylcellulose EC2.58C5 with Methyl Acrylate in DCM. To a flask charged with EC2.58C5 (100 mg, 0.38 mmol AGU, 0.14 mmol terminal olefin), 5 mg BHT and 3 mL DCM were added, and the mixture was stirred under $N_2$ protection at 37° C. until all reagents were completely dissolved. Then methyl acrylate (0.50 g, 5.8 mmol, 40 equiv) was added followed by Hoveyda-Grubbs' 2nd generation catalyst C3 (4.4 mg, 5 mol %, dissolved in DCM). After 2 h reaction, two drops of ethyl vinyl ether was added to stop CM. The product was dialyzed in a 600 mL beaker against EtOH overnight, then against water for one more day, with both EtOH and water changed twice every 24 h. The CM product precipitated during dialysis, then was collected by filtration and vacuum dried overnight at 40° C.

Similar procedures were performed for CM of EC2.58C3, EC2.58C7 and EC2.58C11 in other solvent systems.

EC2.58C3-AA.
$^1$H NMR (500 MHz, CDCl$_3$):
1.15z (br s, OCH$_2$CH$_3$),
2.85-5.58 (m, cellulose backbone, OCH$_2$CH$_3$ and OCH$_2$CH=CH$_2$),
4.95-5.35 (dq, unreacted OCH$_2$CH=CH$_2$),
5.80-6.05 (m, unreacted OCH$_2$CH=CH$_2$),
6.05-6.18 (m, OCH$_2$CH=CHCOOH),
6.96 (m, OCH$_2$CH=CHCOOH).

EC2.58C5-AA.
$^1$H NMR (500 MHz, CDCl$_3$):
1.14 (br s, OCH$_2$CH$_3$),
1.67 (s, OCH$_2$CH$_2$CH$_2$CH=CHCOOH),
2.28 (s, OCH$_2$CH$_2$CH$_2$CH=CHCOOH),
2.85-4.50 (cellulose backbone, OCH$_2$CH$_3$ and OCH$_2$CH$_2$CH$_2$CH=CHCOOH),
5.75 (m, OCH$_2$CH$_2$CH$_2$CH=CHCOOH, Z configuration),
5.83 (m, OCH$_2$CH$_2$CH$_2$CH=CHCOOH, E configuration),
6.29 (m, OCH$_2$CH$_2$CH$_2$CH=CHCOOH, Z configuration),
6.99 (m, OCH$_2$CH$_2$CH$_2$CH=CHCOOH, E configuration).
$^{13}$C NMR (500 MHz, CDCl$_3$):
16.0 (OCH$_2$CH$_3$),
28.9 (OCH$_2$CH$_2$CH$_2$CH=CHCOOH),
29.2 (OCH$_2$CH$_2$CH$_2$CH=CHCOOH),
66.8 (OCH$_2$CH$_3$), 68.6 (OCH$_2$CH$_2$CH$_2$CH=CHCOOH),
72.5 (C6),
75.6 (C5),
77.5 (C2),
82.2 (C3),
83.9 (C4),
103.2 (C1),
121.2 (OCH$_2$CH$_2$CH$_2$CH=CHCOOH),
150.2 (OCH$_2$CH$_2$CH$_2$CH=CHCOOH),
167.6 (OCH$_2$CH$_2$CH$_2$CH=CHCOOH).
CM conversion by $^1$H NMR: 100%, E/Z ratio 11.1; yield: 92%.

EC2.58C5-MA.
$^1$H NMR (500 MHz, CDCl$_3$):
1.12 (br s, OCH$_2$CH$_3$),
1.68 (s, OCH$_2$CH$_2$CH$_2$CH=CHCOOCH$_3$),
2.27 (s, OCH$_2$CH$_2$CH$_2$CH=CHCOOCH$_3$),
2.85-4.50 (cellulose backbone, OCH$_2$CH$_3$ and OCH$_2$CH$_2$CH$_2$CH=CHCOOCH$_3$),
5.73 (d, OCH$_2$CH$_2$CH$_2$CH=CHCOOCH$_3$, Z configuration),
5.82 (d, OCH$_2$CH$_2$CH$_2$CH=CHCOOCH$_3$, E configuration),
6.27 (m, OCH$_2$CH$_2$CH$_2$CH=CHCOOCH$_3$, Z configuration),
6.97 (m, OCH$_2$CH$_2$CH$_2$CH=CHCOOCH$_3$, E configuration).
CM conversion by $^1$H NMR: 100%, E/Z ratio 12.5; yield: 90%.

EC2.58C5-HEA.
$^1$H NMR (500 MHz, CDCl$_3$):
1.13 (br s, OCH$_2$CH$_3$),
1.67 (s, OCH$_2$CH$_2$CH$_2$CH=CHCOOCH$_2$CH$_2$OH),
2.12-2.38 (mf, OCH$_2$CH$_2$CH$_2$CH=CHCOOCH$_2$CH$_2$OH),
2.85-4.50 (cellulose backbone, OCH$_2$CH$_3$ and OCH$_2$CH$_2$CH$_2$CH=CHCOOCH$_2$CH$_2$OH, OCH$_2$CH$_2$CH$_2$CH=CHCOOCH$_2$CH$_2$OH),
5.78 (d, OCH$_2$CH$_2$CH$_2$CH=CHCOOCH$_2$CH$_2$OH, Z configuration),
5.95 (d, OCH$_2$CH$_2$CH$_2$CH=CHCOOCH$_2$CH$_2$OH, E configuration),
6.34 (m, OCH$_2$CH$_2$CH$_2$CH=CHCOOCH$_2$CH$_2$OH, Z configuration),
6.97 (m, OCH$_2$CH$_2$CH$_2$CH=CHCOOCH$_2$CH$_2$OH, E configuration).
CM conversion by $^1$H NMR: 100%, E/Z ratio 11.8; yield: 95%.

Results and Discussion

The inventors began their exploration of CM of cellulose ether derivatives using commercially available ethyl cellulose with DS(Et) of 2.58 (EC2.58, or 1), since the ethyl groups should provide needed hydrophobicity for attaining good miscibility with hydrophobic drugs, by analogy to the inventors' earlier design of cellulose esters for ASDs (Liu, H., et al. (2014). Synthesis and structure-property evaluation of cellulose ω-carboxyesters for amorphous solid dispersions. Carbohydrate Polymers, 100(0), 116-125). The DS(Et) was measured as 2.58 by perpropionylation (in order to eliminate CH—OH couplings and simplify the spectra) followed by $^1$H NMR analysis. DS(Et) was calculated using the ratio of propionate methylene protons to the backbone hydrogens as surrogate for the free OH groups in the starting EC; by this method the DS(OH) is 0.42 and so the DS(Et) is 2.58 by difference.

The inventors investigated etherification of 1 by use of sodium hydride base in THF solution, using alkyl halides as electrophiles. The inventors used this method since its experimental simplicity on lab scale was conducive to the planned extensive structure-property studies, and since it would eliminate hydroxide/alkyl halide side reactions that would be expected had the inventors used NaOH catalyst. Initial work was with the electrophiles allyl chloride, 5-bromo-1-pentene, 7-bromo-1-heptene and 11-bromo-1-undecene. The inventors employ abbreviations for the products obtained; for example EC2.58C3 (2) refers to the product of reaction of EC with allyl chloride, that is the "C3" electrophile. EC2.58C5 (3), EC2.58C7 (4) and EC2.58C11 (5) are named using a similar code and have C5 and C11 ω-unsaturated alkyl substituents, respectively. The inventors were gratified to learn that the reaction of available hydroxyl groups was nearly quantitative for C3, C5 and C7 with the ω-unsaturated alkyl halide used. Even with C11 the etherification was still efficient considering the steric bulk and hydrophobicity of the long chain alkyl bromide. The DS values obtained by $^1$H NMR for these ω-unsaturated alkyl chains were 0.38 (2), 0.38 (3), 0.41 (4) and 0.36 (5), respectively, which correspond to efficiencies of 93%, 90%, 95% and 87%, respectively vs. the measured DS (OH) of 0.42.

With these cellulose ethers possessing metathesis "handles" in hand, the inventors proceeded to study their potential as olefin CM substrates. In order to ensure against undesired SM and crosslinking, the inventors made three experimental choices; 1) use of Grubbs type II, electron-poor, less reactive olefins as partners; 2) use of the partner in excess to limit self-reaction of the cellulose derivatives; and 3) use of the highly reactive and selective Hoveyda-Grubbs' $2^{nd}$ generation catalyst C3. For initial studies the inventors selected type II olefin partners acrylic acid (AA) and its ester methyl acrylate (MA), both electron-poor, relatively unreactive olefins. Initial CM reaction of 2 employed 5 mol % Hoveyda-Grubbs' $2^{nd}$ generation catalyst in 0.1 mol/L solution of terminal olefin under nitrogen protection for 2 h. A minimal amount of radical scavenger 3,5-di-tert-4-butylhydroxytoluene (BHT) was added to each reaction to suppress any free-radical reactions that could result from the product α, β-unsaturation (Meng, 2014a); hydrogen atoms in the γ-position of these product α, β-unsaturated acids and esters are quite labile towards H-atom abstraction (Yin, H. et al. (2011). Free radical lipid peroxidation: mechanisms and analysis. Chemical Reviews, 111 (10), 5944-5972). The CM products were solids that were isolated by precipitation, in some cases following purification by dialysis and freeze-drying. FIG. 15A shows the preparation of 2 and the further CM reactions. Results of CM reactions with acrylic acid and methyl acrylate are summarized in the table in FIG. 15B. All CM conversions were calculated based on $^1$H NMR of olefin peaks.

The inventors' initial CM reactions of 2 with both acrylic acid and methyl acrylate in different solvent systems using 5 mol % Hoveyda-Grubbs' $2^{nd}$ generation catalyst gave low to moderate conversion (<50%). Even though by increasing the catalyst load to 10 mol %, the reaction with methyl acrylate in dichloromethane gave improved (70%) conversion, the overall CM reaction was still not as efficient as those previously reported for long-chain ω-unsaturated cellulose esters. Not wishing to be bound by any particular theory, the inventors thus propose that the partial conversion is due to the short olefin chain length of 2 and the resulting steric interference by the cellulose backbone. The electron withdrawing effect from the ether oxygen also may reduce the electron density of the allyl group and thus the reactivity of terminal olefin. Therefore, the inventors explored the CM of EC2.58C5 (3) and EC2.58C7 (4) and EC2.58C11 (5), with longer olefin terminated side chains (C5, C7 and C11 respectively). FIG. 16A shows the preparation of 3, 4 and 5, and their further CM reactions. CM results of these three cellulose ethers with acrylic acid and different acrylates are summarized in the table in FIG. 16B.

EC2.58C5 with its pent-4-enyl substituents reacts more efficiently in CM reactions with methyl acrylate than does the corresponding allyl derivative at 5 mol % catalyst (conversion in dichloromethane (DCM)>70%), and the inventors were pleasantly surprised to observe that increasing the catalyst load from 5 mol % to 10 mol % afforded 100% of CM conversion with methyl acrylate within 2 h. FIGS. 17A and 17B shows the FT-IR spectra of EC2.58C5 and the CM product EC2.58C5-MA (3b), where the ester C=O stretch at 1726 cm$^{-1}$ is quite distinct, confirming successful introduction of ester groups after CM.

$^1$H NMR can often be diagnostic for reaction progression (FIGS. 18A and 18B), since the terminal olefin protons resonate not only cleanly downfield of the backbone region, at 4.98 and 5.82 ppm in this case, but also are quite sharp since the olefin is distant from the cellulose main chain and therefore has rather free rotation compared to backbone protons and those more proximate to the main cellulose chain. Furthermore, the CM products now have conjugated olefins, so the olefin proton resonances appear even further downfield and are cleanly separated from the starting olefin resonances. It is evident by comparing the $^1$H NMR spectrum of product EC2.58C5-MA (3b) (FIG. 18B) with that of the starting EC2.58C5 (3) (FIG. 18A) that the starting cellulose ether was completely consumed, as shown by the complete disappearance of its olefin proton resonances, to be replaced by the anticipated α, β-unsaturated ester CM product, with olefin proton resonances at 5.75 and 6.92 ppm, demonstrating essentially perfect CM conversion to the conjugated ester. The CM product olefin is predominantly in the E configuration, in accordance with results from previous CM reactions of cellulose esters (Meng, 2014a).

$^{13}$C NMR is also diagnostic for conversion to EC2.58C5-MA (3b) (FIGS. 19A and 19B) since EC2.58C5 (3) possesses no carbonyl group and, after CM, a distinct ester carbonyl resonance at 167.2 ppm appeared. At the same time, the two olefin resonances shifted downfield from 114.1 and 139.0 ppm to 121.2 and 150.2 ppm due to conjugation with the ester group. Moreover, the methoxy group from methyl acrylate also gave a sharp resonance at 51.7 ppm, strongly supporting successful CM. $^1$H-$^{13}$C HSQC was also performed to help confirm the Z/E configuration. FIGS. 20A and 20B showed clear correlation of the carbon signal at 150.2 ppm with proton signals at 6.98 and 6.28 ppm, and correlation of the carbon signal at 121.2 ppm with proton signals at 5.82 and 5.74 ppm, which confirmed the assignment of proton peaks of the E/Z isomers. The carbon a to the carbonyl group was shifted 11.2 ppm downfield after CM (from 139.0 ppm) due to conjugation with the ester group, and was correlated to proton peaks at 6.98 (E configuration) and 6.28 ppm (Z configuration). The β carbon was shifted 7.1 ppm downfield (from 114.1 ppm) and correlated with proton peaks at 5.82 (E configuration) and 5.74 ppm (Z configuration). The $^1$H-$^{13}$C HSQC spectra also helped identify the cellulose backbone peaks; the small peak at 72.5 ppm was found to be a methylene, assigned as the backbone C6, and the backbone C2 peak at 77.4 ppm, overlapping with the CDCl$_3$ solvent peak (77.2 ppm), was also revealed by the HSQC spectra.

Knowing that CM of the pent-4-enyl ether with methyl acrylate could be efficient in DCM, the inventors explored the flexibility with regard to solvent (i.e. tetrahydrofuran (THF) and 1,3-dimethyl-2-imidazolidinone (DMI)) and found that DCM gave the highest conversion among all these solvents, even vs. increased temperature in DMI (38% CM conversion when using 5 mol % catalyst in DMI at 70° C. for 2 h, vs. 74% in DCM in 2 h under same catalyst load at 37° C.). The inventors further explored CM of EC2.58C5 using acrylic acid as the partner, since this would afford ω-carboxy substituents that are known to be favorable structural elements for ASD (L. Yin and M. A. Hillmyer, Mol. Pharm., 2013, 11, 175-185 and B. Li et al., Carbohydr. Polym., 2013, 92, 2033-2040). At 5 mol % catalyst load, reaction in DCM or THF gave moderate conversion (45% and 60% separately), but upon increasing to 10 mol % catalyst CM of EC2.58C5 (3) with acrylic acid in DCM was completely successful, affording 100% conversion to the desired CM product EC2.58C5-AA (3a). On the other hand, the inventors found that acrylic acid could be used as both solvent and reagent, thereby promoting high conversion. Under these somewhat acidic conditions, reaction of EC2.58C5 in acrylic acid afforded relatively high conversion (72%) with 5 mol % catalyst, and gratifyingly 100% conversion to the desired, α, β-unsaturated acid CM product EC2.58C5-AA (3a) with 10 mol % catalyst within 2 h. Therefore the optimized CM conditions for successful CM of EC2.58C5 (3) to afford desired product EC2.58C5-AA (3a) and EC2.58C5-MA (3b) are 10 mol % catalyst, DCM solvent for methyl acrylate, and either DCM or acrylic acid for CM with acrylic acid. Successful CM of EC2.58C5 (3) with both acrylic acid and methyl acrylate led us to extend the range of CM partners. The inventors further explored CM of EC2.58C5 (3) with a variety of hydrophilically substituted acrylates, since hydrophilicity is important for drug release and polymer solubility: 2-hydroxyethyl acrylate (HEA), poly(ethylene glycol) methyl ether acrylate (PEG-MEA) (average $M_n$=480 Da) and poly(propylene glycol) acrylate (PPGA) (average $M_n$=475 Da). 2-Hydroxyethyl acrylate also reacts efficiently with EC2.58C5 (3) under conditions optimized for the other acrylates (10 mol % catalyst in DCM, 2 h). The high CM conversion with PEGMEA (85%) is also surprising, given concerns about potential steric interactions between the polymers, the relatively short tether between cellulose and olefin, and the high solution viscosity due to the polymeric metathesis partner. With extended reaction time (12 h), CM with the high molecular weight PEGMEA also reached 100%. Reaction with PPGA gave relatively low CM conversion even with 12 h reaction time (<25%), perhaps due to the more viscous nature of the PPGA and the poor homogeneity of the reaction system. For better solubility of the polymer CM partner, the CM reaction with PPGA was also performed in THF under the same conditions, and slightly increased but still moderate conversion (42%) was observed. Overall the pent-4-enyl substituted EC2.58C5 (3) undergoes rapid, high conversion at mild temperatures to discrete CM products with various acrylates (AA, MA, HEA and PEGMEA), with no evidence of crosslinking (initial CM products were very solvent-soluble, see FIG. 21).

To further explore the influence of olefin tether length, the inventors explored CM of EC2.58C7 (hept-6-enyl ether, 4) with acrylic acid and methyl acrylate, with interesting initial results. Firstly, it was evident that the reactivity of EC2.58C7 (4) is slightly lower than that of EC2.58C5 (3). Using the earlier identified optimized conditions, CM with either acrylic acid and methyl acrylate afforded nearly quantitative conversion (>95% and >90%), but product $^1$H NMR spectra still reveal small peaks from unreacted terminal olefins (δ4.96 and 5.80, respectively). It is likely that 100% conversion of EC2.58C7 (4) would be achievable, e.g. with longer reaction time. The apparently slightly lower CM reactivity of the hept-6-enyl substituted ether may be due to enhanced self-association driven by side chain hydrophobic interactions (L. Landoll, J. Polym. Sci., Polym. Chem., 1982, 20, 443-455; and M. A. Winnik and A. Yekta, Curr. Opin. Colloid Interface Sci., 1997, 2, 424-436).

The CM reactivity of EC2.58C11 (5) was even more intriguing. Using 5 mol % catalyst 37° C., CM conversions with either acrylic acid or methyl acrylate were no better than moderate (<50%). The inventors first considered that the low CM conversions may be due to the fact that THF or DCM are weaker solvents for EC2.58C11 (5) than for the shorter chain ethers, leading to polymer self-association. Hence the inventors looked at solvent variation, employing both more (DMI) and less polar (toluene) solvents at increased temperature (70° C.) but under otherwise similar conditions (2 h reaction, 5 mol % catalyst); however with these solvents of varying polarity, CM conversion remained below 50%. Even with increased catalyst (10 mol %, 2 h) conversion was still less than 60%. The inventors next explored whether there was simply a kinetics problem. The inventors found that after 12 h reaction in DCM (5% catalyst, 37° C.), CM conversion with acrylic acid rose to 83%, and with methyl acrylate reached near complete conversion (95%). Upon increasing to 10 mol % catalyst in DCM for 12 h, reactions with both CM with acrylic acid and methyl acrylate reached 100% conversion. Therefore, CM of EC2.58C11 (5) does proceed, but more slowly than with other tether lengths. It is possible that EC2.58C11 (5) may tend to aggregate and self-assemble through hydrophobic interaction of the side chains, and therefore requires extended reaction time.

An overall comparison of the observed reactivity of the ω-unsaturated cellulose ethers prepared reveals that the pent-4-enyl substituted ether (EC2.58C5) reacts most quickly and completely in CM with acrylic acid and various acrylate esters including MA, HEA and PEGMEA. The hept-6-enyl ether EC2.58C7 (4) has similar but slightly lower reactivity than the pent-4-enyl ether, while the allyl and undec-10-enyl ethers show lower CM conversions under the same conditions. Not wishing to be bound by any particular theory, the inventors propose that the pent-4-enyl has side chain length adequate to minimize steric concerns, while not so long as to negatively impact solubility, catalyst interactions, or cause excessive self-association.

The inventors used SEC to monitor the change of polymer molecular weight during CM process, and the results are summarized in FIG. 22. Only products with 100% CM conversion were characterized for comparison. For both C5 and C11 chain length, the molecular weight and degree of polymerization (DP) of starting materials EC2.58 decreased during the four-day etherification due to alkaline peeling from the end of cellulose chain. However, the DP of EC2.58C5 (3) CM products did not greatly decrease during the 2 h reactions at 37° C. in DCM or even acetic acid solvents. Dispersity (D) was used to evaluate the molecular weight distribution and from the results it can be seen that with the same starting material EC2.58C5 (1), the CM product EC2.58C5-AA (3a) and EC2.58C5-HEA (3c) have almost the same dispersity (D), demonstrating the mild condition of CM and the minimal effect on molecular weight during 2 h reaction. CM of EC2.58C11 (5) also gave products with relatively unchanged molecular weight and dispersity, providing further support for the conclusion that successful intermolecular CM had occurred to the exclusion of SM; SM of the cellulose ω-olefins would result in rapid cross-linking and sharply increasing molecular weight.

Glass transition temperature ($T_g$) is an important parameter for polymer materials. For amorphous solid dispersion application, a $T_g$ that is 50° C. higher than any likely ambient temperature is used as a rule of thumb to predict the ability of the polymer to keep the formulation in the glassy state, preventing drug mobility and therefore recrystallization (J. A. Baird and L. S. Taylor, Adv. Drug Deliv. Rev., 2012, 64, 396-421). The inventors used DSC to determine polymer $T_g$ values. Commercial cellulose ethers are complex mixtures of monosaccharides and monosaccharide sequences, making DSC glass transitions quite broad (sometimes ranging across ca. 40° C.) with low resolution; therefore modulated DSC was applied where necessary to improve resolution and clarity. The starting material EC2.58 showed a broad transition at 127° C., which is comparable to the previous reported value for ethyl cellulose (C. Entwistle and R. Rowe, J. Pharm. Pharmacol., 1979, 31, 269-272) After etherification the EC2.58C5 showed an even broader DSC transition (analysis by MDSC also gave no clear transition). However, by applying MDSC, all EC2.58C5 CM products showed lower $T_g$ compared to the starting material EC2.58, which is as expected since the C5 side chains should increase the free volume of the polymer and thus enhance the main chain mobility, resulting in a lower $T_g$ (FIG. 22). The better resolution of CM products than the olefin terminated cellulose ethers may be due to the dispersive interaction between the terminal polar functional groups. (Y. H. Kim and R. Beckerbauer, Macromolecules, 1994, 27, 1968-1971; C.-F. Shu and C.-M. Leu, Macromolecules, 1999, 32, 100-105; and D. W. Lim, S. H. Choi and T. G. Park, Macromol. Rapid. Commun., 2000, 21, 464-471). On the other hand, the EC2.58C11 (5) CM products showed higher $T_g$ than EC2.58C5 (3) CM products, which may be due to the hydrophobic interaction of hydrocarbon chain and the interaction between the acid/ester terminal groups promoting the C11 side chain stacking, which stiffen the backbone and decrease free volume and eventually contribute to measured higher $T_g$ when compared to EC2.58C5 CM products (D. W. Lim et al., Macromol. Rapid. Commun., 2000, 21, 464-47 and V. A. Kusuma et al., J. Membrane Sci., 2009, 327, 195-207). Overall the $T_g$ values of many CM products are ≥50° C. higher than any likely ambient temperature (maximum ca. 40-50° C.), indicating these cellulose ethers are suitable for ASD application with regard to maintaining the amorphous state and preventing drug recrystallization.

An issue of potential concern is the stability of these pendant α, β-unsaturated carboxylic acid and ester products, given the previously mentioned lability of the γ-hydrogen atoms to radical abstraction. The previous report by Meng revealed that free radical oligomerization can lead to crosslinking and loss of solubility in analogous cellulose ester CM products (X. T. Meng, J. B. Matson and K. J. Edgar, Poly. Chem., 2014, 5, 7021-7033, "Meng, 2014b"). With regard to the current cellulose ether CM products, adding BHT as radical scavenger for the CM reaction prevented crosslinking and maintained product solubility during CM reaction and purification (either precipitation or dialysis). Additional BHT was also added into to the products for storage, which helped keep these cellulose ether CM products soluble for extended periods. Ultimately, the key to permanently eliminating this instability will be to eliminate the α, β-unsaturation, either by means of hydrogenation (Meng, 2014b) or by further double bond elaboration, e.g. by Michael addition (A. H. Soeriyadi et al., Polym. Chem., 2011, 2, 815-822; and G.-Z. Li et al., Polym. Chem., 2010, 1, 1196-1204).

CONCLUSIONS

Cellulose ω-unsaturated alkyl ethers were synthesized with high efficiency with regard to conversion of available OH groups, by reaction of commercial ethyl cellulose with alkyl halides in THF using NaH as base; even up to C11 these reactions were effective. Olefin cross-metathesis of this series of cellulose ω-unsaturated alkyl ether derivatives was successful under very mild conditions, with high efficiency and selectivity in many cases. Conversions were modest for the sterically crowded and rather electron poor C3 (allyl) ethers, whereas they were high under the right conditions for longer chain unsaturated ethers (C5, C7, and C11). CM of the undec-10-enyl cellulose ethers was successful but surprisingly slow (12 h reaction time), possibly due to self-association between these cellulose ethers bearing lengthy and hydrophobic side chains. Selectivity of CM in essentially complete dominance over SM was achieved by the combination of type II olefin substrates, used in excess, and employing Hoveyda-Grubbs' 2nd generation catalyst. The α, β-unsaturated carboxylic acid and ester products have a predictable tendency to crosslink over prolonged time, by H-atom abstraction and radical-radical coupling and/or conjugate addition of radicals to conjugated olefins on other cellulose chains. This free-radical initiated cross-linking tendency could be suppressed by using a minimal amount of radical scavenger such as BHT. Each type II olefin examined could afford high CM conversion under the appropriate, mild reaction conditions, which were readily determined. The molecular weight, solubility and glass transition temperatures of the CM products were studied and were also related to structural features in predictable fashion.

This first successful olefin CM of cellulose ether derivatives opens broad and novel pathways, enabling us to increase the diversity of accessible cellulose ether derivatives, thus providing ready access for example to a varied group of carboxy-terminal substituents for use in ASD and other forms of drug delivery (G. A. Ilevbare et al., Molecular Pharmaceutics, 2013, 10, 2381-2393). Certain limitations revealed themselves in this initial study as well. The relatively low DS (OH) available in commercial EC samples limits the amount of CM "handle" group that can be incorporated, thereby limiting the DS of other functional groups that can be appended by CM. This could be for example cripple ASD structure-property studies, where a higher DS of carboxyl functionality has been found to be desirable in cellulose ester derivatives. Furthermore, the residual unsaturation and resulting reactivity towards H-atom abstraction of these derivatives can be managed in the short term by adding radical scavengers, but in the longer term may prove problematic.

Compounds and methods described in this specification may be useful for structure-property studies, particularly those aimed at developing polymers for drug delivery. Particular applications for the compounds and methods in the area of drug delivery can include, controlled-release drug delivery systems (delivery of compounds in response to stimuli, such as pH, or time), controlled-release coatings, increasing bioavailability of drugs, and maintaining drug supersaturation in the GI tract. Other biomedical applications include targeted delivery systems (by appending sensitive targeting moieties using the gentle cross metathesis chemistry taught herein), prodrugs (appending the drug via metathesis chemistry with a moiety that links to the drug through a hydrolysable linker), or hydrogels (appending moieties capable of physical or chemical crosslinking upon exposure to a trigger). Other applications include water-dispersible coatings additives, adhesives, lubricants, surfactants, self-plasticized plastics, sensors, and an extremely wide array of other potential applications.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties including patents, published patent applications, and non-patent literature, and as such are intended to provide an efficient way of supplementing the enabling disclosure of this invention as well as provide background detailing the level of ordinary skill in the art.

The invention claimed is:

1. A compound having the formula:

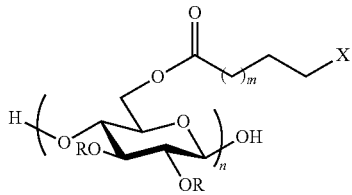

wherein:
R is H, methyl, ethyl, acetyl, propionyl, or butyryl;
n=10-10,000; and m = 8 and X = 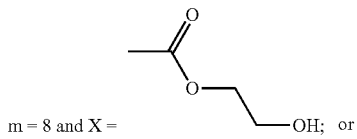 —OH; or m = 8 and X = 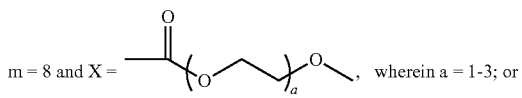, wherein a = 1-3; or m = 8 and X = 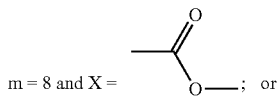; or m = 2 and X = 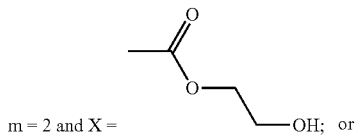 —OH; or m = 2 and X = 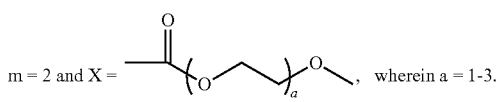, wherein a = 1-3.

2. The compound of claim 1, wherein:
m=8 and

X = 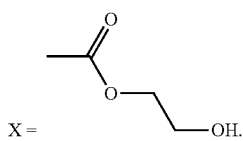 —OH.

3. The compound of claim 2, wherein R=H.
4. The compound of claim 2, wherein R=acetyl.

5. The compound of claim 1, wherein:
m=8 and

X = 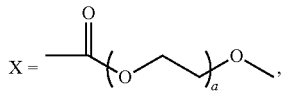, wherein a=1-3.
6. The compound of claim 5, wherein R=H.
7. The compound of claim 5, wherein R=acetyl.
8. The compound of claim 1, wherein:
m=8 and X = 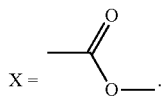.

9. The compound of claim 8, wherein R=H.
10. The compound of claim 8, wherein R=acetyl.
11. The compound of claim 1, wherein:
m=2 and X = 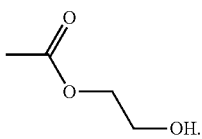 —OH.

12. The compound of claim 11, wherein R=H.
13. The compound of claim 11, wherein R=acetyl.
14. The compound of claim 1, wherein:
m=2 and X = 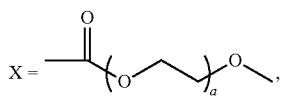, wherein a=1-3.
15. The compound of claim 14, wherein R=H.
16. The compound of claim 14, wherein R=acetyl.
17. The compound of claim 1, wherein the compound is amphiphilic.
18. A composition comprising:
an aqueous solution, suspension, or colloid of a compound having the formula:

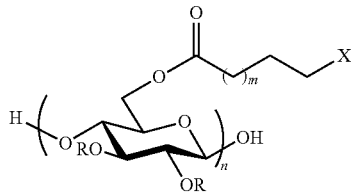

wherein:
R is H, methyl, ethyl, acetyl, propionyl, or butyryl;
n=10-10,000; and
m=b and X = 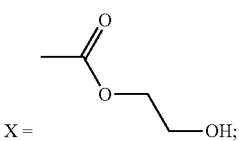

or
m=8 and

X = 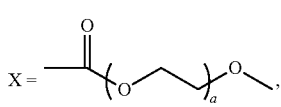

wherein a=1-3; or m = 8 and X = 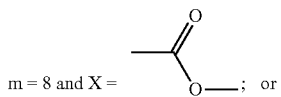; or m = 2 and X = 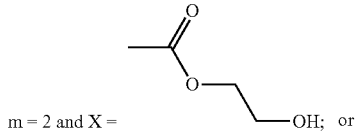; or m = 2 and X = 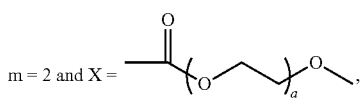

wherein a=1-3.

19. A composition comprising:
a compound having the formula:

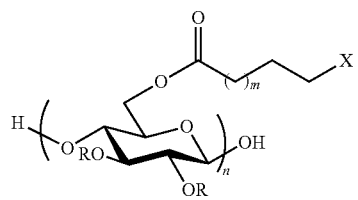

wherein:
R is H, methyl, ethyl, acetyl, propionyl, or butyryl;
n=10-10,000; and m = 8 and X = 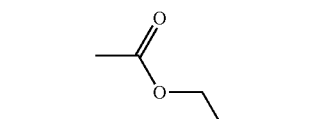; or m = 8 and X = 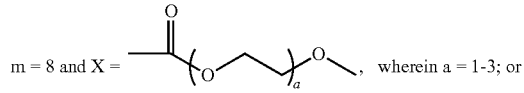; or m = 8 and X = 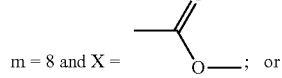; or m = 2 and X = 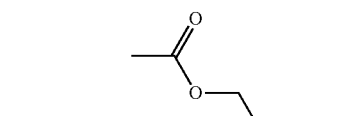; or m = 2 and X = 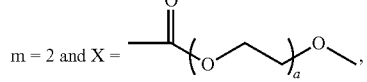, wherein a=1-3;
wherein the composition is in the form of a coating, adhesive, and/or lubricant.

20. The composition of claim 19, wherein the compound is amphiphilic and dispersible in water.

* * * * *